United States Patent
Syed et al.

(10) Patent No.: US 10,749,646 B2
(45) Date of Patent: Aug. 18, 2020

(54) APPARATUSES, METHODS, AND COMPUTER PROGRAM PRODUCTS FOR COMMUNICATION

(71) Applicant: Communication Systems LLC, Santa Fe, NM (US)

(72) Inventors: Aitizaz Uddin Syed, Surrey (CA); Ali Atefi, Los Angeles, CA (US)

(*) Notice: Subject to any disclaimer, the term of this patent is extended or adjusted under 35 U.S.C. 154(b) by 0 days.

(21) Appl. No.: 16/221,614

(22) Filed: Dec. 17, 2018

(65) Prior Publication Data

US 2019/0149282 A1    May 16, 2019

Related U.S. Application Data

(63) Continuation of application No. 15/859,690, filed on Jan. 1, 2018, now Pat. No. 10,158,462, which is a
(Continued)

(51) Int. Cl.
*H04W 28/06* (2009.01)
*H04L 5/00* (2006.01)
(Continued)

(52) U.S. Cl.
CPC ......... *H04L 5/0023* (2013.01); *H04B 7/0452* (2013.01); *H04B 7/0697* (2013.01);
(Continued)

(58) Field of Classification Search
None
See application file for complete search history.

(56) References Cited

U.S. PATENT DOCUMENTS 8,571,010 B1    10/2013  Zhang et al.
9,860,034 B2 *   1/2018  Syed .................. H04L 69/22
(Continued)

FOREIGN PATENT DOCUMENTS

CN      104284408 A     1/2015
WO      2012115432 A2   8/2012

OTHER PUBLICATIONS

IEEE Standard for Information Technology—Telecommunications and information exchange between systems Local and metropolitan area networks—Specific requirements, Part 11: Wireless LAN Medium Access Control (MAC) and Physical Layer (PHY) Specifications, IEEE Computer Society, Mar. 29, 2013, pp. 1-1400, IEEE, New York, NY.
(Continued)

*Primary Examiner* — Ayaz R Sheikh
*Assistant Examiner* — Sori A Aga

(57) ABSTRACT

Apparatuses, methods, and computer program products for communication are provided. In an aspect, an apparatus for communication may include a processing system configured to receive a frame configured to assign at least member information or position information for one or more identifiers, and receive a data packet associated with a particular identifier and indicating a number of space-time streams for one or more position information. In another aspect, an apparatus for communication may include a processing system configured to transmit a frame configured to assign at least member information or position information for one or more identifiers, and transmit a data packet associated with a particular identifier and indicating a number of space-time streams for one or more position information.

28 Claims, 34 Drawing Sheets

Related U.S. Application Data continuation of application No. 15/277,633, filed on Sep. 27, 2016, now Pat. No. 9,860,036, which is a continuation of application No. 15/005,849, filed on Jan. 25, 2016, now Pat. No. 9,860,034, which is a continuation of application No. 14/518,576, filed on Oct. 20, 2014, now Pat. No. 9,247,456, which is a continuation of application No. 14/040,731, filed on Sep. 30, 2013, now Pat. No. 8,867,642.

(51) Int. Cl.
| | | |
|---|---|---|
| *H04B 7/0452* | (2017.01) | |
| *H04B 7/06* | (2006.01) | |
| *H04L 29/06* | (2006.01) | |
| *H04W 4/06* | (2009.01) | |
| *H04W 28/02* | (2009.01) | |
| *H04L 12/18* | (2006.01) | |

(52) U.S. Cl.
CPC ............ *H04L 5/0094* (2013.01); *H04L 69/22* (2013.01); *H04W 4/06* (2013.01); *H04W 28/0268* (2013.01); *H04W 28/065* (2013.01); *H04L 12/189* (2013.01)

(56) References Cited

U.S. PATENT DOCUMENTS

| | | |
|---|---|---|
| 2002/0154653 A1 | 10/2002 | Benveniste |
| 2007/0097930 A1 | 5/2007 | Ouyang et al. |
| 2007/0165521 A1 | 7/2007 | Malik et al. |
| 2010/0107042 A1 | 4/2010 | Sawai et al. |
| 2010/0111220 A1 | 5/2010 | Rouquette-Leveil et al. |
| 2010/0260159 A1 | 10/2010 | Zhang et al. |
| 2010/0325662 A1 | 12/2010 | Cooper |
| 2011/0064040 A1 | 3/2011 | Kim et al. |
| 2011/0075607 A1 | 3/2011 | Kim et al. |
| 2011/0077044 A1 | 3/2011 | Sampath et al. |
| 2011/0096796 A1 | 4/2011 | Zhang et al. |
| 2011/0096797 A1 | 4/2011 | Zhang et al. |
| 2011/0150004 A1 | 6/2011 | Denteneer et al. |
| 2011/0194475 A1 | 8/2011 | Kim et al. |
| 2011/0255582 A1 | 10/2011 | Prasad et al. |
| 2011/0261742 A1 | 10/2011 | Wentink et al. |
| 2012/0127940 A1 | 5/2012 | Lee et al. |
| 2012/0163218 A1 | 6/2012 | Kim et al. |
| 2012/0163483 A1 | 6/2012 | Stacey et al. |
| 2012/0218983 A1 | 8/2012 | Noh |
| 2012/0263091 A1 | 10/2012 | Kim et al. |
| 2012/0300874 A1 | 11/2012 | Zhang |
| 2012/0327838 A1 | 12/2012 | Seok |
| 2013/0070748 A1 | 3/2013 | Abraham et al. |
| 2013/0136094 A1 | 5/2013 | Wei |
| 2013/0188653 A1 | 7/2013 | Kim et al. |
| 2013/0229996 A1 | 9/2013 | Wang |
| 2013/0286959 A1 | 10/2013 | Lou et al. |
| 2013/0301551 A1 | 11/2013 | Gosh Monisha et al. |
| 2014/0162714 A1 | 6/2014 | Kim et al. |
| 2014/0185501 A1 | 7/2014 | Park et al. |
| 2014/0225777 A1 | 8/2014 | Harel et al. |
| 2014/0241257 A1 | 8/2014 | Ding et al. |
| 2014/0328235 A1 | 11/2014 | Merlin et al. |
| 2015/0036674 A1 | 2/2015 | Lee et al. |
| 2015/0063111 A1 | 3/2015 | Merlin et al. |
| 2015/0063191 A1 | 3/2015 | Merlin et al. |
| 2015/0092659 A1 | 4/2015 | Syed et al. |
| 2015/0139106 A1 | 5/2015 | Masuda et al. |
| 2016/0043783 A1 | 2/2016 | Xia et al. |

OTHER PUBLICATIONS

IEEE Standard for Information Technology—Telecommunications and information exchange between systems Local and metropolitan area networks—Specific requirements, Part 11: Wireless LAM Medium Access Control (MAC) and Physical Layer (PHY) Specifications, IEEE Computer Society, Mar. 29, 2013, pp. 1401-2793, IEEE, New York, NY.

Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications: Higher-Speed Physical Layer Extension in the 2.4 GHz Band, IEEE Computer Society, Jun. 12, 2003, pp. 1-96, IEEE, New York, NY.

IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 5: Enhancements for Higher Throughput, IEEE Computer Society, Oct. 29, 2009, pp. 1-536, IEEE, New York, NY.

Draft Standard for Information Technology—Telecommunications and information exchange between systems-Local and metropolitan area networks—Specific requirements—Part 11: Wireless LAN Medium Access Control (MAC) and Physical Layer (PHY) specifications—Amendment 4: Enhancements for Very High Throughput for Operation in Bands below 6 GHz, Jan. 2013, pp. 1-440, IEEE, New York, NY.

IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 3: Enhancements forVery High Throughput in the 60 GHz Band, Dec. 28, 2012, pp. 1-628, IEEE, New York, NY.

IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 1: Prioritization of Management Frames, Apr. 6, 2012, pp. 1-52, IEEE, New York, NY.

IEEE Standard for Information Technology—Telecommunications and information exchange between systems—Local and metropolitan area networks—Specific requirements—Part 11: Wireless LAN Medium Access Control (MAC) and Physical Layer (PHY) Specifications: Amendment 2: MAC Enhancements for Robust Audio Video Streaming, May 29, 2012, pp. 1-162, IEEE, New York, NY.

Gast, 802.11 Wireless Networks: The Definitive Guide, 2009, 1-931, O'Reilly Media, Sebastopol, California, United States.

Gast, 802.11ac: A Survival Guide, 2013, 1-185, O'Reilly Media, Sebastopol, California, United States.

Gast, 802.11n: A Survival Guide, 2012, 1-177, O'Reilly Media, Sebastopol, California, United States.

Perahia et al., Next Generation Wireless LANs, 2nd Ed., 2013, 1-689, University Press, Cambridge, United Kingdom.

Coskun et al., Near Field Communication, 2012, 1-516, John Wiley & Sons Ltd, West Sussex, PO19 8SQ, United Kingdom.

\* cited by examiner

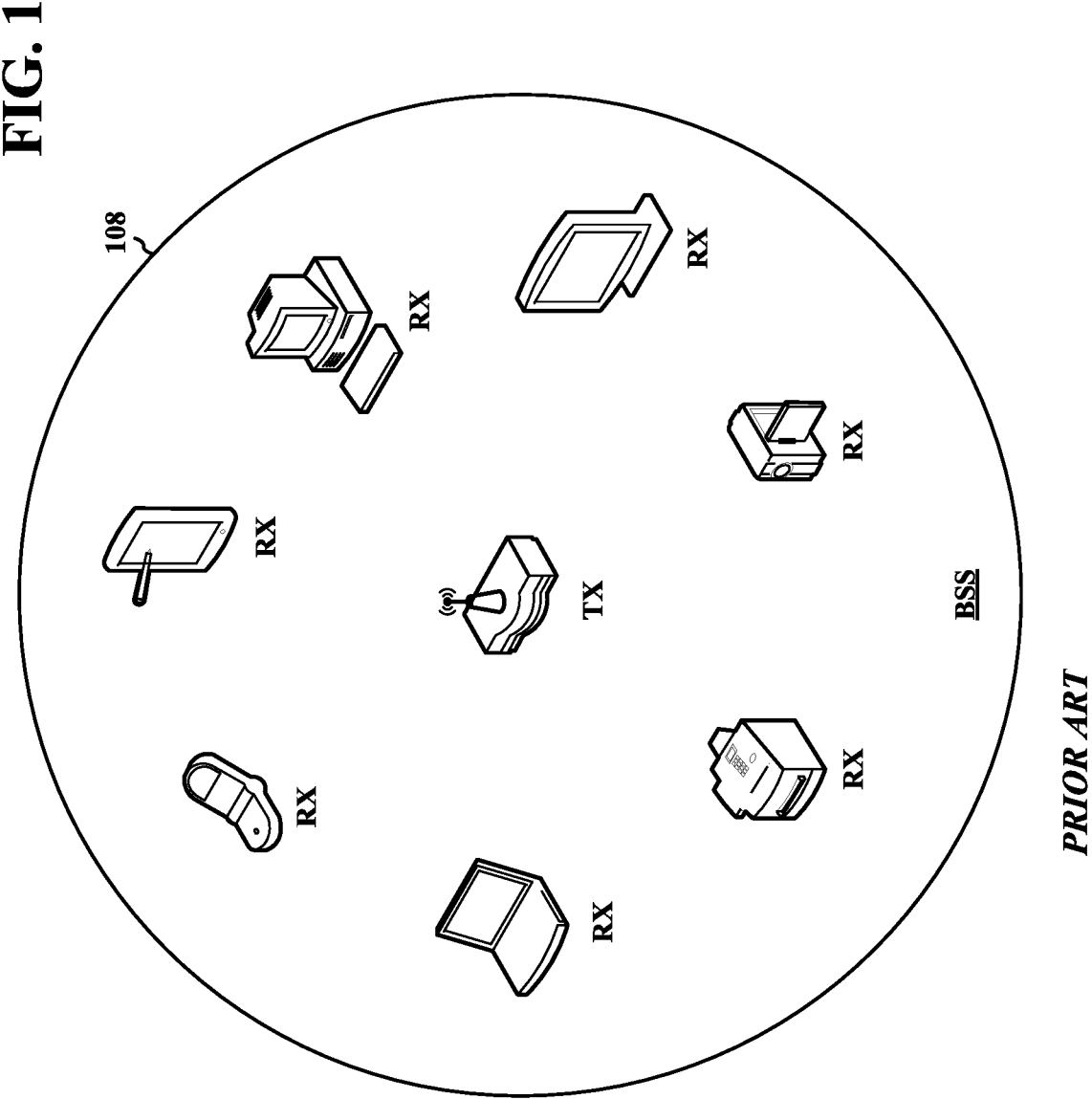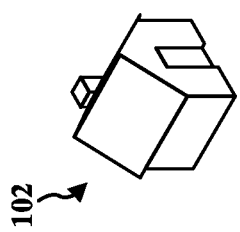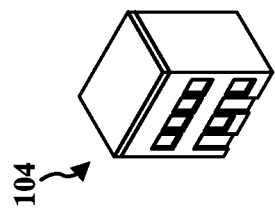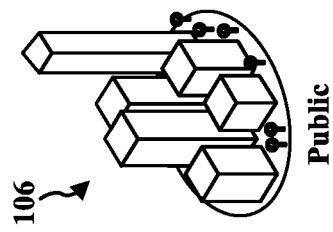
FIG. 1
PRIOR ART

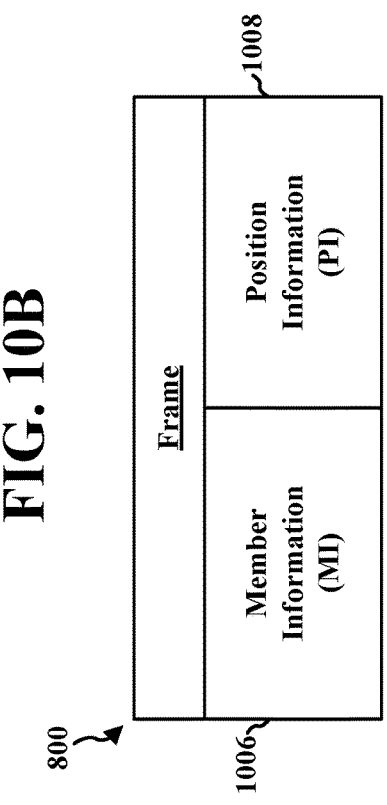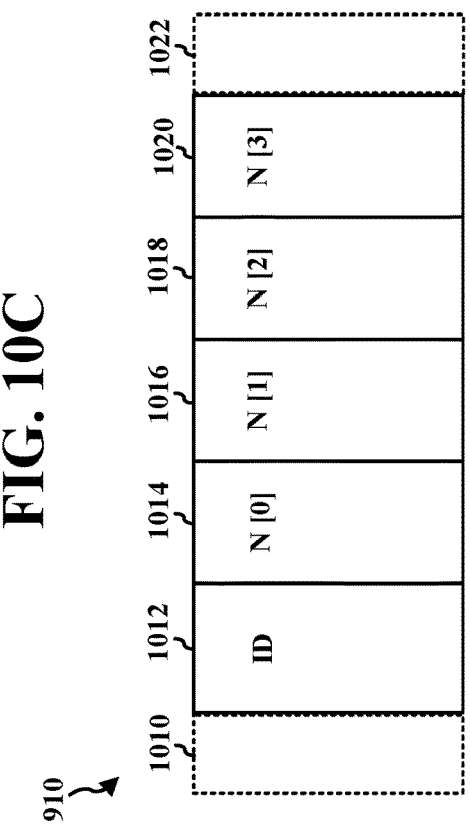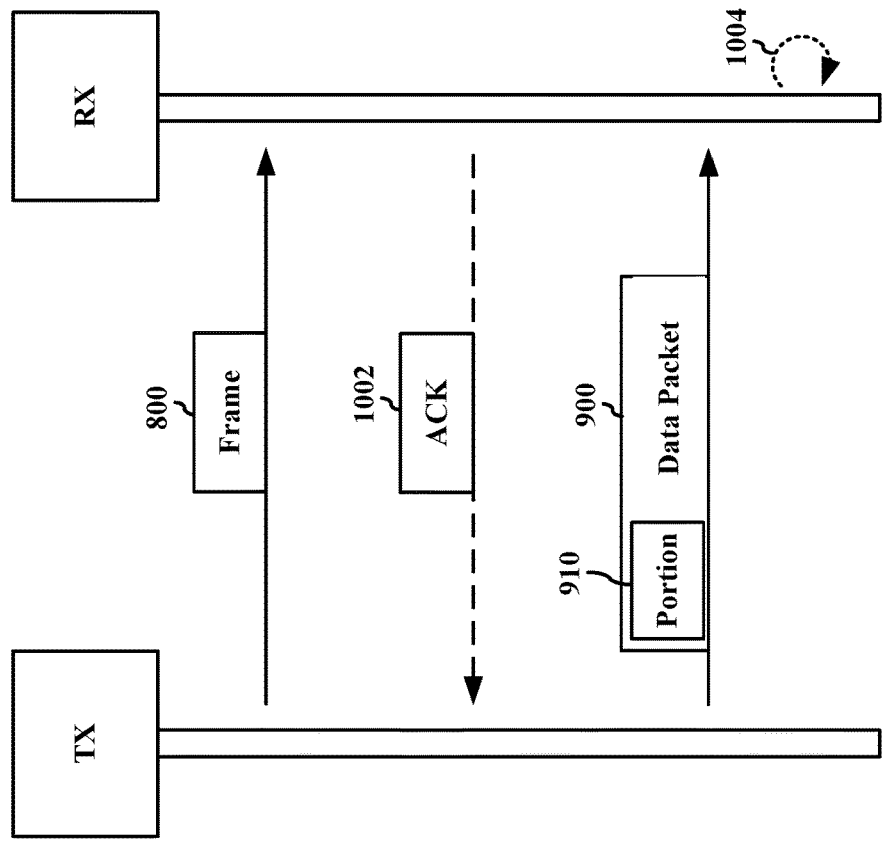
FIG. 10B
FIG. 10C
FIG. 10A

1402 — RX 1

| QoS | MI | ID | PI |
|---|---|---|---|
| 4 | 0 | 0 | - |
|   | 0 | ... | ... |
|   | 1 | 10 | 0 |
|   | 0 | 11 | - |
|   | 0 | ... | ... |
|   | 0 | n | - |

1404 — RX 2

| QoS | MI | ID | PI |
|---|---|---|---|
| 1 | 0 | 0 | - |
|   | 0 | ... | ... |
|   | 1 | 10 | 1 |
|   | 0 | 11 | - |
|   | 0 | ... | ... |
|   | 0 | n | - |

1406 — RX 3

| QoS | MI | ID | PI |
|---|---|---|---|
| 3 | 0 | 0 | - |
|   | 0 | ... | ... |
|   | 1 | 10 | 2 |
|   | 0 | 11 | - |
|   | 0 | ... | ... |
|   | 0 | n | - |

1408 — RX 4

| QoS | MI | ID | PI |
|---|---|---|---|
| 2 | 0 | 0 | - |
|   | 0 | ... | ... |
|   | 1 | 10 | 3 |
|   | 0 | 11 | - |
|   | 0 | ... | ... |
|   | 0 | n | - |

1410 — RX 5

| QoS | MI | ID | PI |
|---|---|---|---|
| 6 | 0 | 0 | - |
|   | 0 | ... | ... |
|   | 1 | 10 | 0 |
|   | 0 | 11 | - |
|   | 0 | ... | ... |
|   | 0 | n | - |

1412 — RX 6

| QoS | MI | ID | PI |
|---|---|---|---|
| 5 | 0 | 0 | - |
|   | 0 | ... | ... |
|   | 1 | 10 | 1 |
|   | 0 | 11 | - |
|   | 0 | ... | ... |
|   | 0 | n | - |

FIG. 14

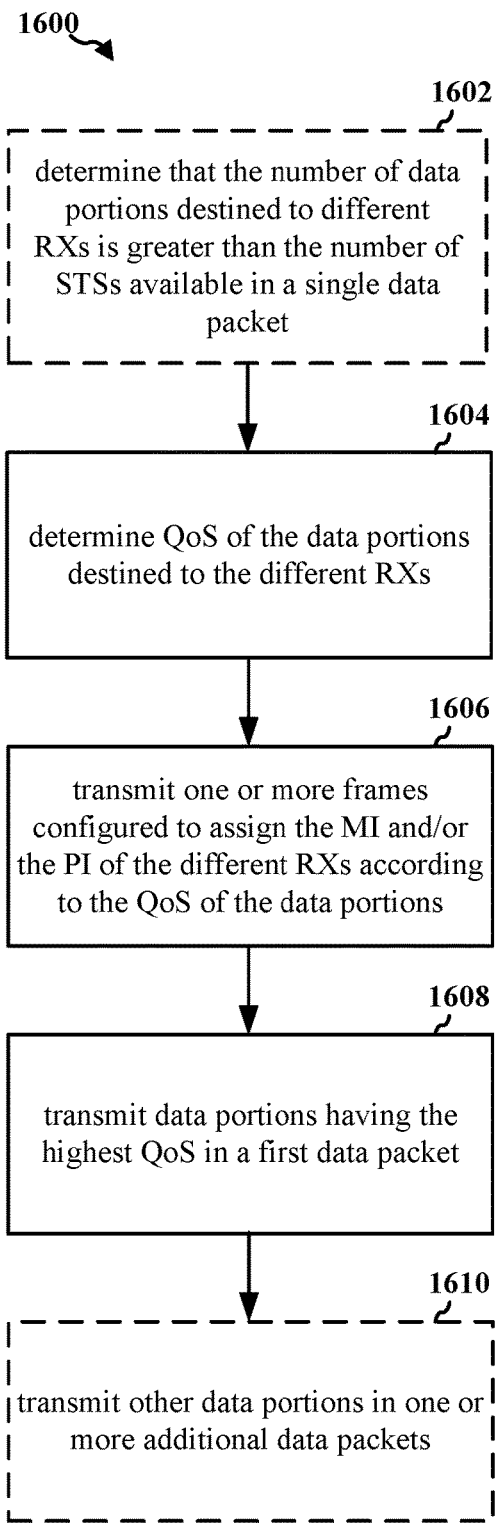
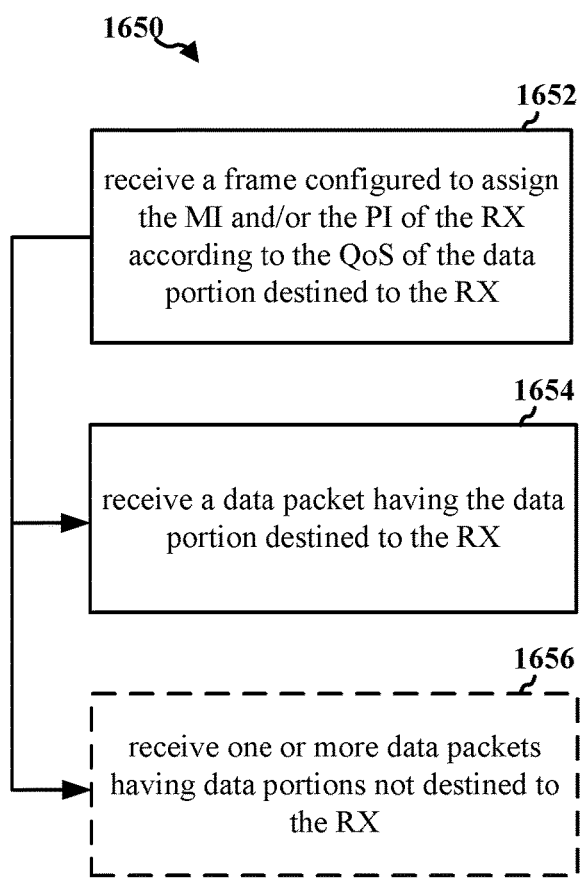
FIG. 16A
FIG. 16B

1702

RX 1

| QoS | MI | ID | PI |
|-----|----|----|----|
| 4   | 0  | 0  | -  |
|     | 0  | ...| ...|
|     | 1  | 10 | 2  |
|     | 0  | 11 | -  |
|     | 0  | ...| ...|
|     | 0  | n  | -  |

1704

RX 2

| QoS | MI | ID | PI |
|-----|----|----|----|
| 1   | 0  | 0  | -  |
|     | 0  | ...| ...|
|     | 0  | 10 | -  |
|     | 1  | 11 | 1  |
|     | 0  | ...| ...|
|     | 0  | n  | -  |

1706

RX 3

| QoS | MI | ID | PI |
|-----|----|----|----|
| 3   | 0  | 0  | -  |
|     | 0  | ...| ...|
|     | 1  | 10 | 3  |
|     | 0  | 11 | -  |
|     | 0  | ...| ...|
|     | 0  | n  | -  |

1708

RX 4

| QoS | MI | ID | PI |
|-----|----|----|----|
| 2   | 0  | 0  | -  |
|     | 0  | ...| ...|
|     | 0  | 10 | 0  |
|     | 1  | 11 | -  |
|     | 0  | ...| ...|
|     | 0  | n  | -  |

1710

RX 5

| QoS | MI | ID | PI |
|-----|----|----|----|
| 6   | 0  | 0  | -  |
|     | 0  | ...| ...|
|     | 1  | 10 | 0  |
|     | 0  | 11 | -  |
|     | 0  | ...| ...|
|     | 0  | n  | -  |

1712

RX 6

| QoS | MI | ID | PI |
|-----|----|----|----|
| 5   | 0  | 0  | -  |
|     | 0  | ...| ...|
|     | 1  | 10 | 1  |
|     | 0  | 11 | -  |
|     | 0  | ...| ...|
|     | 0  | n  | -  |

| Data Size (# Frames) | MI | ID | PI |
|---|---|---|---|
| 6 | 0 | 0 | - |
|  | 0 | ... | ... |
|  | 1 | 10 | 0 |
|  | 0 | 11 | - |
|  | 0 | ... | ... |
|  | 0 | n | - |

1904 RX 2

| Data Size (# Frames) | MI | ID | PI |
|---|---|---|---|
| 1 | 0 | 0 | - |
|  | 0 | ... | ... |
|  | 1 | 10 | 1 |
|  | 0 | 11 | - |
|  | 0 | ... | ... |
|  | 0 | n | - |

1906 RX 3

| Data Size (# Frames) | MI | ID | PI |
|---|---|---|---|
| 1 | 0 | 0 | - |
|  | 0 | ... | ... |
|  | 1 | 10 | 2 |
|  | 0 | 11 | - |
|  | 0 | ... | ... |
|  | 0 | n | - |

1908 RX 4

| Data Size (# Frames) | MI | ID | PI |
|---|---|---|---|
| 2 | 0 | 0 | - |
|  | 0 | ... | ... |
|  | 1 | 10 | 3 |
|  | 0 | 11 | - |
|  | 0 | ... | ... |
|  | 0 | n | - |

1910 RX 5

| Data Size (# Frames) | MI | ID | PI |
|---|---|---|---|
| 6 | 0 | 0 | - |
|  | 0 | ... | ... |
|  | 1 | 10 | 0 |
|  | 0 | 11 | - |
|  | 0 | ... | ... |
|  | 0 | n | - |

1912 RX 6

| Data Size (# Frames) | MI | ID | PI |
|---|---|---|---|
| 2 | 0 | 0 | - |
|  | 0 | ... | ... |
|  | 1 | 10 | - |
|  | 0 | 11 | 1 |
|  | 0 | ... | ... |
|  | 0 | n | - |

FIG. 19

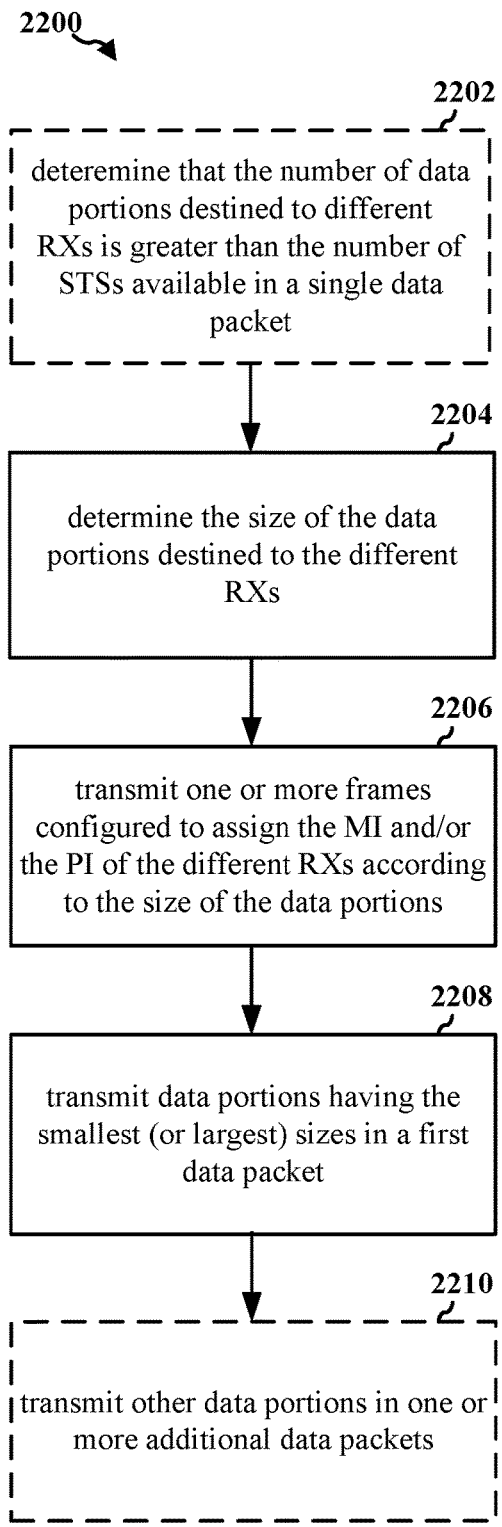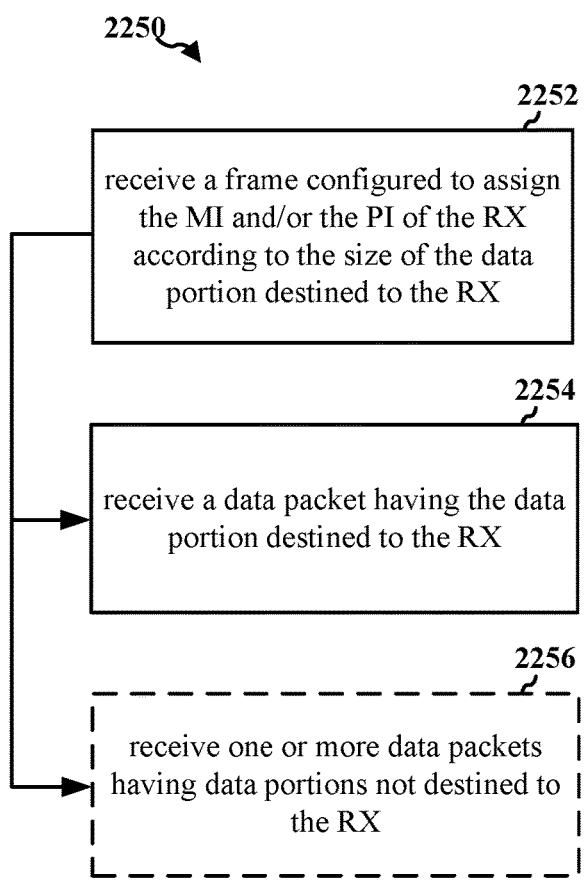
FIG. 22A
FIG. 22B

2302 RX 1

| Data Size (# Frames) | MI | ID | PI |
|---|---|---|---|
| | 0 | 0 | - |
| | 0 | ... | ... |
| 6 | 0 | 10 | - |
| | 1 | 11 | 0 |
| | 0 | ... | ... |
| | 0 | n | - |

2304 RX 2

| Data Size (# Frames) | MI | ID | PI |
|---|---|---|---|
| | 0 | 0 | - |
| | 0 | ... | ... |
| 1 | 1 | 10 | 0 |
| | 0 | 11 | - |
| | 0 | ... | ... |
| | 0 | n | - |

2306 RX 3

| Data Size (# Frames) | MI | ID | PI |
|---|---|---|---|
| | 0 | 0 | - |
| | 0 | ... | ... |
| 1 | 1 | 10 | 1 |
| | 0 | 11 | - |
| | 0 | ... | ... |
| | 0 | n | - |

2308 RX 4

| Data Size (# Frames) | MI | ID | PI |
|---|---|---|---|
| | 0 | 0 | - |
| | 0 | ... | ... |
| 2 | 1 | 10 | 2 |
| | 0 | 11 | - |
| | 0 | ... | ... |
| | 0 | n | - |

2310 RX 5

| Data Size (# Frames) | MI | ID | PI |
|---|---|---|---|
| | 0 | 0 | - |
| | 0 | ... | ... |
| 6 | 1 | 10 | 1 |
| | 0 | 11 | - |
| | 0 | ... | ... |
| | 0 | n | - |

2312 RX 6

| Data Size (# Frames) | MI | ID | PI |
|---|---|---|---|
| | 0 | 0 | - |
| | 0 | ... | ... |
| 2 | 1 | 10 | 3 |
| | 0 | 11 | - |
| | 0 | ... | ... |
| | 0 | n | - |

| Data Size (# Frames) | QoS | MI | ID | PI |
|---|---|---|---|---|
| 6 | 6 | 0 | 0 | - |
| | | 0 | ... | ... |
| | | 1 | 10 | 0 |
| | | 1 | 11 | 0 |
| | | 0 | ... | ... |
| | | 0 | $n$ | - |

2904 RX 2

| Data Size (# Frames) | QoS | MI | ID | PI |
|---|---|---|---|---|
| 1 | 5 | 0 | 0 | - |
| | | 0 | ... | ... |
| | | 1 | 10 | 1 |
| | | 0 | 11 | - |
| | | 0 | ... | ... |
| | | 0 | $n$ | - |

2906 RX 3

| Data Size (# Frames) | QoS | MI | ID | PI |
|---|---|---|---|---|
| 2 | 3 | 0 | 0 | - |
| | | 0 | ... | ... |
| | | 0 | 10 | - |
| | | 1 | 11 | 1 |
| | | 0 | ... | ... |
| | | 0 | $n$ | - |

2908 RX 4

| Data Size (# Frames) | QoS | MI | ID | PI |
|---|---|---|---|---|
| 1 | 4 | 0 | 0 | - |
| | | 0 | ... | ... |
| | | 1 | 10 | 2 |
| | | 0 | 11 | - |
| | | 0 | ... | ... |
| | | 0 | $n$ | - |

2910 RX 5

| Data Size (# Frames) | QoS | MI | ID | PI |
|---|---|---|---|---|
| 6 | 1 | 0 | 0 | - |
| | | 0 | ... | ... |
| | | 1 | 10 | 3 |
| | | 1 | 11 | 3 |
| | | 0 | ... | ... |
| | | 0 | $n$ | - |

2912 RX 6

| Data Size (# Frames) | QoS | MI | ID | PI |
|---|---|---|---|---|
| 2 | 2 | 0 | 0 | - |
| | | 0 | ... | ... |
| | | 0 | 10 | - |
| | | 1 | 11 | 2 |
| | | 0 | ... | ... |
| | | 0 | $n$ | - |

FIG. 29

APPARATUSES, METHODS, AND COMPUTER PROGRAM PRODUCTS FOR COMMUNICATION

CROSS-REFERENCE TO RELATED APPLICATIONS

The present application is a continuation application of and claims the benefit of and right of priority to U.S. patent application Ser. No. 15/859,690, titled "APPARATUSES, METHODS, AND COMPUTER PROGRAM PRODUCTS FOR COMMUNICATION," filed Jan. 1, 2018, currently pending, which is a continuation application of and claims the benefit of and right of priority to U.S. patent application Ser. No. 15/277,633, titled "APPARATUSES, METHODS, AND COMPUTER PROGRAM PRODUCTS FOR COMMUNICATION," filed Sep. 27, 2016, later issued as U.S. Pat. No. 9,860,036, which is a continuation application of and claims the benefit of and right of priority to U.S. patent application Ser. No. 15/005,849, titled "APPARATUSES, METHODS, AND COMPUTER PROGRAM PRODUCTS FOR COMMUNICATION," filed Jan. 25, 2016, later issued as U.S. Pat. No. 9,860,034, which is a continuation application of and claims the benefit of and right of priority to U.S. patent application Ser. No. 14/518,576, titled "APPARATUSES, METHODS, AND COMPUTER PROGRAM PRODUCTS FOR COMMUNICATION," filed Oct. 20, 2014, later issued as U.S. Pat. No. 9,247,456, which is a continuation application of and claims the benefit of and right of priority to U.S. patent application Ser. No. 14/040,731, titled "APPARATUSES, METHODS, AND COMPUTER PROGRAM PRODUCTS FOR COMMUNICATION," filed Sep. 30, 2013, later issued as U.S. Pat. No. 8,867,642, the entirety of all of which is hereby expressly incorporated by reference herein.

SUMMARY

This disclosure relates, generally, to communication and, more specifically, to apparatuses, methods, and computer program products for communication.

An aspect of an apparatus is disclosed. An apparatus for communication may include a processing system configured to receive a frame configured to assign at least member information or position information for one or more identifiers, and receive a data packet associated with a particular identifier and indicating a number of space-time streams for one or more position information.

Another aspect of an apparatus is disclosed. An apparatus for communication may include means for receiving a frame configured to assign at least member information or position information for one or more identifiers, and means for receiving a data packet associated with a particular identifier and indicating a number of space-time streams for one or more position information.

An aspect of a method is disclosed. A method of communication may include receiving a frame configured to assign at least member information or position information for one or more identifiers, and receiving a data packet associated with a particular identifier and indicating a number of space-time streams for one or more position information.

An aspect of a computer program product is disclosed. A computer program product for an apparatus configured for communication may include non-transitory computer-readable medium comprising code executable by one or more processors for receiving a frame configured to assign at least member information or position information for one or more identifiers, and receiving a data packet associated with a particular identifier and indicating a number of space-time streams for one or more position information.

Another aspect of an apparatus is disclosed. An apparatus for communication may include a processing system configured to transmit a frame configured to assign at least member information or position information for one or more identifiers, and transmit a data packet associated with a particular identifier and indicating a number of space-time streams for one or more position information.

Another aspect of an apparatus is disclosed. An apparatus for communication may include means for transmitting a frame configured to assign at least member information or position information for one or more identifiers, and means for transmitting a data packet associated with a particular identifier and indicating a number of space-time streams for one or more position information.

Another aspect of a method is disclosed. A method of communication may include transmitting a frame configured to assign at least member information or position information for one or more identifiers, and transmitting a data packet associated with a particular identifier and indicating a number of space-time streams for one or more position information.

Another aspect of a computer program product is disclosed. A computer program product for an apparatus configured for communication may include non-transitory computer-readable medium comprising code executable by one or more processors for transmitting a frame configured to assign at least member information or position information for one or more identifiers, and transmitting a data packet associated with a particular identifier and indicating a number of space-time streams for one or more position information.

Other aspects of apparatuses, methods, and computer program products described herein will become readily apparent to those skilled in the art based on the following detailed description wherein various aspects of apparatuses, methods, and computer program products are shown and described by way of illustration and/or written description. These aspects may be implemented in many different forms and its details may be modified in various ways without deviating from the scope of the claims or the disclosure provided herein. Accordingly, the drawings and detailed description provided herein shall be regarded as non-limiting illustrations/descriptions and not in any way restricting the scope of the claims.

BRIEF DESCRIPTION OF THE DRAWINGS

Various aspects of apparatuses, methods, and computer program products will be presented in the detailed description by way of example, and not by way of limitation, with reference to the accompanying drawings. The drawings provide non-limiting examples of various aspects that may be associated with the present disclosure, but the drawing are not to be construed as limiting any feature of the present disclosure. The word "example" or "exemplary" may be used herein to mean "serving as a non-limiting example, instance, or illustration." Any aspect, embodiment, and/or configuration described herein as "exemplary" or an "example" shall not necessarily be construed as preferred or advantageous over other aspects, configurations, and/or configurations.

FIG. 1 illustrates an example of a network including a transmitter and one or more receivers.

FIG. 10A illustrates additional examples of various transmissions/receptions.

FIG. 10B illustrates an example of a frame.

FIG. 10C illustrates an example of a portion of a data packet.

FIG. 14 illustrates an example of a configuration of various receivers.

FIGS. 16A and 16B illustrates examples of various methods of communication.

FIG. 17 illustrates an example of a configuration of various receivers.

FIG. 19 illustrates an example of a configuration of various receivers.

FIGS. 22A and 22B illustrate examples of various methods of communication.

FIG. 23 illustrates an example of a configuration of various receivers.

FIG. 29 illustrates an example of a configuration of various receivers.

DETAILED DESCRIPTION

Figure 2:
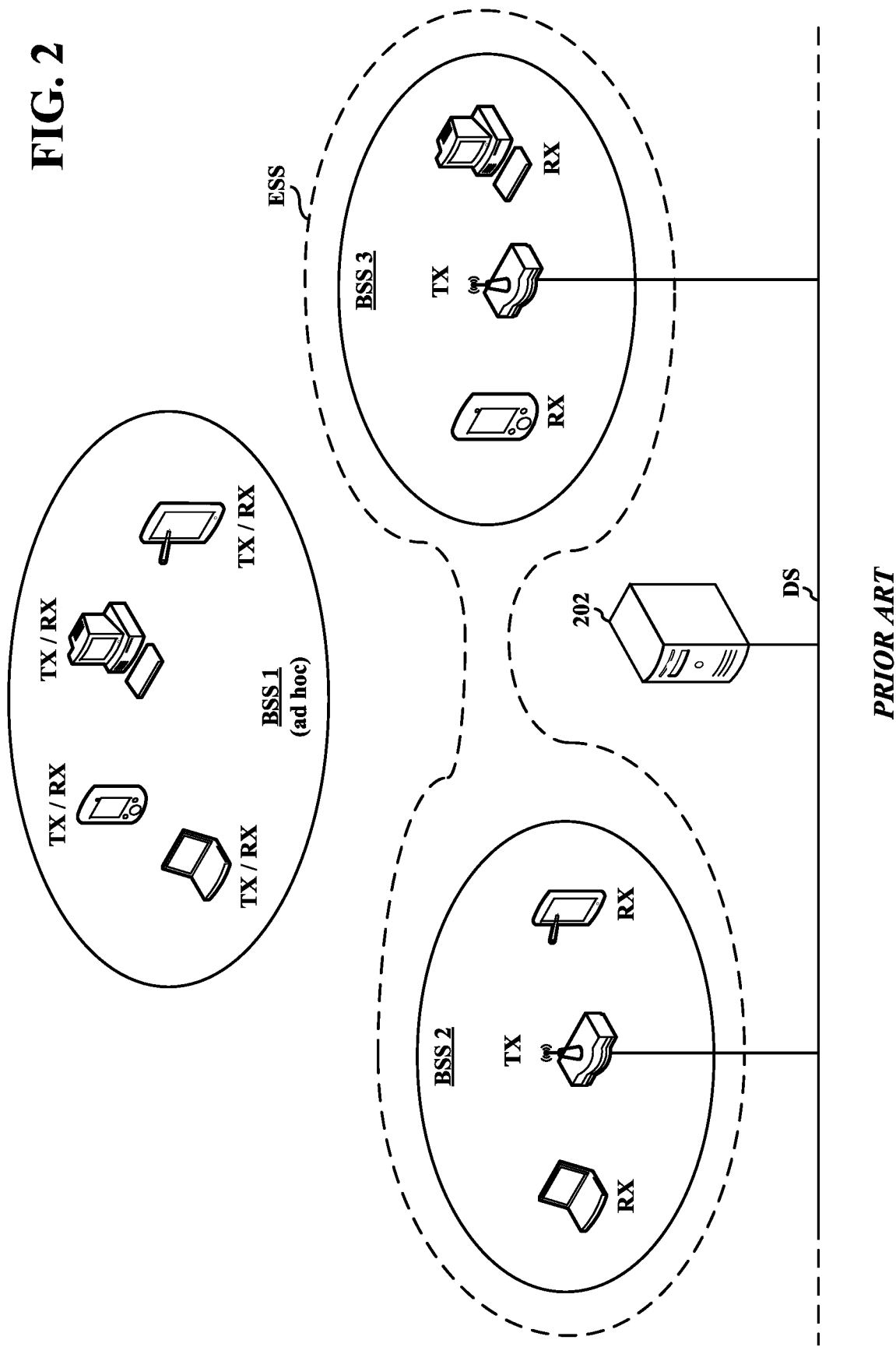
FIG. 2 illustrates an example of various basic service sets.

The detailed description set forth infra in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

FIG. 1 illustrates an example network including a transmitter (e.g., TX) and one or more receivers (e.g., RXs). The network may exist in a residential environment 102, a commercial environment 104, and/or a public environment 106. A residential environment 102 may include a house, an apartment, a condominium, a townhome, and/or any other environment wherein the apparatuses, methods, and/or computer program products disclosed herein may implemented. A commercial environment 104 may include a business office, a medical office, a dental office, a hotel, a retail store, a restaurant, a coffee shop, and/or any other environment wherein the apparatuses, methods, and/or computer program products disclosed herein may implemented. A public environment 106 may include a park, a municipal office, a municipal building, a parking area, a train station, a train, an airport, an airplane, a bus station, a bus, a subway station, a subway, a harbor, a terminal, a port, a ferry, a cruise ship, and/or any other environment wherein the apparatuses, methods, and/or computer program products disclosed herein may implemented.

In some configurations, a transmitter may be an access point (AP). In some configurations, a receiver may be an AP. In some configurations, a transmitter may provide Internet access. In some configuration, a receiver may provide Internet access. In some configurations, a receiver may be a laptop computer, a mobile phone, a handset device, a smartphone, a tablet device, a desktop computer, a computer display, a projector, a device used to receive payments, a television display, a camera, a video-recorder, a fax/facsimile machine, a printer, a scanner, a router, a base station, and/or any software and/or hardware module and/or component of any one or more of the foregoing apparatuses, whether communicating with the transmitter via a wire or wirelessly. However, these are non-limiting examples of a receiver. Any apparatus that receives a signal may be a receiver. In some configurations, a transmitter may be a router, an access point, a base station, a transmitter in an ad hoc network, a computing device, and/or any software and/or hardware module and/or component of any one or more of the foregoing apparatuses, whether communicating with the receiver via a wire or wirelessly. However, these are non-limiting examples of a transmitter. Any apparatus that transmits a signal may be a transmitter.

In the example illustrated in FIG. 1, the network includes a BSS. Receivers within a coverage area 108 and forming some sort of association with each other may form a BSS. In some configurations, a transmitter may be located in the BSS. In the example illustrated in FIG. 1, the transmitter provides Internet access to one or more of receivers. Accordingly, the coverage area 108 of the BSS is based on the coverage area of the transmitter. However, one of ordinary skill in the art will appreciate that this is not a limiting configuration of the present disclosure. Although FIG. 1 illustrates one transmitter and a number of receivers in the BSS, it will be understood by one of ordinary skill in the art that a fewer or a greater number of transmitters and/or receivers may be implemented in the BSS without deviating from the scope of the claims or disclosure provided herein.

It will also be understood by one of ordinary skill in the art that not all of the receivers illustrated in FIG. 1 need to form an association with the transmitter in order to form the BSS. For example, a BSS may include one transmitter and one receiver. As another example, a BSS may include more than one transmitter and/or more than one receiver.

FIG. 2 illustrates an example of various BSSs. For illustrative purposes, the visual depiction of each BSS includes different types of receivers; however, it will be understood by one of ordinary skill in the art that each BSS may include different types and/or quantities of receivers without deviating from the scope of the claims or disclosure provided herein.

BSS 1 is an example of an ad hoc network. A transmitter/receiver (e.g., TX/RX) may be an apparatus configured to perform peer-to-peer communication. A transmitter/receiver may be configured to perform transmission and/or reception. In BSS 1, a transmitter/receiver may not be an AP and therefore may not provide Internet access. As illustrated in FIG. 2, the coverage area of BSS 1 (ad hoc) may be based on the coverage area of the transmitters/receivers.

BSS 2 and BSS 3 may include a transmitter (e.g., TX), which may be a central station dedicated to manage the BSS and/or provides Internet access to at least one receiver (e.g., RX) in the coverage area of the respective BSS. A BSS including a transmitter may be referred to as an infrastructure BSS, as depicted in BSS 2 and BSS 3. Infrastructure BSSs may be interconnected via their respective transmitters through a distribution system (DS). The DS may be an Ethernet connection. Infrastructure BSSs interconnected by the DS may form an extended service set (ESS). Stations within the ESS may be able to address each other directly at the media access control (MAC) layer. The DS may include a server 202.

Figure 3:
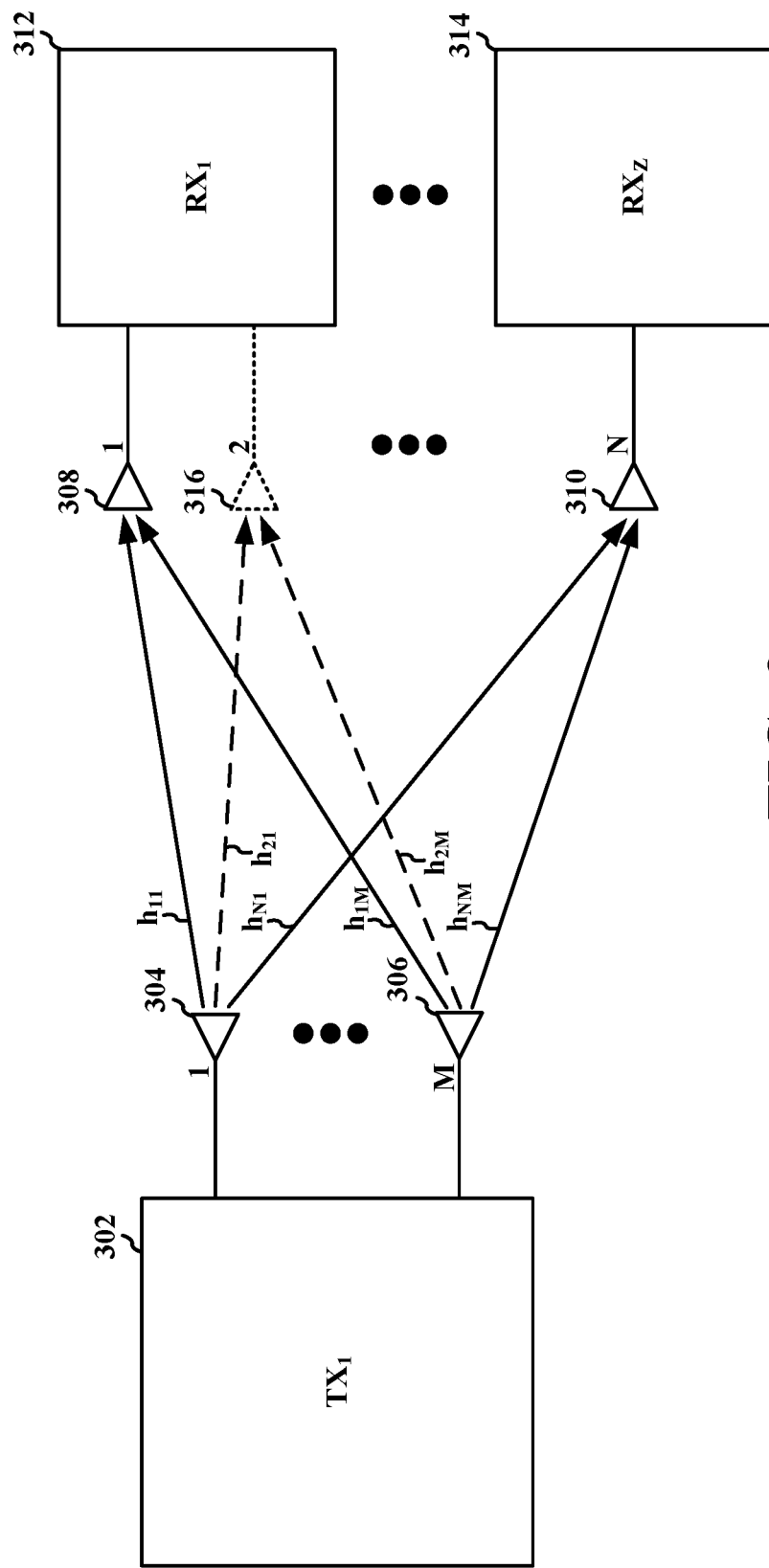
FIG. 3 illustrates an example of various transmissions/receptions.

FIG. 3 illustrates an example of various transmissions/receptions. An example of a transmission/reception may involve a transmitter (e.g., $TX_1$ 302) and one or more receivers (e.g., $RX_1$ 312 through $RX_Z$ 314). A transmitter may have one or more antennas configured for transmission. For example, in some configurations, the transmitter may have one antenna (e.g., antenna 304). In some configurations, the transmitter may have M number of antennas (e.g., antenna 304 through antenna 306), where M is an integer greater than one.

A receiver may have one or more antennas configured for reception. One or more receivers (e.g., $RX_1$ 312 through $RX_Z$ 314) may receive the transmission from a transmitter (e.g., $TX_1$ 302). In some configurations, a receiver (e.g., $RX_1$ 312) may have one antenna (e.g., antenna 308). In some configurations, a receiver (e.g., $RX_1$ 312) may have two antennas (e.g., antennas 308, 316). In some configurations, although not illustrated in FIG. 3, a receiver may have more than two antennas.

One or more receivers may be associated with one or more users. In some configurations, each receiver may be associated with a different user (e.g., $RX_1$ may be associated with $User_1$, and $RX_Z$ may be associated with $User_Z$). In some configurations, more than one receiver may be associated with a single user (e.g., $RX_1$ through $RX_Z$ may be associated with $User_1$).

It will be understood by one of ordinary skill in the art that a fewer or greater number of transmitters and/or receivers may be implemented in the example transmission/reception without deviating from the scope of the claims or disclosure provided herein.

As illustrated in FIG. 3, a transmitter may simultaneously transmit independent data streams to multiple receivers. For example, antenna 304 of $TX_1$ 302 may simultaneously transmit data stream $h_{11}$ to antenna 308 of $RX_1$ 312 and data stream $h_{N1}$ to antenna 310 of $RX_Z$ 314. Also, antenna 306 of $TX_1$ 302 may simultaneously transmit data stream him to antenna 308 of $RX_1$ 312 and data stream $h_{NM}$ to antenna 310 of $RX_Z$ 314.

If a receiver has more than one antenna, a transmitter may simultaneously transmit another data stream to that/those additional antenna(s). For example, simultaneous with the foregoing transmissions, antenna 304 of $TX_1$ 302 may simultaneously transmit data stream $h_{21}$ to antenna 316 of $RX_1$ 312, and antenna 306 of $TX_1$ 302 may simultaneously transmit data stream $h_{2M}$ to antenna 316 of $R_{X1}$ 312.

Accordingly, one or more data streams may be destined to one or more receivers, each of which may be associated with one or more users. In some configurations, each data stream may be destined to a different receiver, and each receiver may be associated with a different user. In other configurations, two or more data streams may be destined to a single receiver, and that receiver may be associated with a single user. In yet other configurations, two or more data streams may be destined to two or more receivers, and each of those receivers may be associated with a single user. Other configurations will be readily apparent to one of ordinary skill in the art and therefore are within the scope of the present disclosure.

Figure 4:
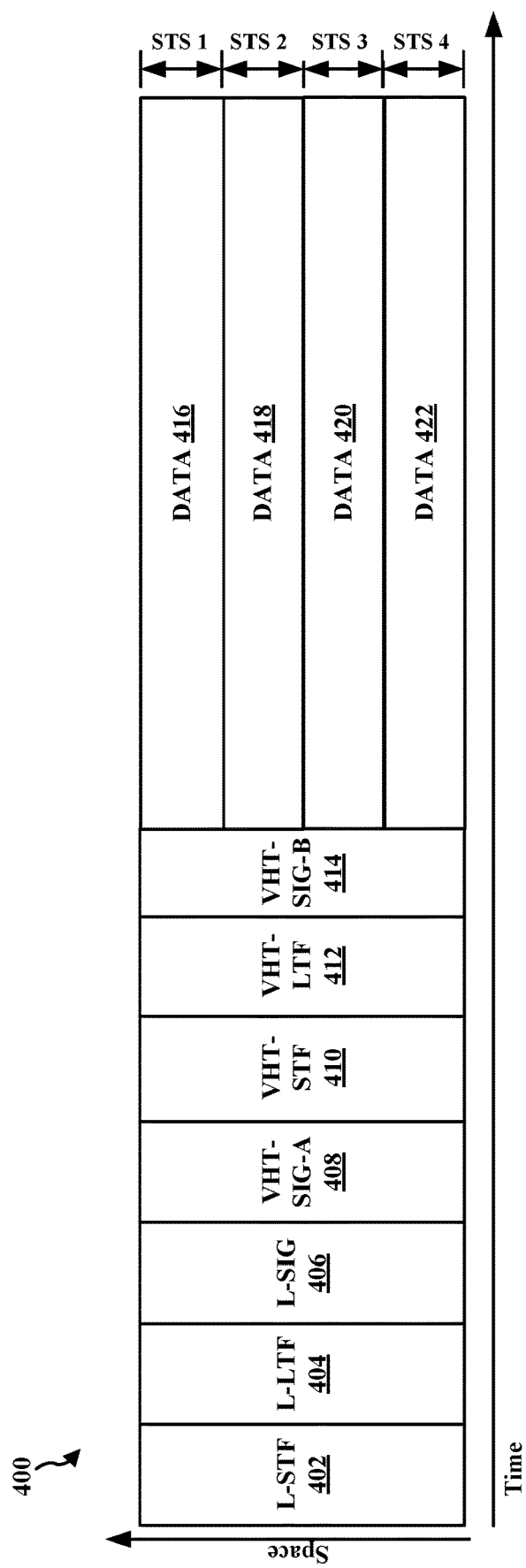
FIG. 4 illustrates an example of a data packet.

FIG. 4 illustrates an example data packet 400. The data packet 400 may be a very high throughput (VHT) physical layer convergence procedure (PLCP) protocol data unit (PPDU). The data packet 400 may include various fields. Some of the fields may include non-high throughput (non-HT) short training field (L-STF) 402, non-HT long training field (L-LTF) 404, non-HT signal field (L-SIG) 406, VHT Signal A field (VHT-SIG-A) 408, VHT short training field (VHT-STF) 410, VHT long training field (VHT-LTF) 412, and VHT Signal B field (VHT-SIG-B) 414.

The data packet 400 may also include data portions in one or more space-time streams (STSs). One of ordinary skill in the art will understand and appreciate that anything described herein as a 'data portion' and/or 'data' may, alternatively, be known as 'payload,' 'actual data,' and/or 'body data.' The foregoing may include the body or cargo of the data being transmitted and/or received and may refer to the portion of a data packet that excludes overhead data, metadata, and/or headers. Accordingly, because one of ordinary skill in the art appreciates and understands that the foregoing terms may be used interchangeably with reference to a similar concept, the examples, descriptions and/or illustrations provided herein shall not be construed to limit the scope of the claims or disclosure provided herein.

In the example illustrated in FIG. 4, the data packet 400 includes four (4) space-time streams (STSs); however, one of ordinary skill in the art will appreciate that the data packet 400 may include a fewer or a greater number of space-time streams without deviating from the scope of the claims or the disclosure provided herein. In FIG. 4, the data portions of the different space-time streams are illustrated as data 416, 418, 420, 422. The data 416, 418, 420, 422 may each carry one or more PLCP service data units (PSDUs). The data 416, 418, 420, 422 may each be associated with a different space-time stream. For example, data 416 may be associated with a first space-time stream (e.g., STS 1), data 418 may be associated with a second space-time stream (e.g., STS 2), data 420 may be associated with a third space-time stream (e.g., STS 3), and data 422 may be associated with a fourth space-time stream (e.g., STS 4).

The data packet 400 may be a single-user (SU) data packet or a multi-user (MU) data packet. A single-user data packet may be addressed or destined to one receiver and/or one user. A multi-user data packet may be addressed or destined to more than one receiver and/or more than one user. The example data packet 400 illustrated in FIG. 4 is a multi-user data packet having four space-time streams (e.g., STS 1, STS 2, STS 3, STS 4). Although not illustrated in FIG. 4, it will be understood by one of ordinary skill in the art that the data packet 400 may, in some configurations, be a single-user data packet without deviating from the scope of the claims or the disclosure provided herein. It will also be understood by one of ordinary skill in the art that any other number of space-time streams may be included in the data packet 400 without deviating from the scope of the present disclosure. For example, in some configurations, the data packet 400 may have up to eight space-time streams. In some other configurations, the data packet may have one space-time stream. Other configurations of STSs will be readily apparent to one of ordinary skill in the art.

Various data packets may have different formats. Accordingly, a transmitter may need to differentiate the format of a data packet to be transmitted. Also, a receiver may need to differentiate the format of a data packet that is received. Differentiating the format of the data packet may be useful for processing, encoding, decoding, modulating and/or demodulating the data packet.

Figures 5A, 5B:
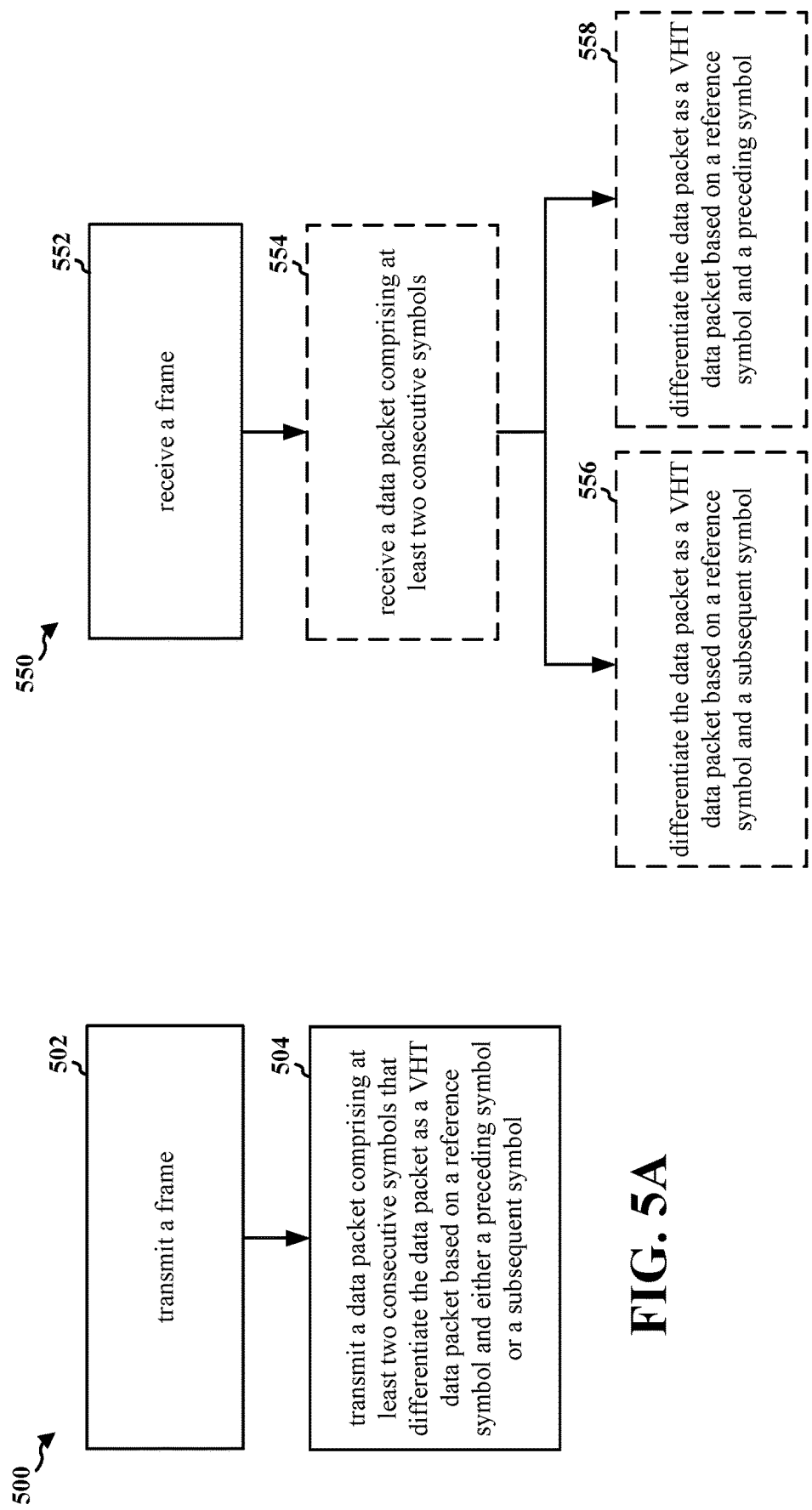
FIGS. 5A and 5B illustrate examples of various methods of communication.

FIGS. 5A-5B illustrate example methods of communication. In some configurations, a transmitter may perform the method 500 illustrated in FIG. 5A. At 502, the transmitter may transmit a frame. For example, referring to FIG. 10A, the TX may transmit the frame 800 to RX. The transmitter may transmit more than one frame to more than one receiver at various times. Each frame may be individually addressed to a particular receiver. Different frames may be transmitted at different times. For example, referring to FIG. 8, the TX may transmit the frame 800-1 to RX 1 at time $t_1$ and transmit the frame 800-2 to RX 2 at time $t_2$. In this example, the frame 800-1 is addressed to RX 1, and the frame 800-2 is addressed to RX 2.

Figure 6:
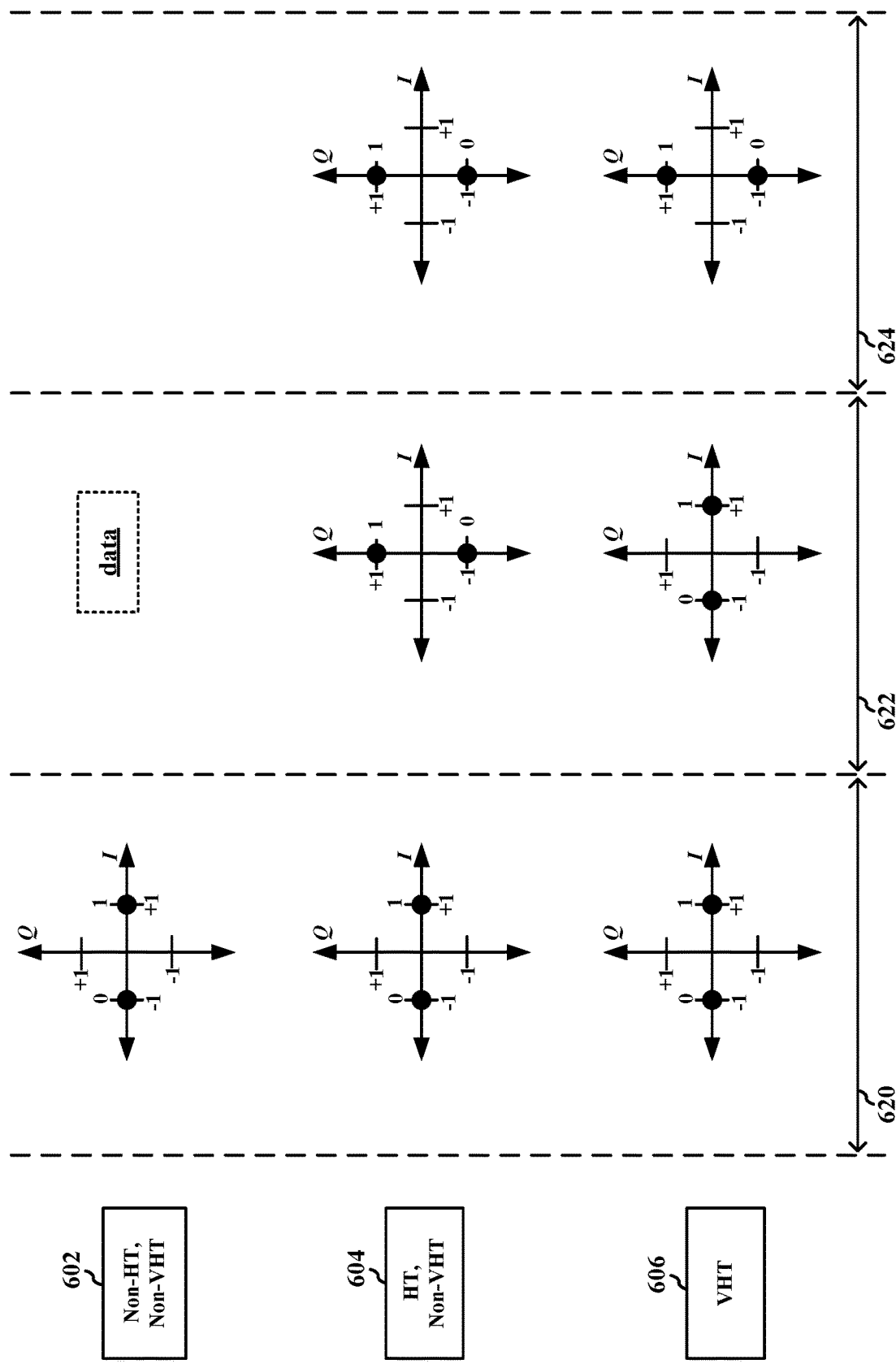
FIG. 6 illustrates examples of symbols in a data packet.

Referring back to FIG. 5A, at 504, the transmitter may transmit a data packet comprising at least two consecutive symbols that differentiate the data packet as a VHT data packet based on a reference symbol and either a preceding symbol or a subsequent symbol. FIG. 6 illustrates example symbols in the data packet. For example, referring to FIG. 6, the transmitter may transmit the following consecutive symbols: symbol 620, symbol 622, and symbol 624.

Referring back to FIG. 4, such symbols may be included in one or more of the fields 402, 404, 406, 408, 410, 412, and/or 414. In some configurations, the symbols 620, 622, 624 are included in L-STF 402. In some configurations, the symbols 620, 622, 624 are included in the L-LTF 404. In some configurations, the symbols 620, 622, 624 are included in L-SIG 406. In some configurations, the symbols 620, 622, 624 are included in the VHT-SIG-A 408. In some configurations, the symbols 620, 622, 624 are included in VHT-STF 410. In some configurations, the symbols 620, 622, 624 are included in VHT-LTF 412. In some configurations, the symbols 620, 622, 624 are included in VHT-SIG-B 414. In some configurations, the symbols 620, 622, 624 are included in at least data 416, data 418, data 420, and/or data 422.

As described supra, the data packet may be one of (at least) three format types: non-HT, non-VHT format 602; HT, non-VHT format 604; or VHT format 606. The specific configuration of the IQ plots of the symbols 620, 622, 624 may differentiate the data packet 400 among the different format types, as described in further detail infra.

One modulation technique is called 'IQ Modulation,' where 'I' may refer to an 'in-phase' component of the waveform, and 'Q' may represent the 'quadrature' component. In an aspect, IQ modulation is an efficient way to transfer information. A carrier may be modulated with a waveform that changes the carrier frequency. Accordingly, the modulating signal may be treated as a phasor. A receiver that receives a signal may decipher information by reading the 'I' and 'Q' components of the signal. Additional aspects of IQ modulation are readily apparent to one of ordinary skill in the art.

In some configurations, a receiver may perform the method 550 illustrated in FIG. 5B. Referring to FIG. 5B, at 552, a receiver may receive the frame and, at 554, the receiver may receive a data packet comprising at least two consecutive symbols. The at least two consecutive symbols may include a reference symbol and at least a preceding symbol or a subsequent symbol.

At 556, the receiver may differentiate the data packet as a VHT data packet based on a reference symbol and a subsequent symbol. For example, referring to FIG. 6, the reference symbol may be the symbol 622, and the subsequent symbol may be the symbol 624.

In some configurations, the receiver may differentiate the data packet as a VHT data packet rather than a non-VHT data packet when the subsequent symbol (e.g., symbol 624) is modulated using quadrature binary phase shift keying (QBPSK). As illustrated in FIG. 6, the symbol 624 in VHT format 606 is QBPSK-modulated. However, the symbol 624 in non-VHT format 604 may not be QBPSK-modulated. Also, the symbol 624 in non-VHT format 602 may not be QBPSK-modulated.

In some configurations, the receiver may differentiate the data packet as a VHT data packet rather than a non-VHT data packet when the subsequent symbol (e.g., symbol 624) has a 90° counter-clockwise rotation relative to the reference symbol (e.g., symbol 622). For example, referring to FIG. 6, the symbol 624 in VHT format 606 has a 90° counter-clockwise rotation relative to the symbol 622 in the (same) VHT format 606. In comparison, the symbol 624 in non-VHT format 604 may not have a 90° counter-clockwise rotation relative to the symbol 622 in the (same) non-VHT format 604. Also, the symbol 624 in non-VHT format 602 may not have a 90° counter-clockwise rotation relative to the symbol 622 in the (same) non-VHT format 602.

Referring back to FIG. 5B, at 558, the receiver may differentiate the data packet as a VHT data packet based on a reference symbol and a preceding symbol. For example, referring to FIG. 6, the reference symbol may be the symbol 622, and the preceding symbol may be the symbol 620.

In some configurations, the receiver may differentiate the data packet as a VHT data packet rather than a non-VHT data packet when the reference symbol (e.g., symbol 622) and the preceding symbol (e.g., symbol 620) are binary phase shift keying (BPSK)-modulated. For example, referring to FIG. 6, the symbol 622 in VHT format 606 is BPSK-modulated, and the symbol 620 in VHT format 606 is (also) BPSK-modulated. In comparison, the symbols 620, 622 in non-VHT format 604 may not both be BPSK-modulated. For example, the symbol 622 in non-VHT format 604 may be QBPSK-modulated (i.e., not BPSK-modulated). Also, the symbols 620, 622 in non-VHT format 602 may not both be BPSK-modulated.

In some configurations, the receiver may differentiate the data packet as a VHT data packet rather than a non-VHT data packet when the reference symbol (e.g., symbol 622) has no rotation relative to the preceding symbol (e.g., symbol 620). For example, referring to FIG. 6, the symbol 622 in the VHT format 606 has no rotation relative to the symbol 620 in the (same) VHT format 606. In comparison, the symbol 622 in non-VHT format 604 may have a 90° counter-clockwise rotation relative to the symbol 620 in the (same) non-VHT format 604. Also, the symbol 622 in non-VHT format 602 may have at least some rotation relative to the symbol 620 in the (same) non-VHT format 602.

Figure 7:
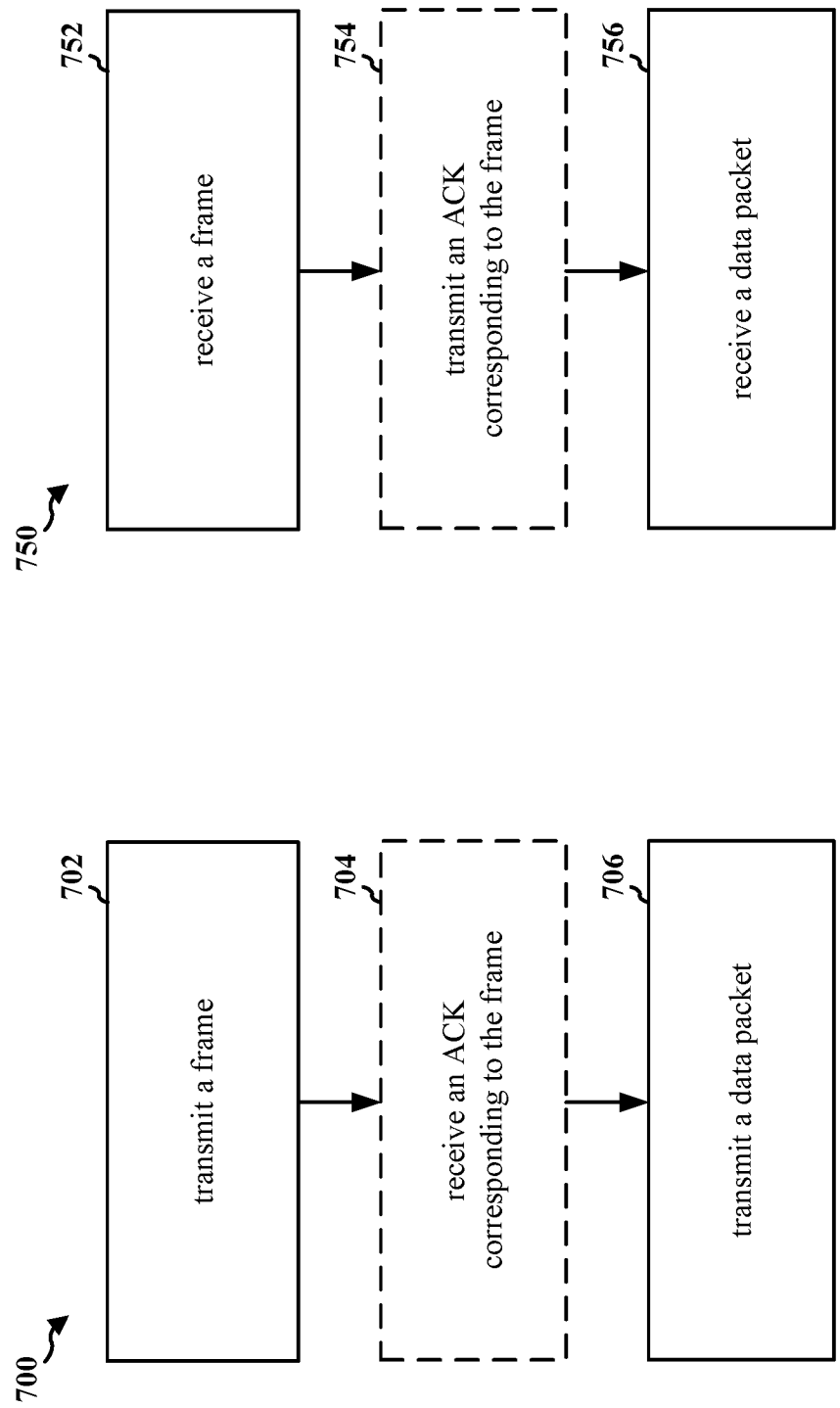
FIGS. 7A and 7B illustrate examples of various methods of communication.

FIGS. 7A and 7B illustrate example methods of communication. In some configurations, a transmitter may perform the method 700 illustrated in FIG. 7A. In some configurations, a receiver may perform the method 750 illustrated in FIG. 7B.

At 702, a transmitter may transmit a frame. In some configurations, the transmitter may transmit a frame configured to assign at least member information or position information for one or more identifiers. At 752, a receiver may receive the frame. In some configurations, the receiver may receive a frame configured to assign at least member information or position information for one or more identifiers. As described supra with reference to FIG. 10A, the TX may transmit the frame 800, and the RX may receive the frame 800.

Figure 8:
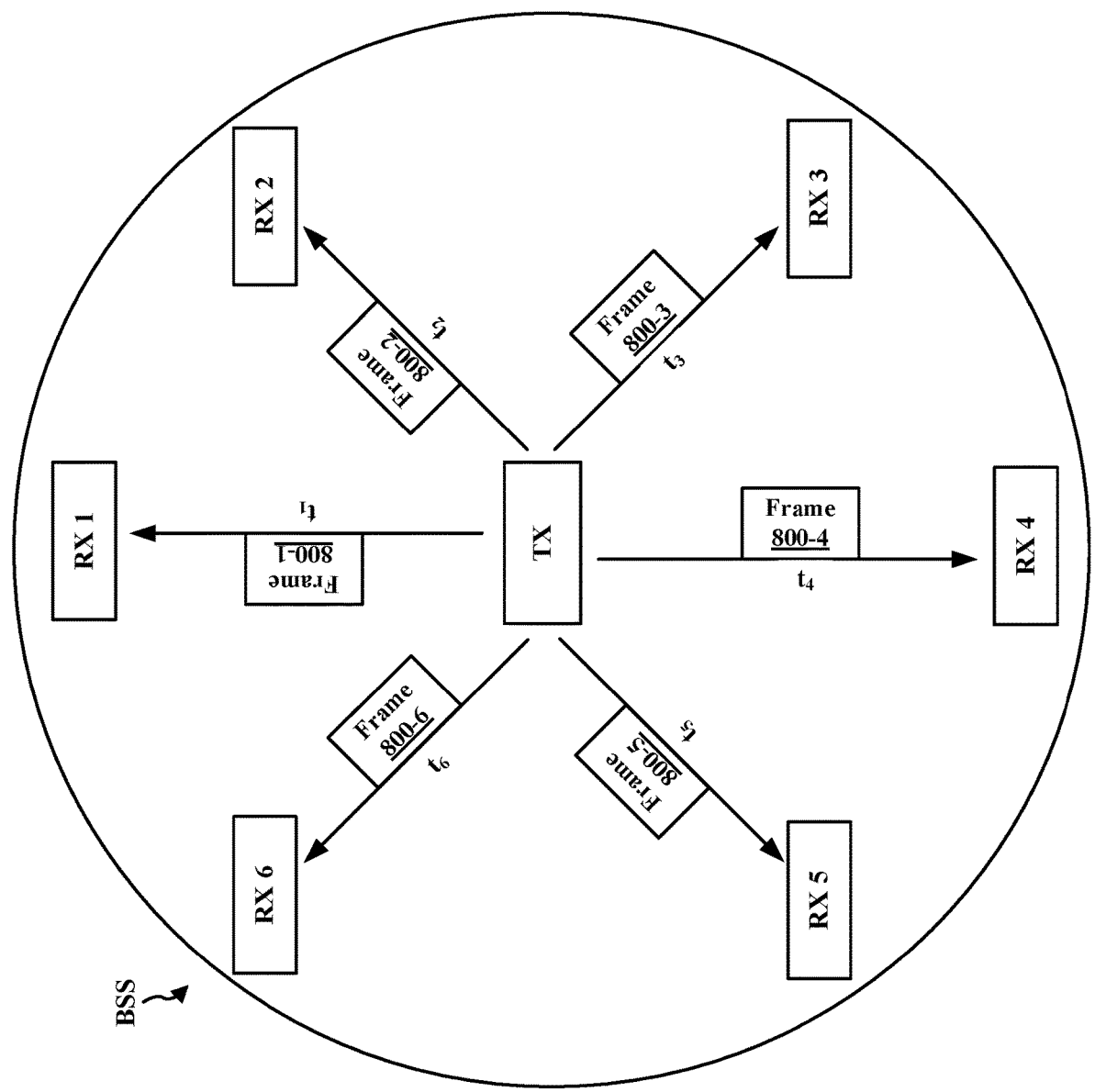
FIG. 8 illustrates an example of various transmissions/receptions of a frame.

FIG. 8 illustrates an example of transmissions/receptions of a frame. The transmitter (e.g. TX) may transmit one or more frames (e.g., frames 800-1 through 800-6) to one or more receivers (e.g., RXs 1-6) at various times. Each frame may be individually addressed to a particular receiver. In this example, the frame 800-1 is addressed to RX 1, and the frame 800-2 is addressed to RX 2. Different frames may be transmitted at different times. In some configurations, the transmitter may transmit a frame to a destination at a time that is different from a transmission time of a different frame addressed to a different destination. For example, referring to FIG. 8, the TX may transmit the frame 800-1 to RX 1 at time $t_1$ and transmit the frame 800-2 to RX 2 at time $t_2$. Accordingly, in some configurations, the receiver may receive the frame at a time that is different from a reception time of a different frame addressed to a different destination. For example, referring to FIG. 8, RX 1 may receive the frame 800-1 from TX at time $t_1$, and RX 2 may receive the frame 800-2 from TX at time $t_2$.

In some configurations, the transmitter may transmit the frame to the receiver after the receiver joins a basic service set (BSS) associated with the transmitter. Accordingly, the receiver may receive the frame from the transmitter after the receiver joins the BSS. For example, referring to FIG. 8, the TX may transmit a frame 800 to an RX after the RX joins the BSS.

The frame 800 may be provided at various rates. The frame 800 may be provided at various times. In some configurations, a TX may transmit a frame 800 to an RX at a constant rate (e.g., one frame every 1 second) after the RX joins the BSS. In some configurations, the transmitter may transmit the frame at a rate based on at least traffic patterns or channel characteristics. Accordingly, in some configurations, the receiver may receive the frame at a rate based on at least traffic patterns or channel characteristics.

For example, the TX may increase the rate of transmission of the frame (e.g., one frame every 0.5 seconds) when a channel characteristic indicates poor channel quality and, conversely, decrease the rate of transmission of the frame (e.g., to every 1.5 seconds) when a channel characteristic indicates good channel quality. Also, for example, a TX may increase the rate of transmission of the frame (e.g., one frame every 0.5 seconds) when the traffic patterns indicate low channel traffic and, conversely, decrease the rate of transmission of the frame (e.g., one frame every 1.5 seconds) when the traffic patterns indicate high channel traffic.

In some configurations, the frame may be configured to assign or change position information and/or member information of the receiver. For example, referring to FIG. 10B, the frame 800 may include member information (MI) 1006 and position information (PI) 1008.

The MI 1006 included in the frame 800 may indicate whether the receiver of the frame is a member of a group of recipients associated with a particular identifier (ID). The MI 1006 may include a single bit or symbol. A transmitter may transmit the frame 800 in order to assign or change the member information and/or position information of a receiver for one or more IDs.

If the receiver receiving the frame is not a member of the group of recipients associated with a particular ID value, the MI 1006 may have a first value (e.g., 0) in order to inform the receiver that that receiver is not a member of the group associated with that ID value. In comparison, if the receiver receiving the frame is a member of a group of recipients associated with a particular ID value, the MI 1006 may have a second value (e.g., 1) in order to inform that receiver that that receiver is a member of the group associated with that ID value.

If the receiver is a member of the group of receivers associated with a particular ID, then that receiver may also be assigned a position information (PI). To determine which of and/or how many space-time streams are destined to that particular receiver (rather than other receivers associated with the same ID), the receiver may use the PI 1008. The PI 1008 may provide the receiver with information to determine which of and/or how many space-time streams are destined to that particular receiver (rather than other receivers associated with the same ID).

Referring to FIG. 7B, at 754, the receiver may transmit an acknowledgement (ACK) in response to receiving the frame. Referring to FIG. 7A, at 704, the transmitter may receive the ACK in response to transmitting the frame. For example, referring to FIG. 10A, the RX may transmit the ACK 1002, and the TX may receive the ACK 1002. The ACK may indicate to the transmitter that the receiver to which the frame was addressed has successfully received the frame.

Referring to FIG. 7A, at 706, the transmitter may transmit a data packet. In some configurations, the data packet may be transmitted after receiving the ACK from the receiver. In some configurations, the data packet may be associated with a particular identifier and indicating a number of space-time streams for one or more position information, as described in further detail infra.

Referring to FIG. 7B, at 756, the receiver may receive the data packet. In some configurations, the data packet may be received after transmitting the ACK to the transmitter. In some configurations, the data packet may be associated with a particular identifier and indicating a number of space-time streams for one or more position information, as described in further detail infra.

Figure 9:
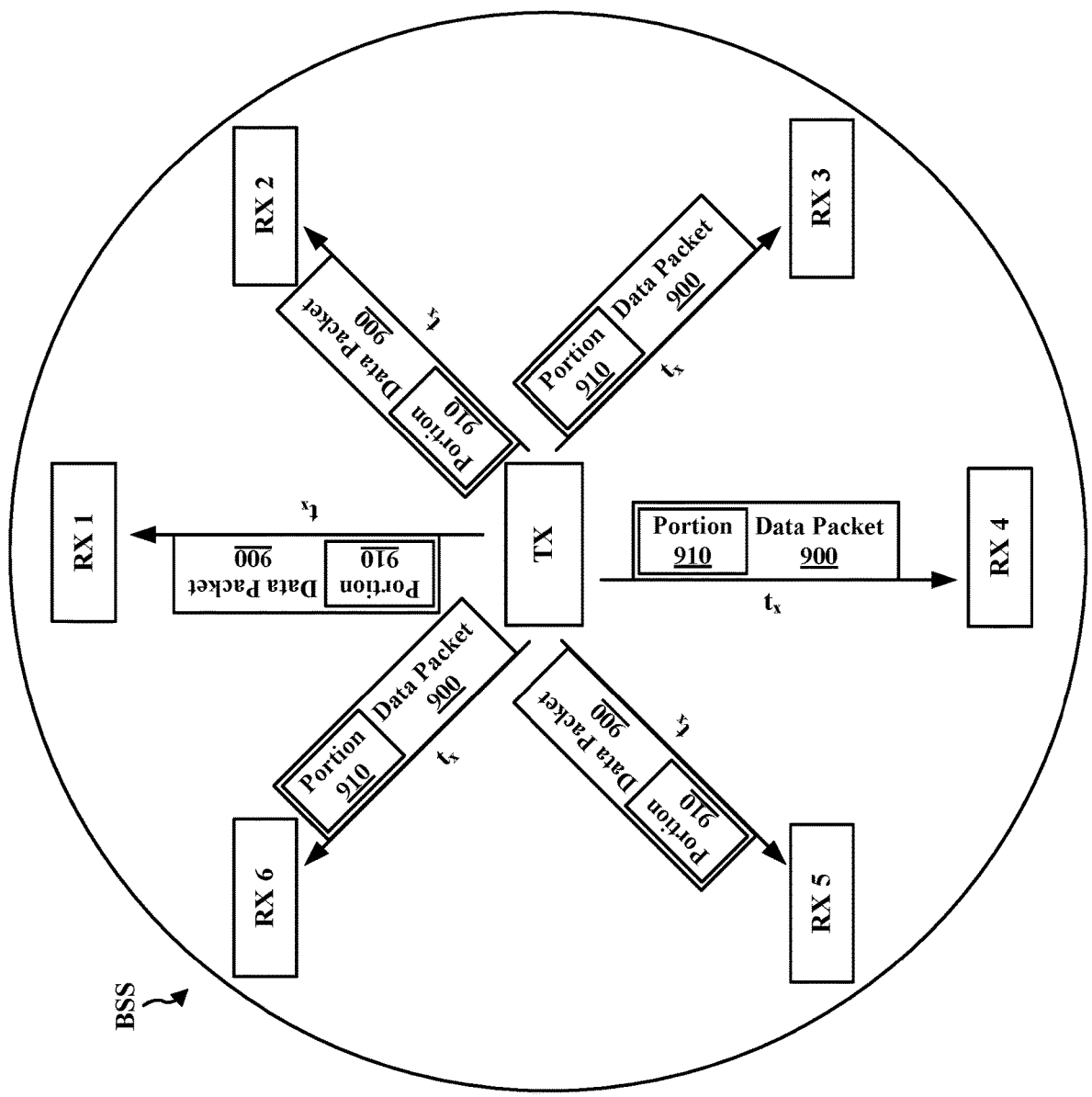
FIG. 9 illustrates an example of various transmissions/receptions of a data packet.

FIG. 9 illustrates an example of transmissions/receptions of a data packet. Referring to FIG. 9, the TX transmits the data packet 900, and various receivers (e.g., RXs 1-6) receive the data packet 900. The transmitter may transmit the data packet to one or more receivers at the same time. Accordingly, one or more receivers may receive the data packet at the same time. For example, referring to FIG. 9, the TX may transmit data packet 900 to RXs 1-6 at the same time (e.g., time $t_x$). In some configurations, the transmitter may transmit different data packets at different times.

As illustrated in FIGS. 9, 10A, 10C, the data packet 900 may include a portion 910. In some configurations, the portion 910 may include an ID field 1012, various N-fields 1014, 1016, 1018, 1020, and various other portions 1010, 1022. The ID field 1012 may include six bits or symbols. Each N-field 1014, 1016, 1018, 1020 may include three bits or symbols.

The value in the ID field 1012 may indicate whether the data packet 900 is a single-user data packet or multi-user data packet. A first subset of possible values (e.g., 1-62) in the ID field 1012 may indicate that the data packet 900 is a multi-user data packet. A second subset of possible values (e.g., 0 or 63) in the ID field 1012 may indicate that the data packet 900 is a single-user data packet.

If the value in the ID field 1012 is a value in the second subset of possible values (e.g., 0 or 63), thereby indicating that the data packet is a single-user data packet, the N-fields 1014, 1016, 1018, 1020 may include partial associated identifiers that provide an abbreviated indication of the intended recipient of the data packet 900. For example, the N-field 1014, 1016, 1018, 1020 may, collectively, indicate a number of space-time streams and the abbreviated indication of the intended recipient of the data packet.

If the value in the ID field 1012 is a value in the first subset of possible values (e.g., 1-62), thereby indicating that the data packet 900 is a multi-user data packet, the N-fields 1014, 1016, 1018, 1020 may indicate the number of data portions and/or space-time streams associated with a particular position information. In some configurations, the position information may be a two-bit value. For example, the position information may have a value of [00], [01], [10], or [11]. In some configurations, the position information may be a one-bit value. For example, the position information may have a value of [0], [1], [2], or [3]. In some configurations, the receiver may encode the two-bit value into/as a one-bit value.

As an example, a value of one (1) in N-field 1014 may indicate that one (1) space-time stream in the data packet 900 is destined to the receiver assigned position information [0]. As another example, a value of two (2) in N-field 1014 may indicate that two (2) space-time streams in the data packet 900 are destined to the receiver assigned position information [0].

As described supra, the portion 910 may indicate a number of space-time streams associated with the position information of a receiver. The position information may be associated with an identifier (ID). The number of space-time streams may be associated with the identifier (ID). As illustrated in FIG. 10C, the portion 910 indicates a number (N) of space-time streams associated with the position information (e.g., [0], [1], [2], [3]) of a receiver for a particular value in the ID field 1012. For example, for a particular value in the ID field 1012, the number (N) of space-time streams associated with PI values of [0], [1], [2], [3] is based on the value in the fields 1014, 1016, 1018, 1020, respectively.

Referring to FIGS. 10A-10C, the frame 800 may assign the MI 1006 and/or PI 1008 of a receiver. Based on the MI 1006 assigned by the frame 800, the receiver may determine whether that receiver are be a destination of any space-time stream included in a forthcoming data packet 900 associated with a particular ID 1012. If that receiver is a destination of any space-time stream included in that data packet 900, the PI 1008 may indicate which and/or how many of the space-time streams in that data packet 900 are destined to that particular receiver (rather than other receivers in the group of receivers associated with that particular ID).

Figure 11:
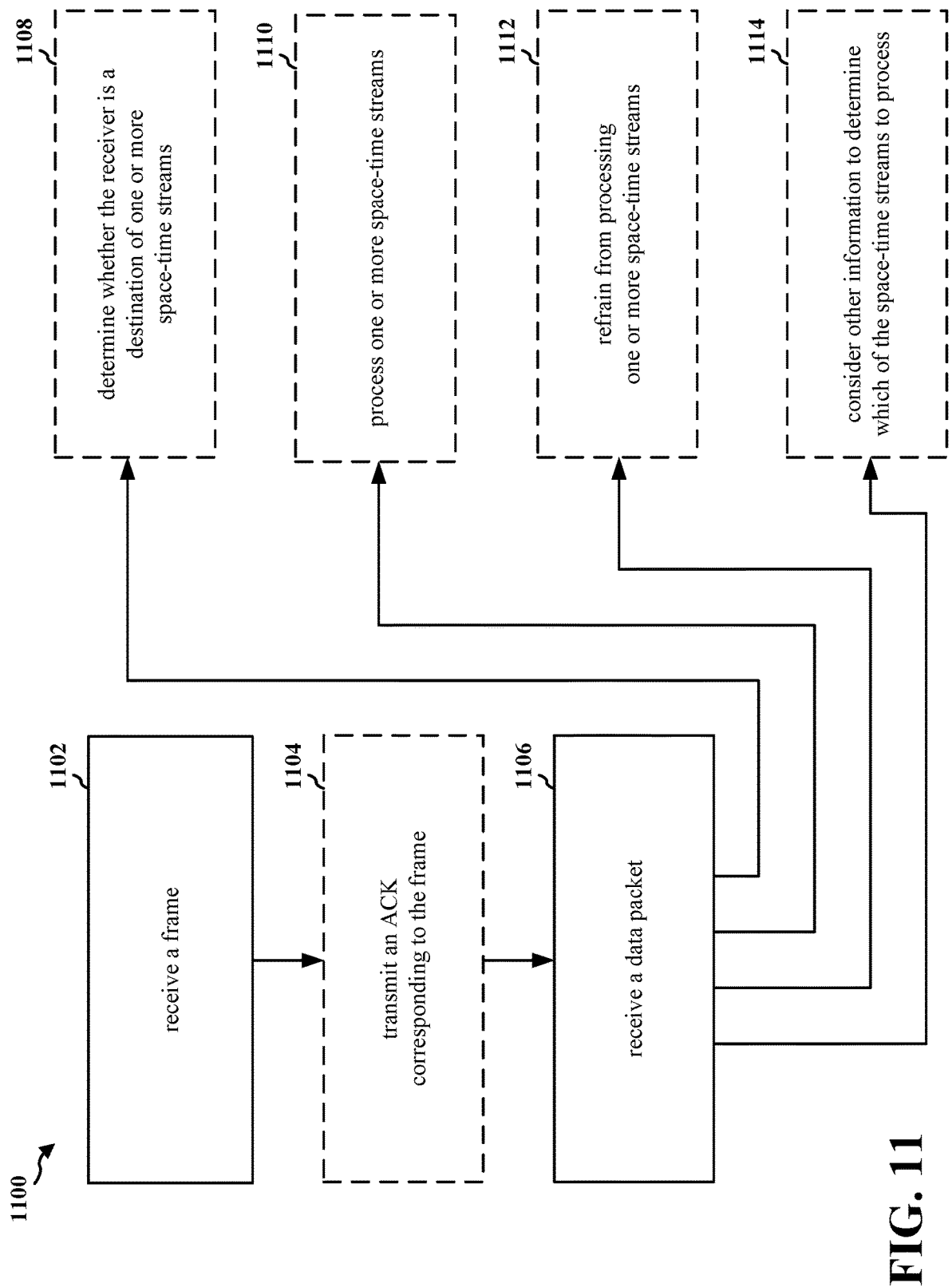
FIG. 11 illustrates examples of various methods of communication.
Figure 12:
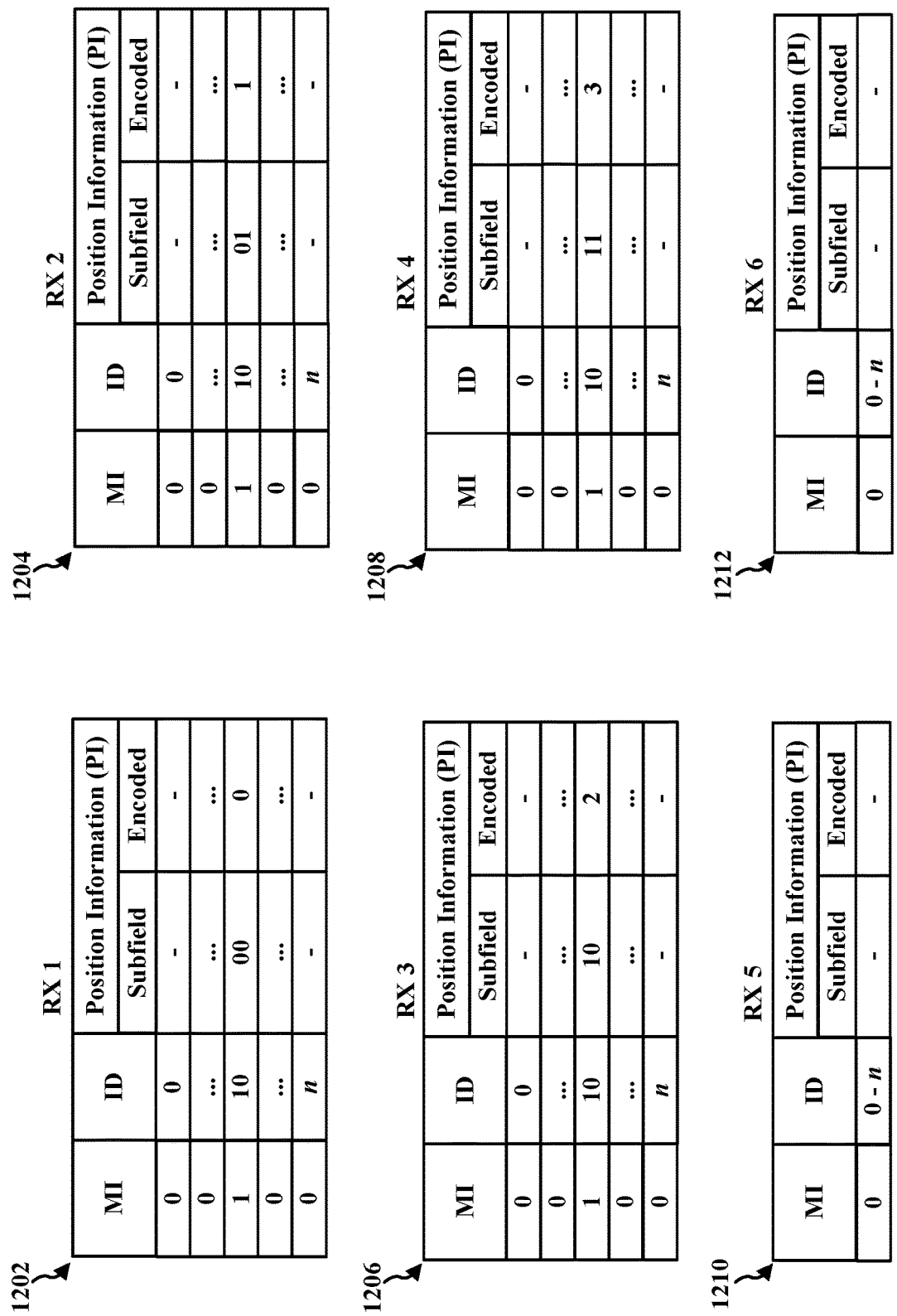
FIG. 12 illustrates an example of a configuration of various receivers.
Figure 13:
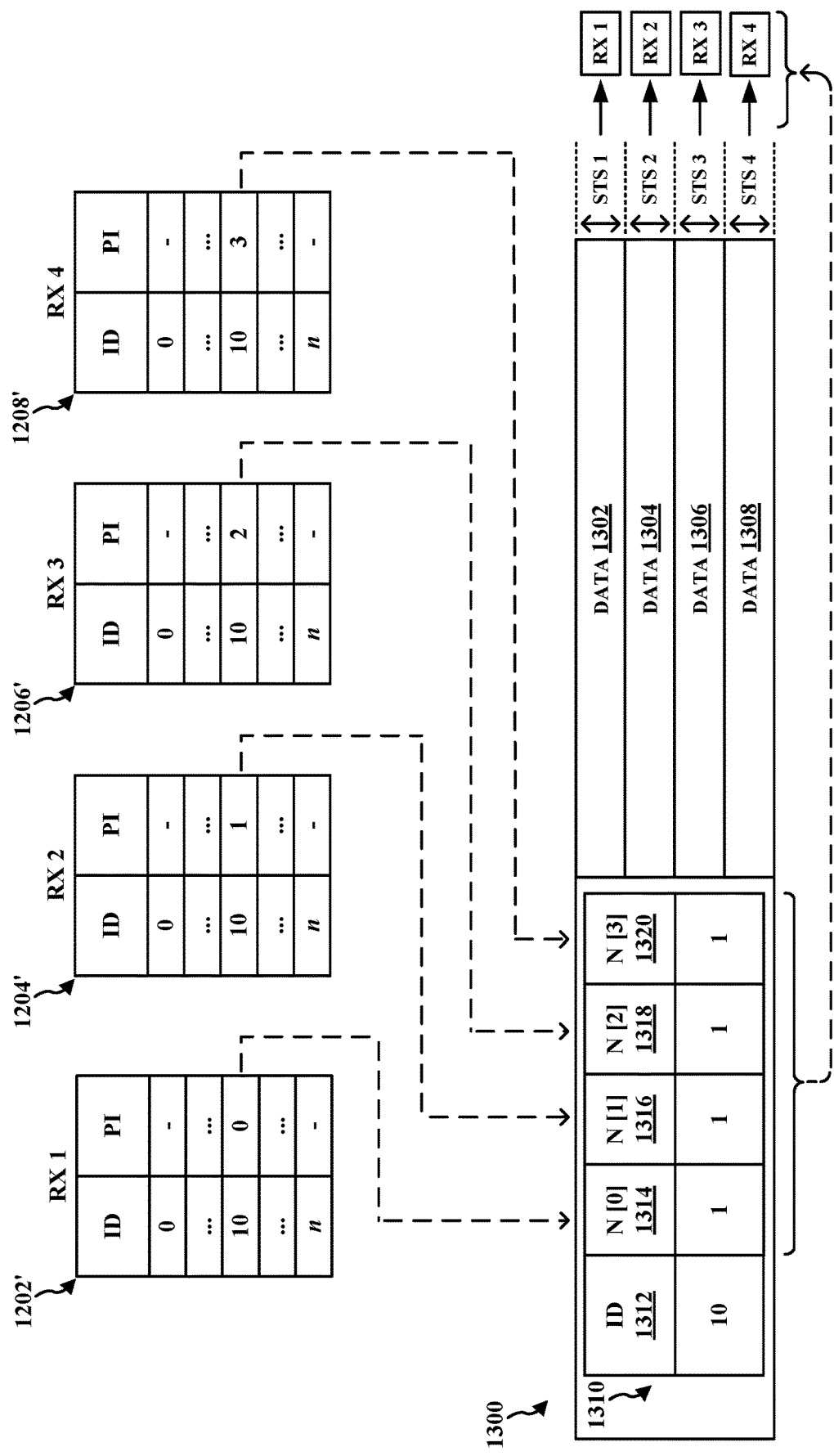
FIG. 13 illustrates an example of a use of the configuration illustrated in FIG. 12.

FIG. 11 illustrates various example methods of communication. FIG. 12 illustrates an example configuration of various receivers. FIG. 13 illustrates an example use of the configuration illustrated in FIG. 12.

In some configurations, a receiver may perform the method 1100 illustrated in FIG. 11. Referring to FIG. 11, at 1102, one or more receivers may receive a frame.

Referring to FIG. 12, lookup tables 1202, 1204, 1206, 1208, 1210, 1212 include MI and/or PI for RX 1, RX 2, RX 3, RX 4, RX 5, RX 6, respectively. Lookup tables 1202, 1204, 1206, 1208, 1210, 1212 may be managed by the frame respectively destined to RX 1, RX 2, RX 3, RX 4, RX 5, RX 6. A frame respectively destined to RX 1, RX 2, RX 3, RX 4, RX 5, RX 6 may include a similar lookup table. After receiving the frame, the receiver may replace values included in its current lookup table with values included in the lookup table in the frame. Accordingly, in some configurations, assigning at least the MI or the PI may include replacing values stored in the receiver with values in the frame.

Referring to FIG. 12, RXs 1-6 may each receive a frame that assigns the MI and/or PI of that RX. For instance, RX 1 receives a frame addressed to RX 1. From that frame, RX 1 receives MI values for ID values 0 through n, as illustrated in table 1202. In this example, the MI value for all ID values is zero except for an ID value of 10, which has an MI value of one (1). Because the MI value for RX 1 is equal to one (1) for ID=10, RX 1 is a member of the group of receivers associated with ID=10. Because the MI value for RX 1 is zero for all other ID values, RX 1 is not a member of any other group of receivers associated with any other ID value.

Also from the frame, RX 1 receives PI values for all ID values for which RX 1 is a member. In some configurations, the position information is assigned for each of the one or more identifiers to which the apparatus is a member. For example, because RX 1 is a member of the group of receivers associated with ID=10, RX 1 receives PI associated with ID=10. As illustrated in table 1202, the PI may be a subfield value, such as [00], and/or an encoded value, such as [0].

As illustrated in FIG. 12, the frame received by RX 2, RX 3, RX 4, RX 5, RX 6 populates their respective lookup tables 1204, 1206, 1208, 1210, 1212. As illustrated in their respective lookup tables 1204, 1206, 1208, RXs 2-4 are also members of the group of recipients associated with ID=10, because their MI value for ID=10 is equal to one (1). Accordingly, RXs 2-4 also receive PI values associated with ID=10. As illustrated in their respective lookup tables 1204, 1206, 1208, RXs 2-4 receive respective subfield PI values of [01], [10], [11] and/or respective encoded PI values of [1], [2], [3] for ID=10 (but not for any other ID values). However, RXs 5-6 are not members of any group of recipients, because their MI value for all IDs is zero. Accordingly, RX 5 and RX 6 do not have subfield PI values nor encoded PI values, as illustrated in lookup tables 1210, 1212.

Referring back to FIG. 11, in some configurations, at 1104, the receiver may transmit an ACK corresponding to the frame. At 1106, the receiver may receive a data packet. For example, referring to FIG. 13, the receiver may receive the data packet 1300. The data packet 1300 may have the portion 1310, which includes the ID field 1312 and N-fields 1314, 1316, 1318, 1320 respectively corresponding to PI values of [0], [1], [2], [3].

A first portion (e.g., N-field 1314) may indicate a number of space-time streams (e.g., one STS) associated with a first position information (e.g., PI=[0]). A second portion (e.g., N-field 1316) may indicate a number of space-time streams (e.g., one STS) associated with a second position information (e.g., PI=[1]).

The data packet 1300 includes four space-time streams (e.g., STSs 1-4) respectively including data portions 1302, 1304, 1306, 1308. Based on the PI values assigned by the frame, and the values in the N-fields 1314, 1316, 1318, 1320, each RX can determine how many and/or which space-time stream is destined to that particular RX.

Referring back to FIG. 11, at 1108, the receiver may determine whether the receiver is a destination of one or more space-time streams in the data packet. In some configurations, the receiver may determine whether the apparatus is a destination of one or more space-time streams in the data packet based on whether the particular identifier with which the data packet is associated corresponds to at least one of the identifiers for which a position information was assigned by the frame. For example, as illustrated in table 1202' in FIG. 13, RX 1 is assigned PI=[0] for ID=10. Because the value of 10 in the ID field 1312 of the data packet 1300 matches the ID (e.g., 10) for which RX 1 has been assigned a position information (e.g., PI=[0]) by the frame, RX 1 determines that RX 1 is a destination of at least one space-time stream in the data packet 1300.

In comparison, if the value in the ID field 1312 of the portion 1310 of the data packet 1300 were any value other than 10 and, therefore, did not match the ID (e.g., 10) for which RX 1 has been assigned a position information, then RX 1 would determine that RX 1 is not a destination of one or more space-time streams in the data packet 1300.

Because the value of 10 in the ID field 1312 matches the ID (e.g., 10) for which RXs 2-4 have been assigned a position information by the frame (see tables 1204', 1206', 1208' in FIG. 13), RXs 2-4 also determine that RXs 2-4 are destinations of one or more space-time streams in the data packet 1300.

In some configurations, the receiver may determine a number of space-time streams in the data packet destined to the receiver based on the position information assigned by the frame. For example, referring to FIG. 13, RX 1 may determine that one (1) space-time stream in the data packet is destined to RX 1 based on the PI value (e.g., [0]) assigned by the frame. Because N[0]=1 (see N-field 1314), RX 1 determines that one (1) space-time stream (e.g., the space-time stream including data 1302) is destined to RX 1.

Referring back to FIG. 11, at 1110, the receiver may process one or more space-time streams in the data packet. Based on the PI assigned to the receiver by the frame, the receiver may determine which and/or how many space-time streams are destined to that particular receiver. For example, as illustrated in table 1202' in FIG. 13, RX 1 is assigned PI=[0]. Accordingly, RX 1 may detect the value in N-field 1314 (because N-field 1314 indicates the number of space-time streams destined to the receiver assigned PI=[0]). Because N-field 1314 indicates a value of one (1), RX 1 may determine that only one (1) space-time stream is destined to RX 1.

Further, because PI=[0] is the lowest possible PI value (e.g., PI cannot have a value lower than zero), RX 1 may determine that no other N-fields precede the N-field corresponding to the PI assigned to that receiver. Accordingly, RX 1 may determine that RX 1 is the destination of the first space-time stream (e.g., STS 1). After determining that STS 1 is destined to RX 1, RX 1 may process STS 1, which includes data portion 1302.

Referring back to FIG. 11, at 1112, the receiver may refrain from processing one or more space-time streams in the data packet. In some configurations, the receiver may refrain from processing all space-time streams in the data packet when the particular identifier with which the data packet is associated does not correspond to an identifier for which a position information was assigned by the frame. For example, referring to FIG. 13, assume that the ID field 1312 had a value of 11 (instead of the value 10, as illustrated in FIG. 13). If the particular identifier (e.g., the value in the ID field 1312) of the data packet 1300 has the value 11 (instead of 10), RXs 1-4 may refrain from processing all space-time in the data packet 1300 because the particular identifier (e.g., ID=11) of the data packet 1300 would not correspond to an identifier (e.g., ID=10) for which a PI was assigned by the frame (e.g., RX 1, RX 2, RX 3, RX 4 were assigned PI values of [0], [1], [2], [3], respectively, for ID=10 but not for ID=1).

In some configurations, referring to FIG. 13, after determining that only the first space-time stream (e.g., STS 1) is destined to RX 1, RX 1 may refrain from processing other space-time streams in the data packet 1300. Accordingly, RX 1 may refrain from processing STSs 2-4.

Referring back to FIG. 11, at 1114, the receiver may consider other information to determine which of the space-time streams to process. For example, as illustrated in table 1204' in FIG. 13, RX 2 is assigned PI=[1]. Accordingly, RX 2 may detect the value in N-field 1316 (because N-field 1316 indicates the number of space-time streams destined to the receiver assigned PI=[1]). Because N-field 1316 indicates a value of one (1), RX 2 may determine that only one (1) space-time stream is destined to RX 2.

However, because PI=[1] is not the lowest possible PI value, RX 2 may determine that other N-fields precede the N-field corresponding to the PI assigned to that receiver. For example, N-field 1314 (corresponding to PI=[0]) precedes N-field 1316 (corresponding to PI=[1]). As such, the receiver may consider the sum of the values in all N-fields that precede the N-field corresponding to the PI assigned to that receiver. For example, RX 2 may consider the sum of the values in N-field 1314, the sum of which is one. Accordingly, RX 2 may determine that the first space-time stream (e.g., STS 1) in the data packet 1300 is not destined to RX 2. As such, RX 2 may determine that STS 2 is the first space-time stream destined to RX 2. Also, because the value in the N-field 1316 is one (1), RX 2 may determine that only one space-time stream (e.g., STS 2) is destined to RX 2. Accordingly, RX 2 may process STS 2, which includes data portion 1304. Additionally, RX 2 may refrain from processing other space-time streams in the data packet 1300. Accordingly, RX 2 may refrain from processing STS 1, STS 3, STS 4, which include data 1302, data 1306, data 1308, respectively.

As illustrated in table 1206' in FIG. 13, RX 3 is assigned PI=[2]. Accordingly, RX 3 may detect the value in N-field 1318 (because N-field 1318 indicates the number of space-time streams destined to the receiver assigned to PI=[2]). Because N-field 1318 indicates a value of one, RX 3 may determine that only one (1) space-time stream is destined to RX 3. However, because PI=[2] is not the lowest possible PI value, RX 3 may determine that other N-fields precede the N-field corresponding to the PI assigned to that receiver. For example, N-field 1314 (corresponding to PI=[0]) and N-field 1316 (corresponding to PI=[1]) precede N-field 1318 (corresponding to PI=[2]). As such, the receiver may consider the sum of the values in all N-fields that precede the N-field corresponding to the PI assigned to that receiver. For example, RX 3 may consider the sum of the values in N-fields 1314, 1316, the sum of which is two. Accordingly, RX 3 may determine that the first two space-time streams (e.g., STSs 1-2) in the data packet 1300 are not destined to RX 3. As such, RX 3 may determine that STS 3 is the first space-time stream destined to RX 3. Also, because the value in the N-field 1318 is one, RX 3 may determine that only one space-time stream (e.g., STS 3) is destined to RX 3. Accordingly, RX 3 may process STS 3, which includes data portion 1306. Additionally, RX 3 may refrain from processing other space-time streams in the data packet 1300. Accordingly, RX 3 may refrain from processing STS 1, STS 2, STS 4, which include data 1302, data 1304, data 1308, respectively.

As illustrated in table 1208' in FIG. 13, RX 4 is assigned PI=[3]. Accordingly, RX 4 may detect the value in N-field 1320 (because N-field 1320 indicates the number of space-time streams destined to the receiver assigned to PI=[3]). Because N-field 1320 indicates a value of one (1), RX 4 may determine that only one (1) space-time stream is destined to RX 4. However, because PI=[3] is not the lowest possible PI value, RX 4 may determine that other N-fields precede the N-field corresponding to the PI assigned to that receiver. For example, N-field 1314 (corresponding to PI=[0]), N-field 1316 (corresponding to PI=[1]), and N-field 1318 (corresponding to PI=[2]) precede N-field 1320 (corresponding to PI=[3]). As such, the receiver may consider the sum of the values in all N-fields that precede the N-field corresponding to the PI assigned to that receiver. For example, RX 4 may consider the sum of the values in N-fields 1314, 1316, 1318, the sum of which is three. Accordingly, RX 4 may determine that the first three space-time streams (e.g., STSs 1-3) in the data packet 1300 are not destined to RX 4. Further, RX 4 may determine that STS 4 is the first space-time stream destined to RX 4. Also, because the value in the N-field 1320 is one, RX 4 may determine that only one space-time stream (e.g., STS 4) is destined to RX 4. Accordingly, RX 4 may process STS 4, which includes data portion 1308. Additionally, RX 4 may refrain from processing other space-time streams in the data packet 1300. As such, RX 4 may refrain from processing STS 1, STS 2, STS 3, which include data 1302, data 1304, data 1306, respectively.

In some configurations, the receiver may consider a number of space-time streams associated with position information different from the position information assigned by the frame to determine which of the space-time streams in the data packet are destined to the receiver. For example, referring to FIG. 13, RX 4 may consider the number of space-time streams associated with PI=[0], PI=[1], and PI=[2] (which are all different from PI=[3], which is assigned to RX 4 by the frame) to determine which of the space-time streams in the data packet are destined to RX 4. A consideration of the number of space-time streams associated with PI=[0], PI=[1], and PI=[2] may reveal that three space-time streams (e.g., the sum of the values of N-fields 1314, 1316, 1318) precede the space-time stream destined to RX 4. Based on this consideration, RX 4 may determine that the space-time stream destined to RX 4 begins after those three space-time streams. More specifically, RX 4 may determine that the space-time stream including data 1302, 1304, 1306 are destined to other destinations, and the space-time stream including data 1308 is destined to RX 4.

In some configurations, a receiver may determine that a first space-time stream of one or more space-time streams destined to a first destination begins after a last space-time stream of one or more space-time streams destined to a second destination. For example, referring to FIG. 13, RX 4 may determine that the first space-time stream (e.g., the space-time stream including data 1308) destined to RX 4 begins after the last space-time (e.g., the space-time stream including data 1306) destined to RX 3.

As illustrated in the examples herein, a frame and a portion of a data packet (and the values/information contained respectively therein) may be used to determine a number of space-time streams destined to a particular receiver. Further, a frame and a portion of a data packet (and the values/information contained respectively therein) may be used to determine a chronology, order, and/or sequence corresponding to the destination(s) of one or more space-time streams in the data packet.

In some configurations, the same position information may be assignable to more than one receiver. In some configurations, the destination of one or more space-time streams may be a single receiver. Accordingly, a single receiver may be the only destination of the space-time streams associated with the position information of that (single) receiver. In some configurations, the destination of one or more space-time streams may be a plurality of receivers. Accordingly, two or more receivers may each be the destination of one or more space-time streams. In some configurations, a particular position information may be assigned to only one destination/receiver. In some configurations, a particular position information may be assigned to a plurality of destinations/receivers. Accordingly, two or more destinations/receivers assigned the same position information may receive the same space-time streams, if any, associated with that position information.

Figure 15:
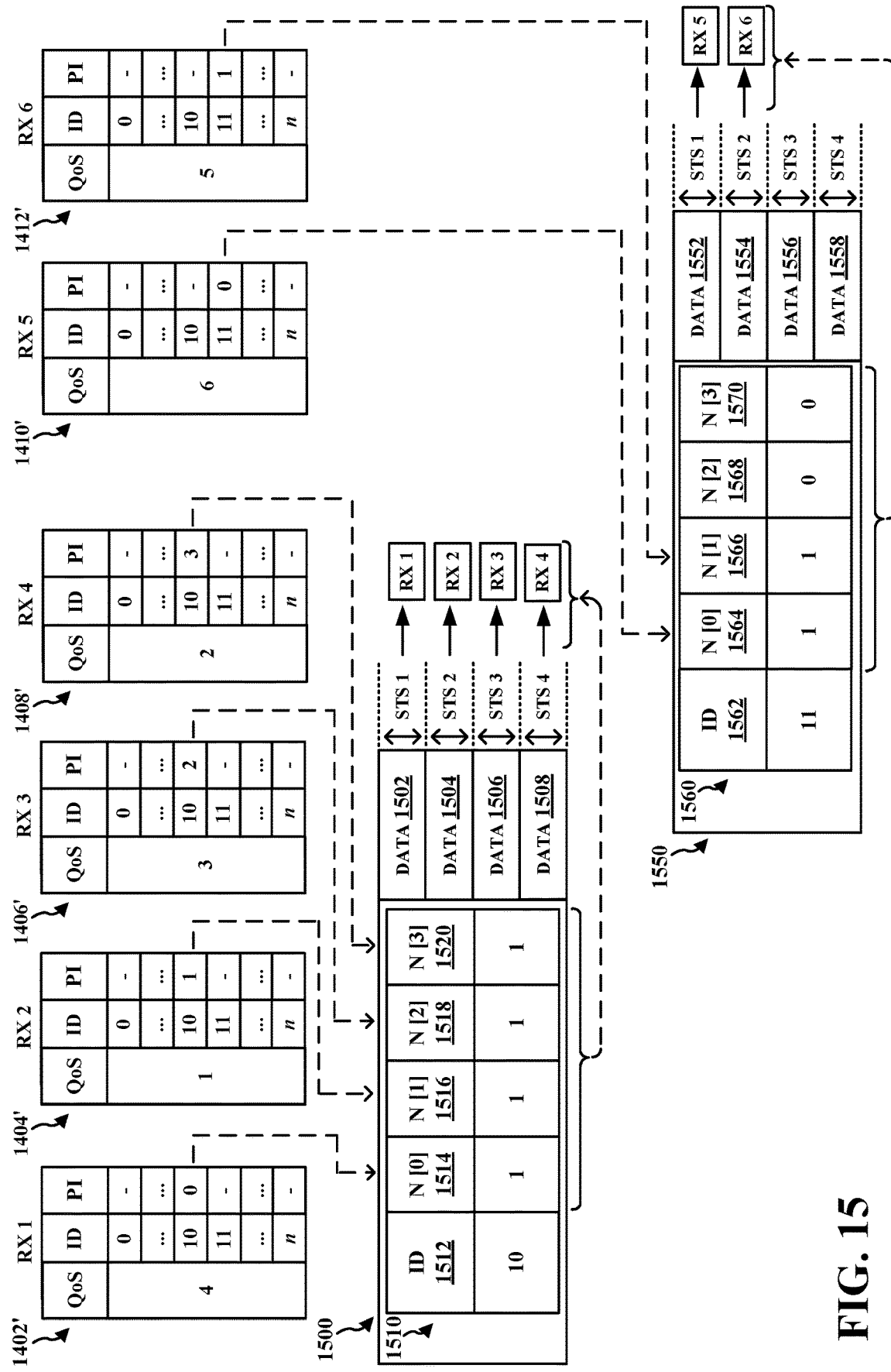
FIG. 15 illustrates an example of a use of the configuration illustrated in FIG. 14.

FIG. 14 illustrates an example configuration of various receivers. FIG. 15 illustrates an example use of the configuration illustrated in FIG. 14.

The data destined to each receiver may be associated with a particular quality of service (QoS), or some information related thereto. The QoS of the data may be associated with the priority or importance of the data. Accordingly, it may be preferential for data having a higher QoS (relative to other data having a lower QoS) to be transmitted and/or received before other data (having the lower QoS). For illustrative purposes, the examples provided herein describe the QoS associated with the data destined to RXs 1-6 as having different values (e.g., QoS may have a value of 0 through 6, where a higher QoS value indicates a higher QoS or priority, and a lower QoS value indicates a lower QoS or priority). However, it is understood that some or all of the data destined to RXs 1-6 may have the same QoS without deviating from the scope of the claims or disclosure provided herein.

In an aspect, FIG. 14 illustrates an example configuration of six receivers being randomly assigned MI and/or PI (e.g., MI and PI are not assigned based on QoS information). However, as illustrated in FIG. 15, each data packet 1500, 1550 may only be able to hold four different space-time streams. In this example, each of the receivers is a destination of a different space-time stream. Accordingly, the number of receivers (e.g., six receivers) destined to receive a different space-time stream exceeds the number of space-time streams (e.g., four STSs) in a single data packet. Therefore, some space-time streams (e.g., four STSs) may need to be included in a first-transmitted data packet 1500, and some space-time steams (e.g., two STSs) may need to be included in a subsequently-transmitted data packet 1550.

Tables 1402, 1404, 1406, 1408, 1410, 1412 illustrate the MI and PI assigned by the frame received by RX 1, RX 2, RX 3, RX 4, RX 5, RX 6, respectively. Based on the random MI and PI assigned by the frame addressed to RX 1, RX 1 is assigned as a member of ID=10 (e.g., MI=1 with respect to ID=10). Also, RX 1 is assigned PI=[0] with respect to ID=10. Based on the random MI and PI assigned by the frame addressed to RX 2, RX 2 is assigned as a member of ID=10 and is assigned PI=[1] with respect to ID=10. Based on the random MI and PI assigned by the frame addressed to RX 3, RX 3 is assigned as a member of ID=10 and is assigned PI=[2] with respect to ID=10. Based on the random MI and PI assigned by the frame addressed to RX 4, RX 4 is assigned as a member of ID=10 and is assigned PI=[3] with respect to ID=10.

Referring to FIG. 15, the first-transmitted data packet 1500 has no more than four space-time streams to carry the data respectively destined to four different receivers. In this example, the number of data portions destined to different destinations is greater than the number of space-time streams available in a single data packet. For example, referring to FIG. 15, the number of data portions destined to different destinations (e.g., receivers) is six. In this example, the number of space-time streams available in a single data packet is four. Accordingly, the number of data portions destined to different destinations is greater than the number of space-time streams available in a single data packet.

Accordingly, the data destined to RX 1, RX 2, RX 3, RX 4 may be included in data portions 1502, 1504, 1506, 1508, respectively. However, any different data destined to any other receiver may not be accommodated in the first-transmitted data packet 1500. Accordingly, the data destined to RXs 5-6 may not be included in the first-transmitted data packet 1500 and, thus, may be included in the subsequently-transmitted data packet 1550.

Accordingly, referring back to FIG. 14, based on the random MI and PI assigned by the frame addressed to RX 5, RX 5 is assigned as a member of ID=11 and is assigned PI=[0] with respect to ID=11. Based on the random MI and PI assigned by the frame addressed to RX 6, RX 6 is assigned as a member of ID=11 and is assigned PI=[1] with respect to ID=11. As illustrated in FIG. 15, the data destined to RX 5 is included in the data portion 1552 of the subsequently-transmitted data packet 1550. Also, the data destined to RX 6 is included in data portion 1554 of the subsequently-transmitted data packet 1550.

As described in greater detail supra, FIGS. 14 and 15 illustrate an example configuration where six receivers are randomly assigned MI and/or PI (e.g., MI and PI are not assigned based on QoS information). However, each data packet 1500, 1550 may only hold up to four space-time streams. As illustrated in FIG. 15, such a random assignment of MI and PI may result in data having a lower QoS being transmitted (and thus received) before data having a higher QoS. For example, as illustrated in FIG. 15, the data destined to RX 2 has the lowest QoS value (e.g., QoS=1) but is included in the first-transmitted data packet 1500. In comparison, the data destined to RX 5 has the highest QoS value (e.g., QoS=6) but is included in the subsequently-transmitted data packet 1550. As such, data having a lower QoS (e.g., priority) is transmitted (and thus received) at an earlier time relative to data having a higher QoS. In some circumstances, it may be preferred for data having a higher QoS to be transmitted (and thus received) before data having a lower QoS.

Figure 18:
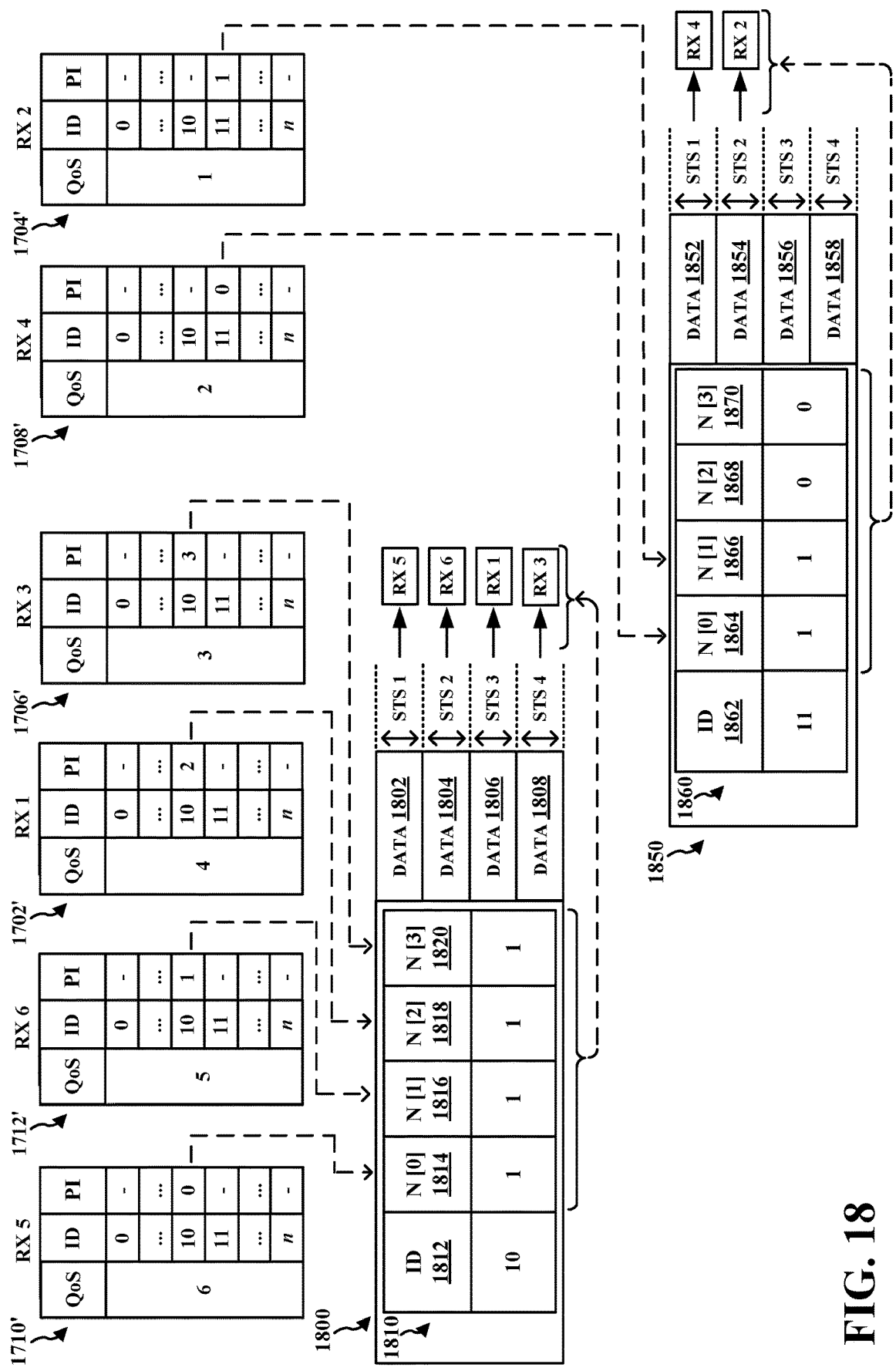
FIG. 18 illustrates an example of a use of the configuration illustrated in FIG. 17.

FIGS. 16A and 16B illustrate various example methods of communication. In some configurations, a transmitter may perform the method 1600 illustrated in FIG. 16A. In some configurations, a receiver may perform the method 1650 illustrated in FIG. 16B. FIG. 17 illustrates an example configuration of various receivers. FIG. 18 illustrates an example use of the configuration illustrated in FIG. 17.

Referring to FIG. 16A, at 1602, a transmitter may determine that the number of data portions destined to different receivers is greater than the number of space-time streams available in a single data packet. For example, referring to FIGS. 17 and 18, a transmitter may determine that six receivers (e.g., RXs 1-6) are destined to receive different data portions but only four space-time streams in each data packet 1500, 1550. Accordingly, the transmitter may determine that the number of data portions destined to different receivers is greater than the number of space-time streams available in a single data packet.

Referring back to FIG. 16A, at 1604, the transmitter may determine the QoS of data portions destined to the different RXs. For example, referring to FIG. 17, the transmitter may determine that the QoS of the data destined to RX 1, RX 2, RX 3, RX 4, RX 5, RX 6 is QoS=4, QoS=1, QoS=3, QoS=2, QoS=6, QoS=5, respectively.

Referring back to FIG. 16A, at 1606, the transmitter may transmit one or more frames configured to assign the MI and/or PI of the different receivers according to the QoS of their respective data portion. Accordingly, at 1652, a receiver may receive a frame configured to assign the MI and/or PI of that receiver according to the QoS of the data portion destined to that receiver. In some circumstances, it may be preferred for data having a higher QoS to be transmitted (and thus received) before data having a lower QoS.

In some configurations, at least the member information or the position information is assigned by the frame according to the QoS of the data portion destined to the destination (e.g., receiver/apparatus). For example, referring to FIGS. 17 and 18, the data destined to RX 5 is assign as a member of ID=10, which corresponds to the first-transmitted data packet 1800 (see FIG. 18), because the data destined to RX 5 has the highest QoS value (e.g., QoS=6). Accordingly, in tables 1710, MI=1 with respect to ID=10, and MI=0 with respect to all other ID values (see FIG. 17).

Because the data destined to RX 6, RX 1, RX 3 have the next-highest QoS values (e.g., QoS=5, QoS=4, QoS=3, respectively), RX 6, RX 1, RX 3 are also assigned as a member of ID=10, which corresponds to the first-transmitted data packet 1800 (see FIG. 18). Accordingly, in tables 1712, 1702, 1706, MI=1 with respect to ID=10, and MI=0 with respect to other ID values (see FIG. 17).

Because the first-transmitted data packet 1800 has only four space-time streams, which are occupied by the data destined to RX 5, RX 6, RX 1, RX 3, the data destined to RX 4 and RX 2 may be included in the subsequently-transmitted data packet 1850 (see FIG. 18). Accordingly, RX 4 and RX 2 are assigned as a member of ID=11, which corresponds to the subsequently-transmitted data packet 1850 (see FIG. 18). Accordingly, in tables 1708, 1704, MI=1 with respect to ID=11, and MI=0 with respect to other ID values (see FIG. 17). Thus, the frame may assign the MI of the receiver according to the QoS of the data destined to a particular receiver.

As described in greater detail supra, the frame may assign the PI according to the QoS of the data destined to a particular receiver. For example, referring to FIGS. 17 and 18, the QoS value of the data destined to RX 5 (e.g., QoS=6) is higher than the QoS value of the data destined to RX 6 (e.g., QoS=5). Even though both data (destined to RX 5, RX 6) are included in the same first-transmitted data packet

1500, the PI assigned to RX 5 and RX 6 may vary according to the QoS of the data destined to the particular receiver.

For example, referring to FIG. 17, RX 5 is assigned PI=[0], and RX 6 is assigned PI=[1], as illustrated in tables 1710/1710'. In this example, because the data destined to RX 5 (e.g., QoS=6) has a higher QoS than the QoS of the data destined to RX 6 (e.g., QoS=5), RX 5 is assigned a lower PI value than the PI value assigned to RX 6. Thus, the frame may assign the PI of the receiver according to the QoS of the data destined to a particular receiver. For similar reasons, RX 1 (QoS=4) is assigned PI=[2] and RX 3 (e.g., QoS=3) is assigned PI=[3], as illustrated in tables 1702/1702', 1706/1706'. Also, for similar reasons, RX 4 (e.g., QoS=2) is assigned PI=[0], and RX 2 (e.g., QoS=1) is assigned PI=[1], as illustrated in tables 1708/1708', 1704/1704'.

One of ordinary skill in the art will appreciate that the foregoing are non-limiting examples and not intended to limit the scope of the claims or disclosure provided herein. Alternative configurations may be implemented without deviating from the scope of the claims or disclosure provided herein. For example, although not illustrated in FIGS. 17 and 18, data having a low/lower QoS may be included in a first-transmitted data packet, and data having a high/higher QoS may be included in a subsequently-transmitted data packet. As another example, although not illustrated in FIGS. 17 and 18, data having a low/lower QoS may have lower PI value relative to data having a high/higher QoS. Other alternative configurations are readily apparent to one of ordinary skill in the art.

Referring back to FIG. 16A, at 1608, the transmitter may transmit data portions having the highest QoS in a first data packet. For example, referring to FIG. 18, the transmitter transmits the data packet 1800, which includes the data destined to RX 5, RX 6, RX 1, RX 3 in data portions 1802, 1804, 1806, 1808, respectively.

Referring back to FIG. 16B, at 1654, the receiver receives the data packet destined to that receiver. For example, referring to FIG. 18, the receiver receives the data packet 1800, which includes the data destined to RX 5, RX 6, RX 1, RX 3 in data portions 1802, 1804, 1806, 1808, respectively.

In circumstances where the number of receivers receiving different data portions exceeds the number of space-time streams in a single data packet, more than one data packet may be transmitted. Referring back to FIG. 16A, at 1610, the transmitter may transmit other data portions in one or more data packets. For example, referring to FIG. 18, the transmitter may transmit the subsequently-transmitted data packet 1850, which includes the data destined to receivers RX 4, RX 2 in data portions 1852, 1854, respectively.

Referring to FIG. 16B, at 1656, the receiver may receive one or more other data packets having data portions not destined to that receiver. For example, referring to FIG. 18, RX RX 5, RX 6, RX 1, RX 3 may receive the subsequently-transmitted data packet 1850 that includes data portions 1852, 1854, which are destined to RX 4, RX 2, but which are not destined to RX 5, RX 6, RX 1, RX 3.

The QoS described in the examples herein is provided for illustrative purposes only and is not intended to limit the scope of the claims or disclosure provided herein. The QoS may be based on various characteristics, attributes, settings, values, etc., as may be deemed appropriate based on the particular implementation and design parameters of various configurations. In some configurations, the QoS of data may be based on the type of data. For example, data comprising voice over Internet protocol (VoIP) may have a higher QoS, whereas data comprising video may have a lower QoS. In some configurations, the QoS of data may be based on the size of the data. For example, data having a larger size may have a lower QoS and data having a smaller size may have a higher QoS. In some configurations, data having higher QoS may have at least a lower contention window, a shorter inter-frame spacing, and/or a higher transmission opportunity limit relative to data having a lower QoS. In alternative configurations, other parameters may be used to determine the QoS of data, and such alternative configurations will be known by one of ordinary skill in the art based on the particular implementation and design parameters.

Figure 20:
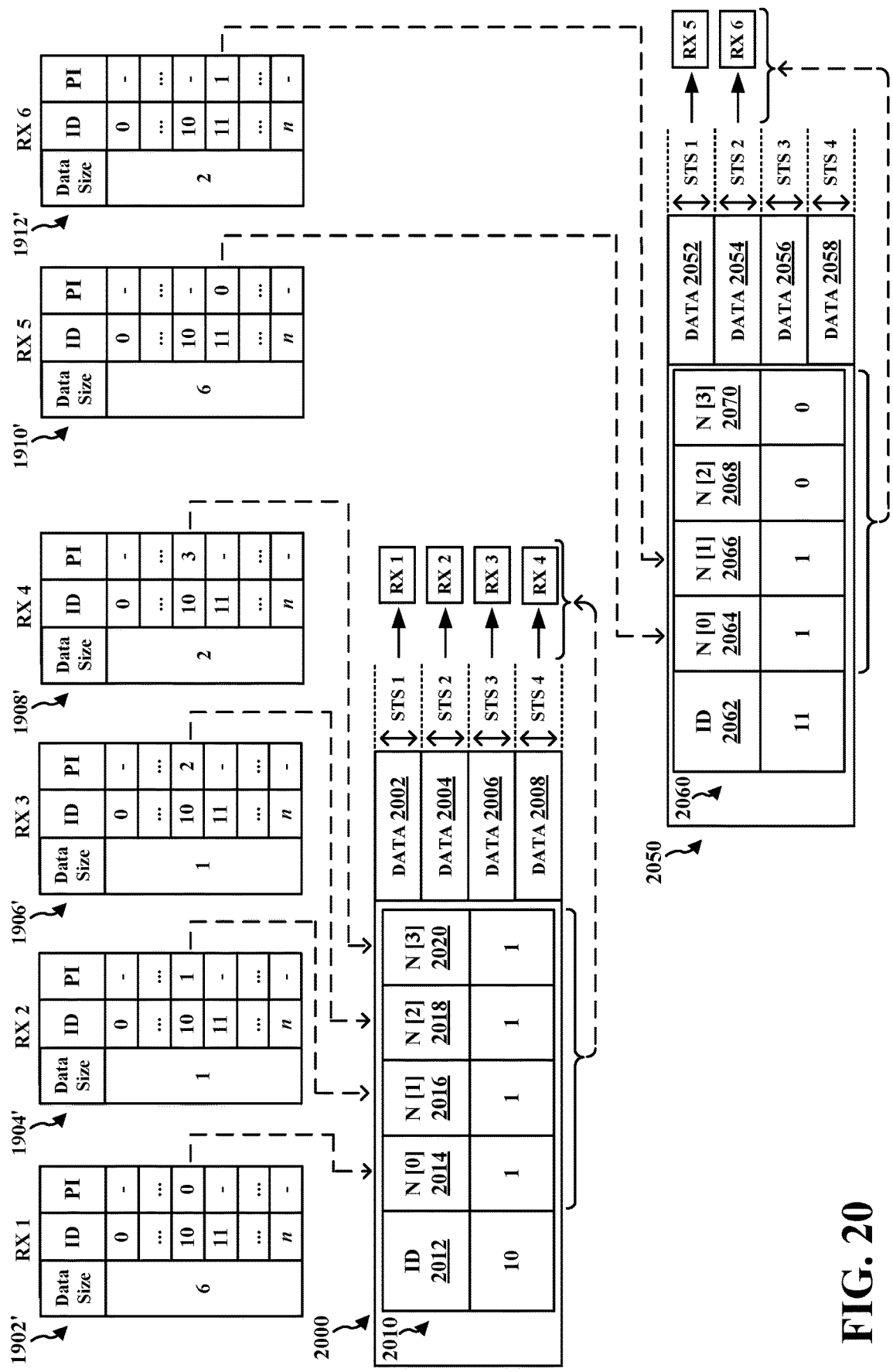
FIG. 20 illustrates an example of a use of the configuration illustrated in FIG. 19.

FIG. 19 illustrates an example configuration of various RXs. FIG. 20 illustrates an example use of the configuration illustrated in FIG. 19.

The data destined to each receiver may have a particular size. The size of data may be measured in various units. In some configurations, the size of the data may be measured in terms of (or based on) the number (#) of frames in the data (or the data portion of the data). Accordingly, data having a larger size may have a greater number frames relative to data having a smaller size.

Although the examples illustrated herein may measure the size of data according to the number of frames of data, one or ordinary skill in the art will understand that other units of measure may readily be used without deviating from the scope of the claims or disclosure provided herein. Accordingly, it will be understood by one of ordinary skill in the art that the size of data is not limited to the number of frames. Therefore, the examples provided herein to describe the size of the data (or data portion) shall not be construed to limit the scope of the claims.

In some configurations, the data in some space-time steams may have the same size as the data in other space-time streams. In some configurations, the data in some space-time streams of a data packet may have a different size relative to the data in other space-time streams of the same data packet.

In some circumstances, it may be preferential for data having a larger size (relative to other data having a smaller size) to be transmitted and/or received before other data (having the smaller size). In some other circumstances, it may be preferential for data having a smaller size (relative to other data having a larger size) to be transmitted and/or received before other data (having the larger size).

In an aspect, FIG. 19 illustrates an example configuration of six receivers randomly assigned MI and PI (e.g., MI and PI are not assigned based on the size of the data destined to the receiver). However, as illustrated in FIG. 20, each data packet 2000, 2050 may only be able to hold four different space-time streams. In this example, each of the receivers is a destination of a different space-time stream. Accordingly, the number of receivers (e.g., six receivers) destined to receive a different space-time stream may exceed the number of space-time streams (e.g., four STSs) in a single data packet. Therefore, some space-time streams (e.g., four STSs) may be included in a first-transmitted data packet 2000, and some space-time steams (e.g., two STSs) may need to be included in a subsequently-transmitted data packet 2050.

The frame received by RX 1, RX 2, RX 3, RX 4, RX 5, RX 6 may assign the MI and/or PI respectively illustrated in tables 1902, 1904, 1906, 1908, 1910, 1912 of FIG. 19. Based on the random MI and PI assigned by the frame addressed to RX 1, RX 1 is assigned as a member of ID=10 (e.g., MI=1 with respect to ID=10). Also, RX 1 is assigned PI=[0] with respect to ID=10. Based on the random MI and PI assigned by the frame addressed to RX 2, RX 2 is assigned as a member of ID=10 and is assigned PI=[1] with respect to ID=10. Based on the random MI and PI assigned by the frame addressed to RX 3, RX 3 is assigned as a member of ID=10 and is assigned PI=[2] with respect to ID=10. Based on the random MI and PI assigned by the frame addressed to RX 4, RX 4 is assigned as a member of ID=10 and is assigned PI=[3] with respect to ID=10.

Referring to FIG. 20, the first-transmitted data packet 2000 has no more than four space-time streams (e.g., STSs 1-4) to carry the data respectively destined to four different receivers. Accordingly, the data destined to RX 1, RX 2, RX 3, RX 4 may be included in data portions 2002, 2004, 2006, 2008, respectively. However, any other data destined to any other receiver may not be accommodated in the first-transmitted data packet 2000. Accordingly, the data destined to RX 5, RX 6 may not be included in the first-transmitted data packet 2000 and, thus, may need to be included in the subsequently-transmitted data packet 2050.

Referring back to FIG. 19, based on the random MI and PI assigned by the frame addressed to RX 5, RX 5 is assigned as a member of ID=11 and is assigned PI=[0] with respect to ID=11. Based on the random MI and PI assigned by the frame addressed to RX 6, RX 6 is assigned as a member of ID=11 and is assigned PI=[1] with respect to ID=11. As illustrated in FIG. 20, the data destined to RX 5 is included in the data portion 2052 of the subsequently-transmitted data packet 2050. Also, the data destined to RX 6 is included in data portion 2054 of the subsequently-transmitted data packet 2050.

As previously described, FIGS. 19 and 20 illustrate an example configuration where six receivers are assigned MI and PI in a random fashion (e.g., MI and PI are not assigned based on the size of the data). Because each data packet 2000, 2050 may only hold up to four space-time streams, more than one data packet may be needed to transmit the six different data destined to RXs 1-6.

Figure 21:
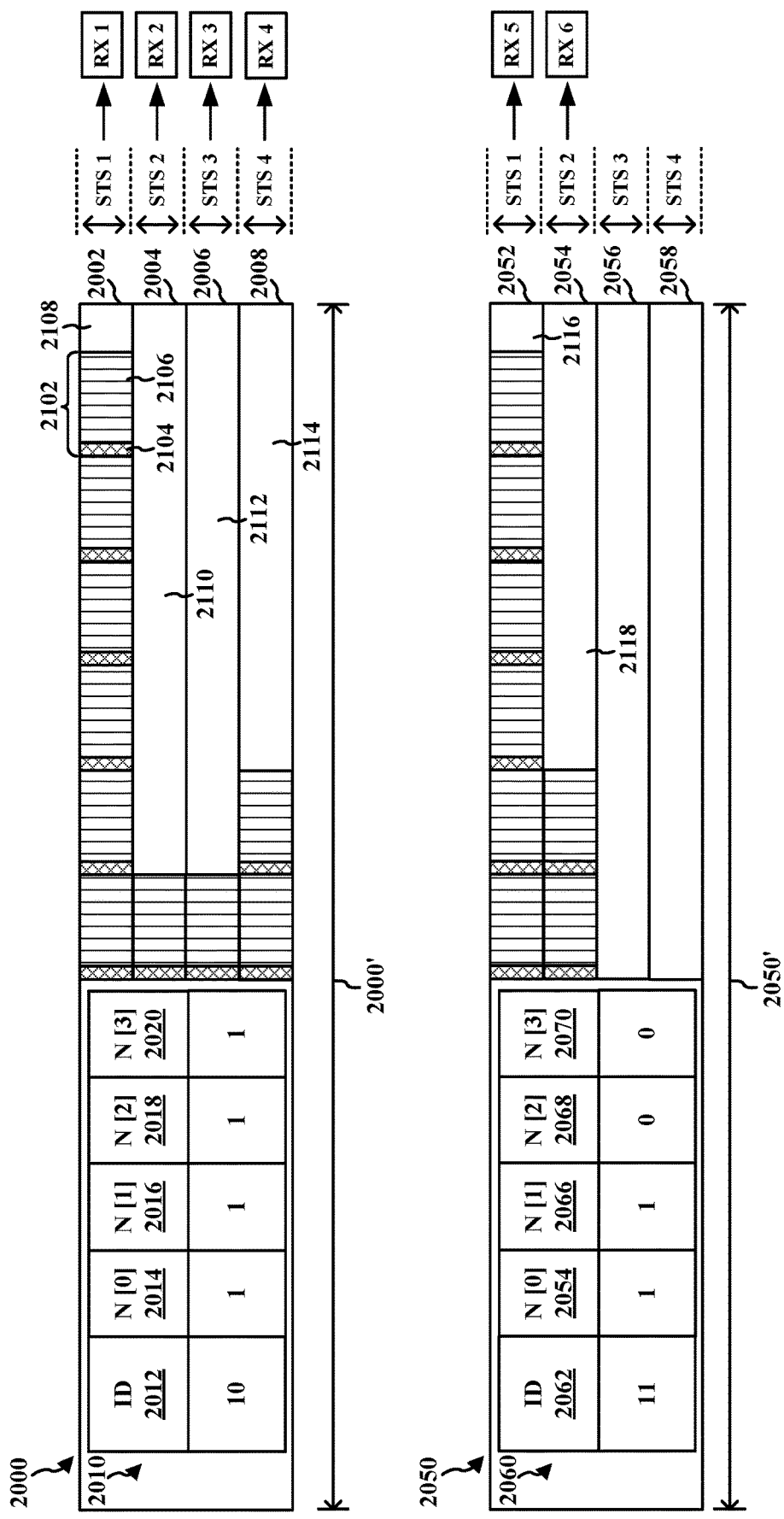
FIG. 21 illustrates an example of data packets associated with FIGS. 19 and 20.

FIG. 21 illustrates the example data packets of FIG. 20. In an aspect, FIG. 21 illustrates the size of the data packets 2000, 2050 in terms of the number of frames 2102 included in each data packet 2000, 2050.

The data portions 2002, 2004, 2006, 2008 of data packet 2000 may include one or more frames 2102. The data portions 2052, 2054 of data packet 2050 may include one or more frames 2102. Each frame may include data 2106 and inter-frame spacing (IFS) 2104 preceding that data 2106. The IFS 2104 may provide a waiting period where no data is included between two (otherwise) adjacent data 2106 of different frames 2102.

As illustrated in FIG. 21, the duration or length of the data packet may be based on the duration/length of the data portion that has the greatest size. For example, the length 2000' of the data packet 2000 is based on the length of the data portion 2002. Also, the length 2050' of the data packet 2050 is based on the length of the data portion 2052. Each data portion may have different numbers of frames. For example, the duration/length of data portions 2002, 2004, 2006, 2008 are approximately equal relative to each other, even though the number of frames 2102 in each data portion may vary (e.g. 6 frames, 2 frames, 1 frame, 2 frames are included in data portions 2002, 2004, 2006, 2008, respectively).

Padding 2108, 2110, 2112, 2114 may be included after the last frame 2102 of each data portion 2002, 2004, 2006, 2008, respectively. Generally, padding allows for the data portions (e.g., data portions 2002, 2004, 2006, 2008) in a particular data packet (e.g., data packet 2000) to have approximately the same size relative to each other. For example, varying amounts of padding 2108, 2110, 2112, 2114 are added after the last data frame in data portions 2002, 2004, 2006, 2008, respectively, to allow the data portions 2002, 2004, 2006, 2008 to have approximately the same size. For example, data portions having a greater number of frames (e.g., data portion 2002 having 6 frames) may have less padding (e.g., padding 2108) than data portions having a fewer number of frames (e.g., data portion 2004, which has 1 frame and padding 2110).

As illustrated in FIG. 21, the greater the difference between the number of frames 2102 in different data portions or space-time streams, the greater the amount of padding that may be required. For example, referring to data packet 2000, a significant amount of padding 2110, 2112, 2114 is needed in data portions 2004, 2006, 2008, respectively, to compensate for the difference between the number of frames in data portion 2002 and data portions 2004, 2006, 2008. Similarly, referring to data packet 2050, a significant amount of padding 2118 is needed in data portion 2054 to compensate for the difference between the number of frames in data portion 2052 and data portion 2054.

In comparison, data portions that have a similar number of frames may minimize the amount of padding in the data packet. In an aspect, padding may represent unused space in the data packet. Accordingly, it may be desirable to minimize padding. Padding may be reduced when data is arranged more efficiently among data packets.

Figure 25:
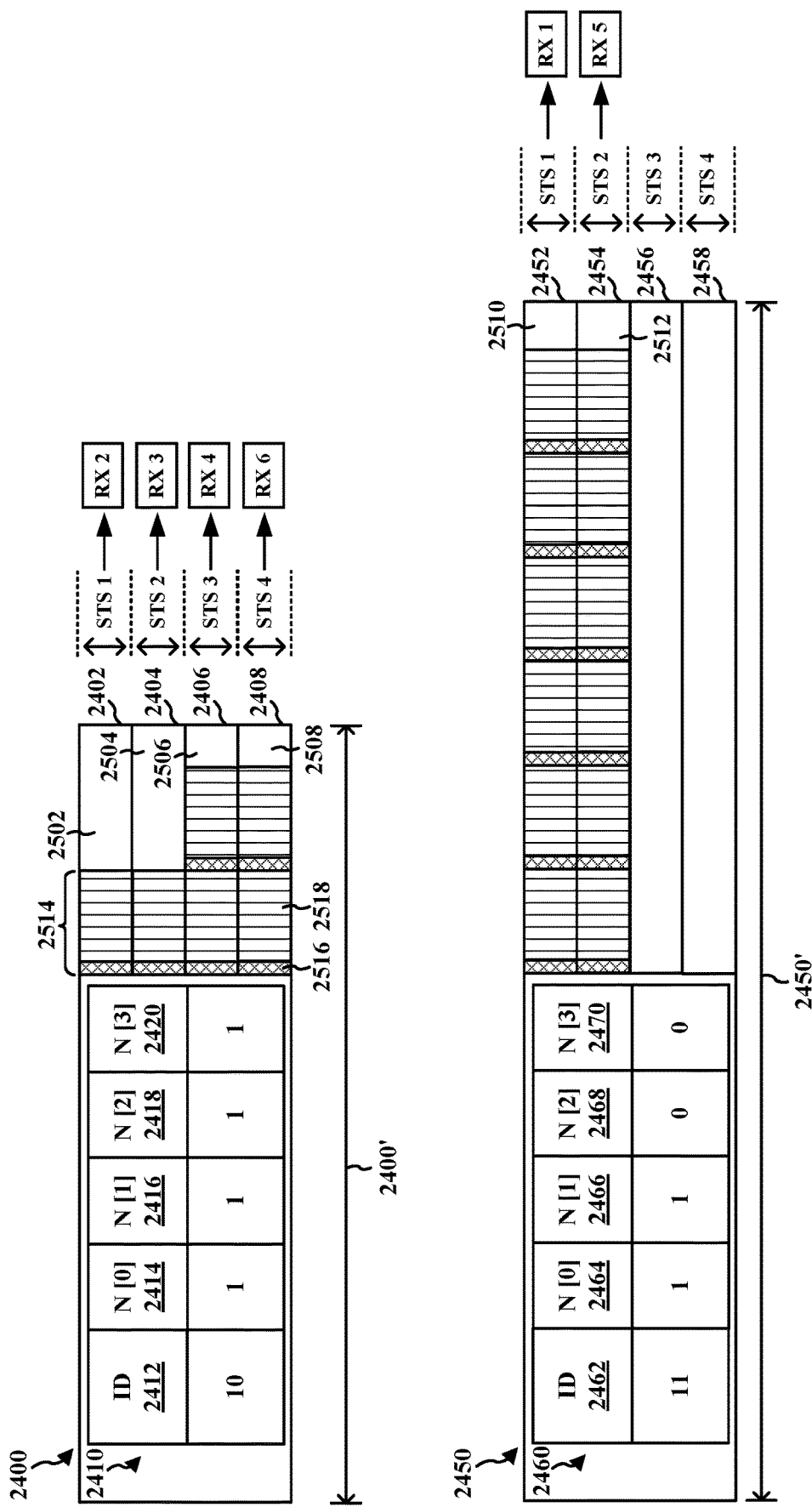
FIG. 25 illustrates an example of data packets associated with FIGS. 23 and 24.
Figure 26A:
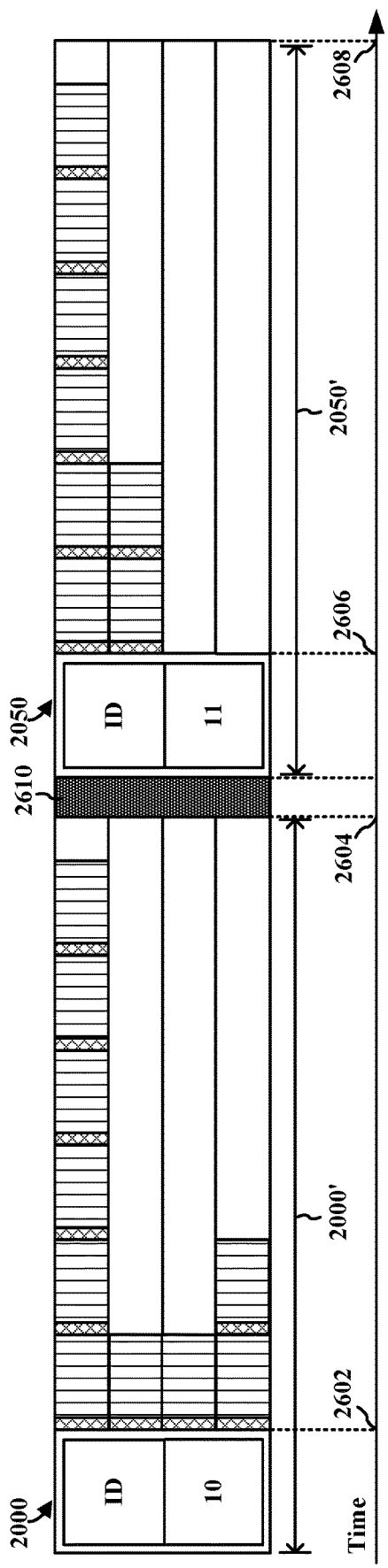
FIGS. 26A and 26B illustrate a comparison between the example data packets illustrated in FIGS. 21 and 25.
Figure 26B:
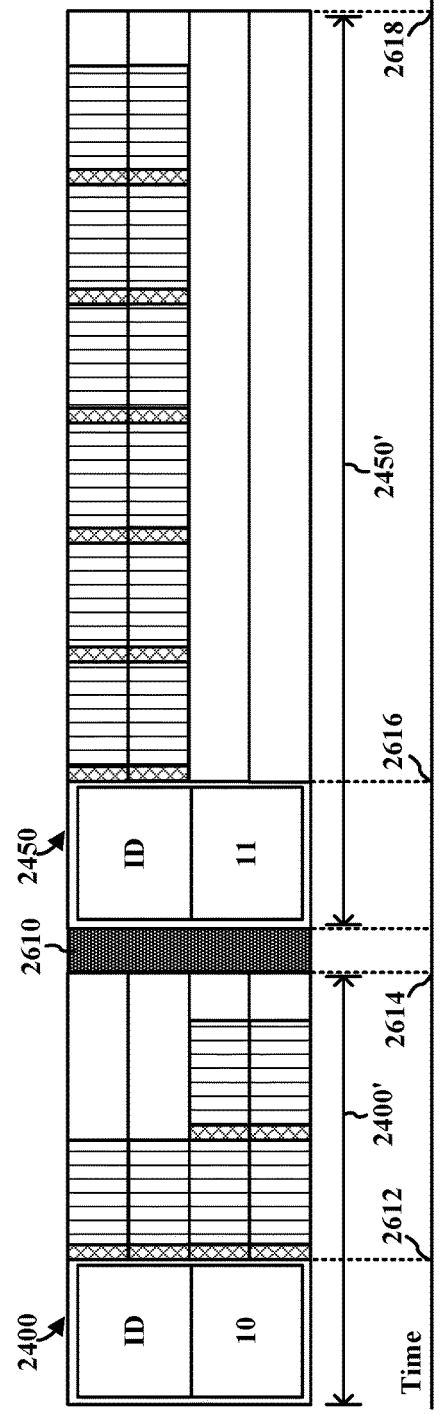

As illustrated in FIGS. 25 and 26B, and described in greater detail infra, the amount of padding may be minimized by combining similarly sized data portions in the same data packet.

A single antenna of a single transmitter may be able to transmit only one data packet at a single point in time. A single antenna of a single receiver may be able to receive only one data packet at a single point in time. Therefore, minimizing padding in a first-transmitted data packet (e.g., data packet 2000) may reduce the duration/length of that first-transmitted data packet (e.g., data packet 2000), thereby allowing a subsequently-transmitted data packet (e.g., data packet 2050) to be transmitted sooner than it would be transmitted otherwise. Such an advantage and other advantages are illustrated in and are described in further detail infra.

FIGS. 22A and 22B illustrate various example methods of communication. In some configurations, a transmitter may perform the method 2200 illustrated in FIG. 22A. In some configurations, a receiver may perform the method 2250 illustrated in FIG. 22B.

Referring back to FIG. 22A, at 2202, a transmitter may determine that the number of data portions destined to different receivers is greater than the number of space-time streams available in a single data packet. For example, referring to FIGS. 23 and 24, a transmitter may determine that there are six receivers (e.g., RXs 1-6) destined to receive different data portions but only four space-time streams available in each data packet 2400, 2450. Accordingly, the transmitter may determine that the number of data portions destined to different receivers is greater than the number of space-time streams available in a single data packet.

Referring back to FIG. 22A, at 2204, the transmitter may determine the size of the data portions destined to the different receivers. For example, referring to FIGS. 23 and 24, the transmitter may determine that the size of the data portions destined to RX 1, RX 2, RX 3, RX 4, RX 5, RX 6 is 6 frames, 1 frame, 2 frames, 1 frame, 6 frames, 2 frames, respectively.

Referring back to FIG. 22A, at 2206, the transmitter may transmit one or more frames configured to assign the MI and/or PI of the different receivers according to the size of their respective data portions. Accordingly, at 2252, a receiver may receive a frame configured to assign the MI and/or PI of that receiver according to the size of the data portion destined to that receiver. As such, at least the member information or the position information is assigned by the frame according to the size of data destined to the receiver.

In some circumstances, it may be preferred to include similarly sized data portions in the same data packet. In such circumstances, the amount of padding may be minimized, which may increase the throughout of transmissions and receptions. In some circumstances, it may be preferred to include smaller data portions in a first-transmitted data packet and to include larger data portions in a subsequently-transmitted data packet. In such circumstances, the first-transmitted data packet can be transmitted sooner than it would be transmitted otherwise, which may allow the subsequently-transmitted data packet to also be transmitted sooner than it would be transmitted otherwise. Accordingly, the throughout of transmissions and/or receptions may be increased.

As described supra, the frame may assign the MI of the receiver according to the size of the data destined to a particular receiver. For example, referring to FIGS. 23 and 24, the data destined to RX 2, RX 3 are assigned as members of ID=10, which corresponds to the first-transmitted data packet 2400, because the data destined to RX 2, RX 3 have the fewest number of frames (e.g., 1 frame each). Accordingly, in tables 2304, 2306, MI=1 with respect to ID=10, and MI=0 with respect to other ID values.

Because the data destined to RX 4, RX 6 have the next-smallest size (e.g., 2 frames each), RX 4, RX 6 are also assigned as members of ID=10, which corresponds to the first-transmitted data packet 2400. Accordingly, in tables 2308, 2312, MI=1 with respect to ID=10, and MI=0 with respect to other ID values.

Because the first-transmitted data packet 2400 have only four space-time streams (e.g., STSs 1-4), which are occupied by the data destined to RX 2, RX 3, RX 4, RX 6, the data destined to RX 1, RX 5 may need to be included in the subsequently-transmitted data packet 2450. Accordingly, RX 1 and RX 5 are assigned as members of ID=11, which corresponds to the subsequently-transmitted data packet 2450. Accordingly, in tables 2302, 2310, MI=1 with respect to ID=11, and MI=0 with respect to other ID values. Thus, the frame may assign the MI of the receiver according to the size of the data destined to a particular receiver.

As described supra, the size of the data destined to RX 3 (e.g., 1 frame) is greater than the size of the data destined to RX 4 (e.g., 2 frames). Even though both data (destined to RX 3 and RX 4) are included in the same, first-transmitted data packet 2400, the PI assigned to RX 3 and RX 4 may vary according to the size of the data destined to the particular receiver. For example, RX 3 is assigned PI=[1], and RX 4 is assigned PI=[2]. In this example, because the data destined to RX 3 has a smaller size (e.g., 1 frame) than the data destined to RX 4 (e.g., 2 frames), RX 3 is assigned a lower PI value (e.g., PI=[1]) than the PI value (e.g., PI=[2]) assigned to RX 4. Thus, the frame may assign the PI of the receiver according to the size of the data destined to that particular receiver.

One of ordinary skill in the art will appreciate that the foregoing are non-limiting examples and not intended to limit the scope of the claims or disclosure provided herein.

Alternative configurations may be implemented without deviating from the scope of the present disclosure or claims. For example, although not illustrated in FIGS. 23 and 24, data having a larger size may be included in a first-transmitted, and data having a smaller size may be included in a subsequently-transmitted data packet. As another example, although not illustrated in FIGS. 23 and 24, data having a larger size may be assigned a lower PI value relative to data having a smaller size. Other alternative configurations are readily apparent to one of ordinary skill in the art.

Referring to FIG. 22A, at 2208, the transmitter may transmit data portions having the smallest (or largest) sizes in a first data packet. For example, referring to FIG. 24, the transmitter may transmit the data packet 2400, which includes the data destined to RX 2, RX 3, RX 4, RX 6 in data portions 2402, 2404, 2406, 2408, respectively. Referring to FIG. 22B, at 2254, the receiver may receive the data packet destined to that receiver. For example, referring to FIG. 24, the receiver (e.g., RX 2, RX 3, RX 4, RX 6) may receive the data packet 2400, which includes the data destined to RX 2, RX 3, RX 4, RX 6 in data portions 2402, 2404, 2406, 2408, respectively.

In circumstances where the number of receivers receiving different data portions exceeds the number of space-time streams in a single data packet, more than one data packet may be transmitted. Referring to FIG. 22A, at 2210, the transmitter may transmit other data portions in one or more data packets. For example, referring to FIG. 24, the transmitter may transmit the subsequently-transmitted data packet 2450, which includes the data destined to receivers RX 1, RX 5 in data portions 2452, 2454, respectively. Referring to FIG. 22B, at 2256, the receiver may receive one or more data packets having data portions not destined to that receiver. For example, referring to FIG. 24, RX 2, RX 3, RX 4, RX 6 may receive the subsequently-transmitted data packet 2450, which includes data portions 2452, 2454, which are destined to RX 1 and RX 5, but which are not destined to RX 2, RX 3, RX 4, RX 6.

The size of the data (e.g., number of frames) in each space-time stream described in the examples herein is provided for illustrative purposes only and is not intended to limit the scope of the claims or the disclosure provided herein. The size of the data in each space-time stream may be determined with respect to various characteristics, attributes, settings, values, etc., as may be deemed appropriate based on the particular implementation and design parameters of various configurations. For example, in some configurations, the size of the data may be based on the number of symbols in the data. As another example, in some configurations, the size of the data may be based on the time or duration of that data. Such alternative configurations will be known by one of ordinary skill in the art based on the particular implementation and design parameters.

Figure 24:
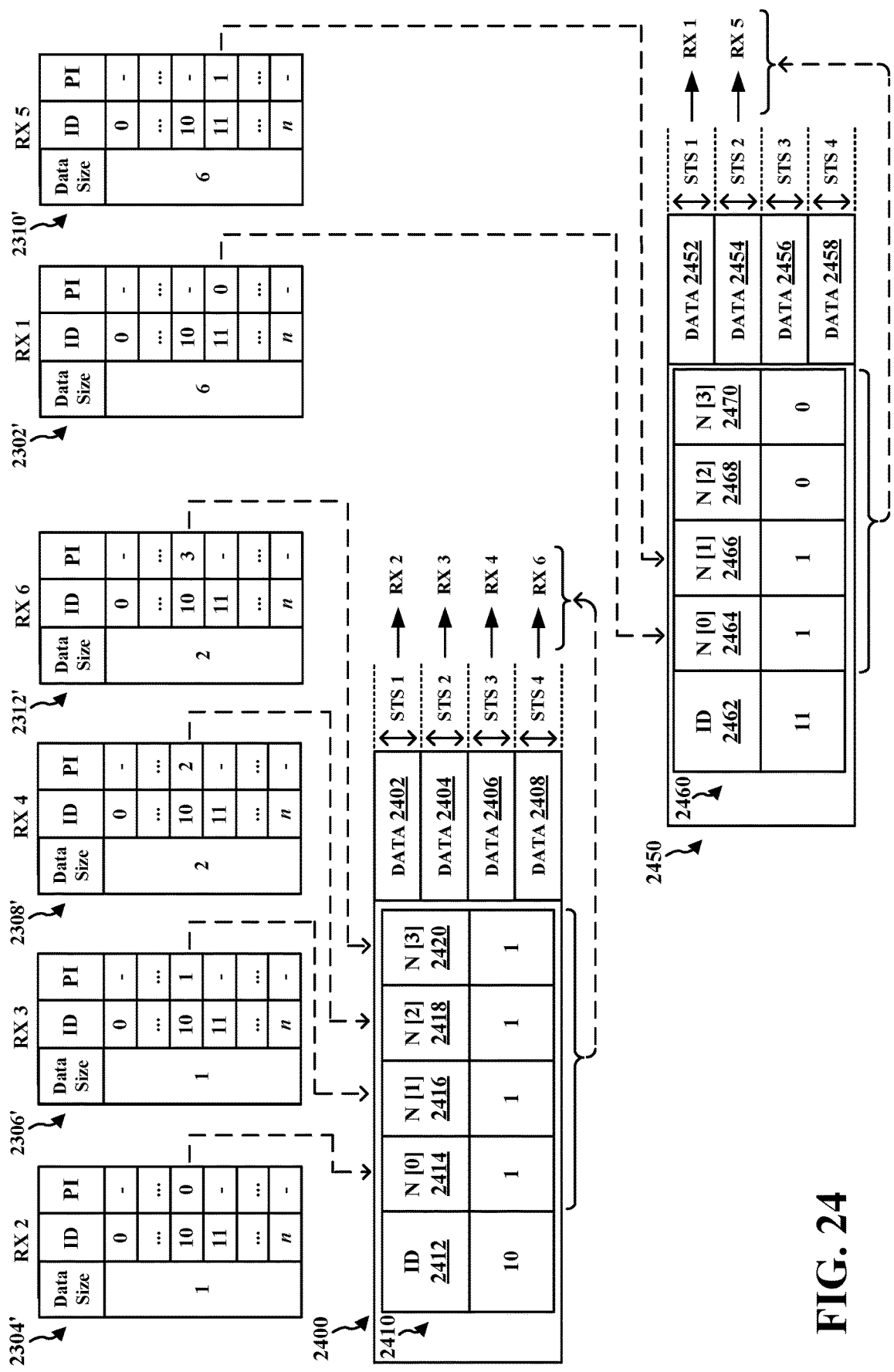
FIG. 24 illustrates an example of a use of the configuration illustrated in FIG. 23.

FIG. 25 illustrates an example of the data packets associated with FIGS. 23 and 24. In an aspect, FIG. 25 illustrates the size of the data packets 2400, 2450 in terms of the number of frames 2514 included in each data packet 2400, 2450.

The data portions 2402, 2404, 2406, 2408 of data packet 2400 may include one or more frames 2514. The data portions 2452, 2454 of data packet 2450 may include one or more frames 2514. Each frame may include data 2518 and inter-frame spacing (IFS) 2516 preceding that data 2518. The IFS 2516 may provide a waiting period where no data is included between two (otherwise) adjacent data 2518 of different frames 2514.

As illustrated in FIG. 25, the duration or length of the data packet is based on the duration/length of one or more data portions having the greatest size (relative to other data portions in the same data packet). For example, the length 2400' of the data packet 2400 is based on the length of the data portions 2406, 2408. Also, the length 2450' of the data packet 2450 is based on the length of the data portions 2452, 2454. Each data portion may have a different number of frames. For example, the duration/length of data portions 2402, 2404, 2406, 2408 are approximately equal relative to each other, even though the number of frames 2514 in each data portion varies (e.g. 1 frame, 1 frame, 2 frames, 2 frames are included in data portions 2402, 2404, 2406, 2408, respectively). Padding 2502, 2504, 2506, 2508, 2510, 2512 may be included after the last frame 2514 of each data portion 2402, 2404, 2406, 2408, 2552, 2554, respectively.

FIG. 26A illustrates the data packets 2000, 2050 illustrated in FIG. 21. FIG. 26B illustrates the data packets 2400, 2450 illustrated in FIG. 25. Collectively, FIGS. 26A, 26B can be used to illustrate a comparison between data packets not configured based on the size of their data portions (see FIG. 26A) and data packets configured based on the size of their data portions (see FIG. 26B).

A single antenna of a single transmitter may be able to transmit only one data packet at a single point in time. A single antenna of a single receiver may be able to receive only one data packet at a single point in time. Therefore, the length/duration of a first-transmitted data packet may impact the transmission/reception time of a subsequently-transmitted data packet. Generally, the longer the first-transmitted data packet, the later the subsequently-transmitted data packet may be transmitted by the transmitting antenna and/or received by the receiving antenna.

With respect to FIG. 26A, the first-transmitted data packet 2000 has a length 2000', and the subsequently-transmitted data packet 2050 has a length 2050'. The data portions in the first-transmitted data packet 2000 begin at time 2602 and end at time 2604. The wait time 2610 separates the first-transmitted data packet 2000 and the subsequently-transmitted data packet 2050. The data portions of the subsequently-transmitted data packet 2050 begin at time 2606 and end at time 2608.

With respect to FIG. 26B, the first-transmitted data packet 2400 has a length 2400', and the subsequently-transmitted data packet 2450 has a length 2450'. The data portions in the first-transmitted data packet 2400 begin at time 2612 and end at time 2614. The wait time 2610 separates the first-transmitted data packet 2400 and the subsequently-transmitted data packet 2450. The data portions of the subsequently-transmitted data packet 2450 begin at time 2616 and end at time 2618.

Because the data packets 2400, 2450 are configured according to the size (e.g., number of frames) of their data portions, padding 2502, 2504, 2506, 2508, 2510, 2512 (see FIG. 25) is reduced (e.g., minimized). For example, padding 2502, 2504, 2506, 2508 in the first-transmitted data packet 2400 (see FIG. 25) is reduced in comparison to padding 2108, 2110, 2112, 2114 in the first-transmitted data packet 2000 (see FIG. 21). Accordingly, the amount of padding in a data packet may be reduced when the size of the data portions are considered.

Also, when the size of the data portions is considered, the length/duration of the data packet may be reduced. For example, when the size of the data portions is considered, the length/duration of the first-transmitted data packet 2400 is 2400' (see FIG. 26B). In comparison, when the size of the data portions is not considered, the length/duration of the first-transmitted data packet 2000 is 2000' (see FIG. 26A), which is longer than 2400'. Accordingly, there is a decrease in the length/duration of the first-transmitted data packet when the size of the data is considered.

Because the length/duration of the first-transmitted data packet is reduced, transmission (and thus reception) of the first-transmitted data packet may occur sooner than would occur otherwise. Because transmission (and thus reception) of the first-transmission may occur sooner than would occur otherwise, transmission (and thus reception) of the subsequently-transmitted data packet may occur sooner than would occur otherwise.

For example, when the size of the data portion is considered, the first frames in the subsequently-transmitted data packet 2450 is transmitted at time 2616 (see FIG. 26B). In comparison, when the size of the data portion is not considered, the first frame in the subsequently-transmitted data packet 2050 is transmitted at time 2606 (see FIG. 26A), which is after time 2616. Accordingly, the start time corresponding to the beginning of the transmission (and thus reception) of the subsequently-transmitted data packet is earlier when the size of the data portion is considered.

Further, padding 2510, 2512 in the subsequently-transmitted data packet 2450 (see FIG. 25) is reduced (e.g., minimized) in comparison to padding 2116, 2118 in the subsequently-transmitted data packet 2050 (see FIG. 21). Accordingly, the amount of padding in the subsequently-transmitted data packet may be reduced when the size of the data portion is considered (see, e.g., FIG. 26B) than would be provided if the size of the data portion was not considered (see, e.g., FIG. 26A).

Further, in the examples illustrated in FIGS. 26A, 26B, the length/duration of the subsequently-transmitted data packet 2050, 2450 remains the same (e.g., length/duration 2050' is the same length/duration as length/duration 2450'). Accordingly, the length/duration of the subsequently-transmitted data packets 2050, 2450 may not increase when the size of the data portion is considered (see, e.g., FIGS. 26A, 26B).

Figure 27:
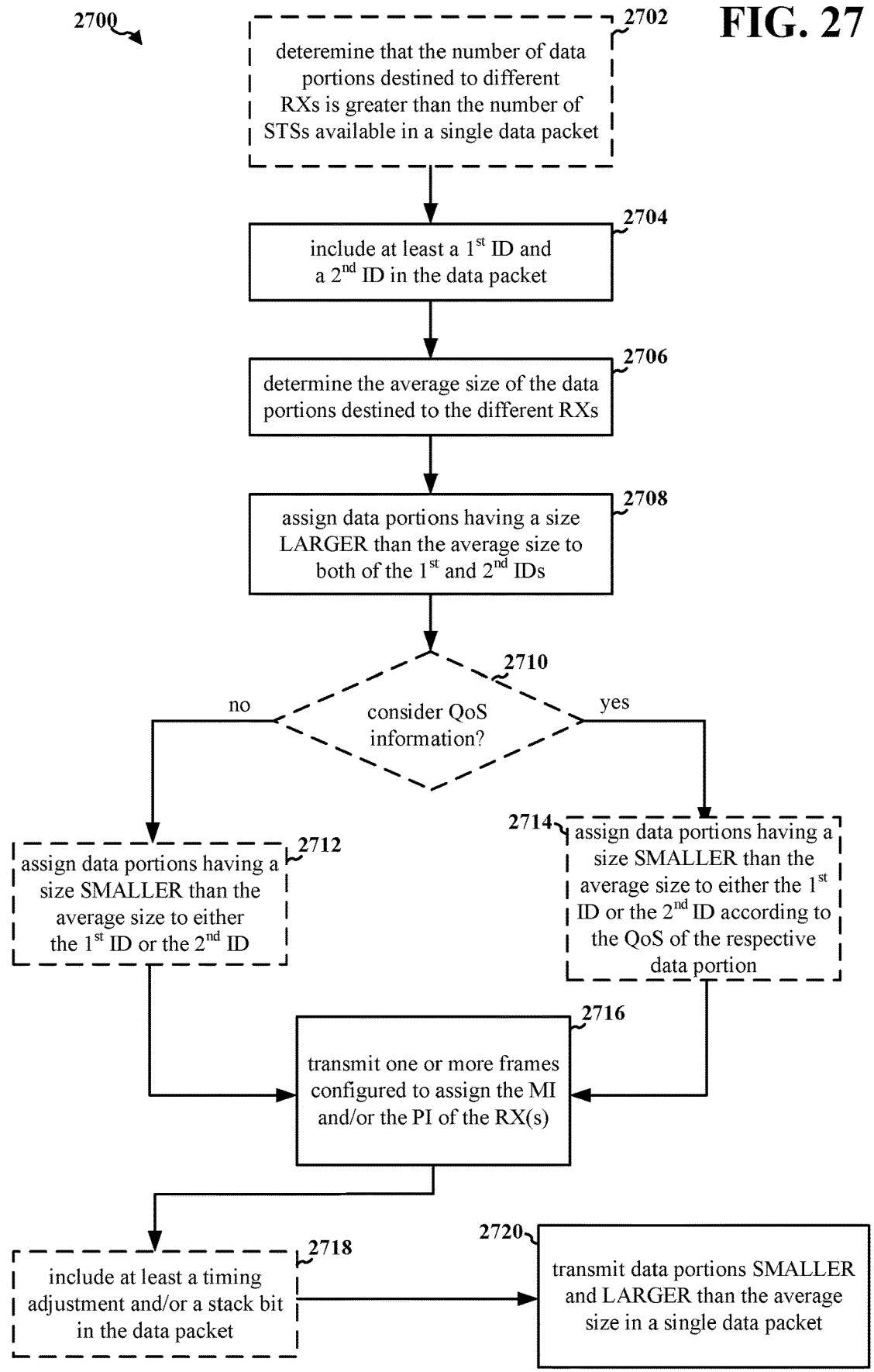
FIGS. 27 and 28 illustrate examples of various methods of communication.
Figure 28:
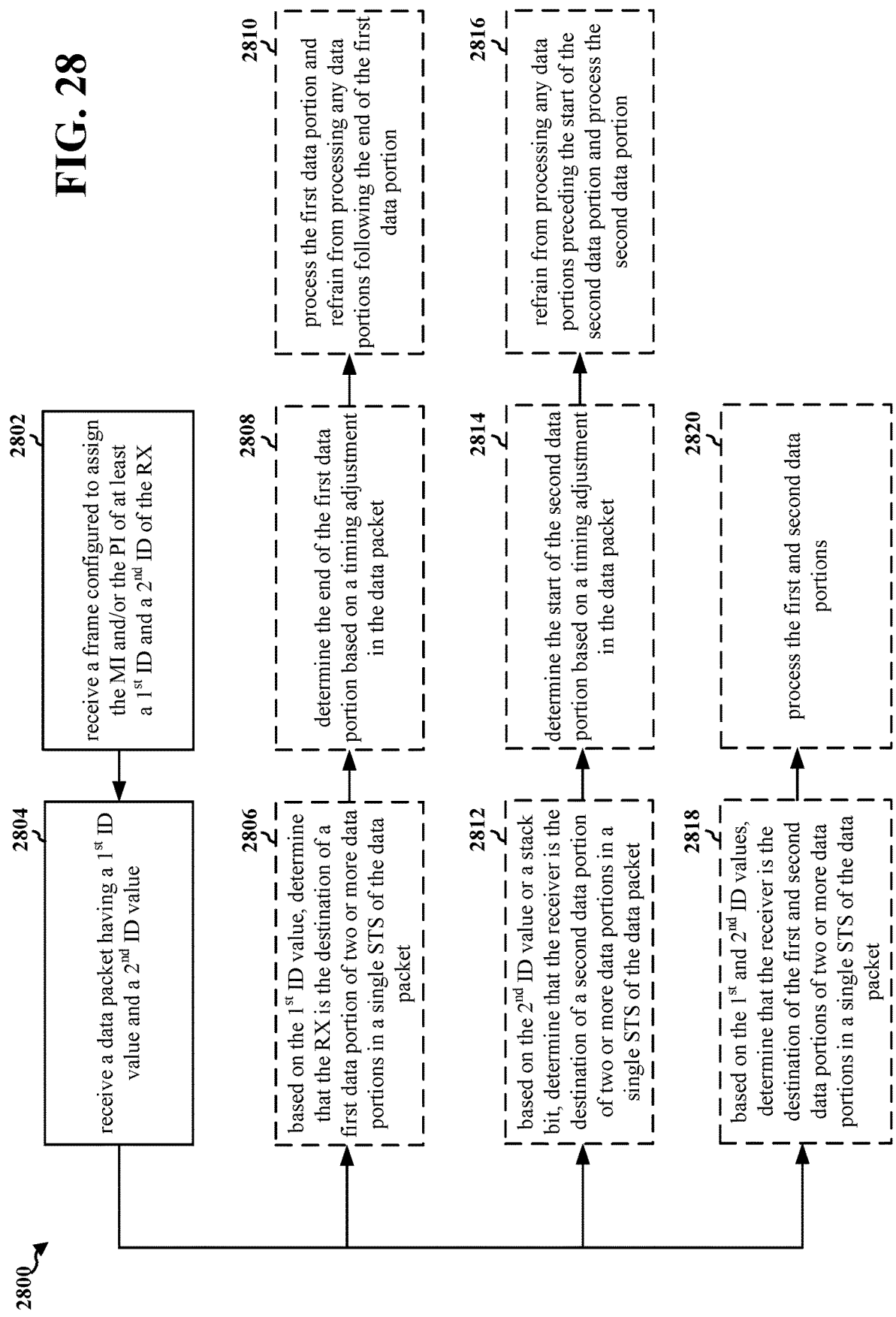
Figure 30:
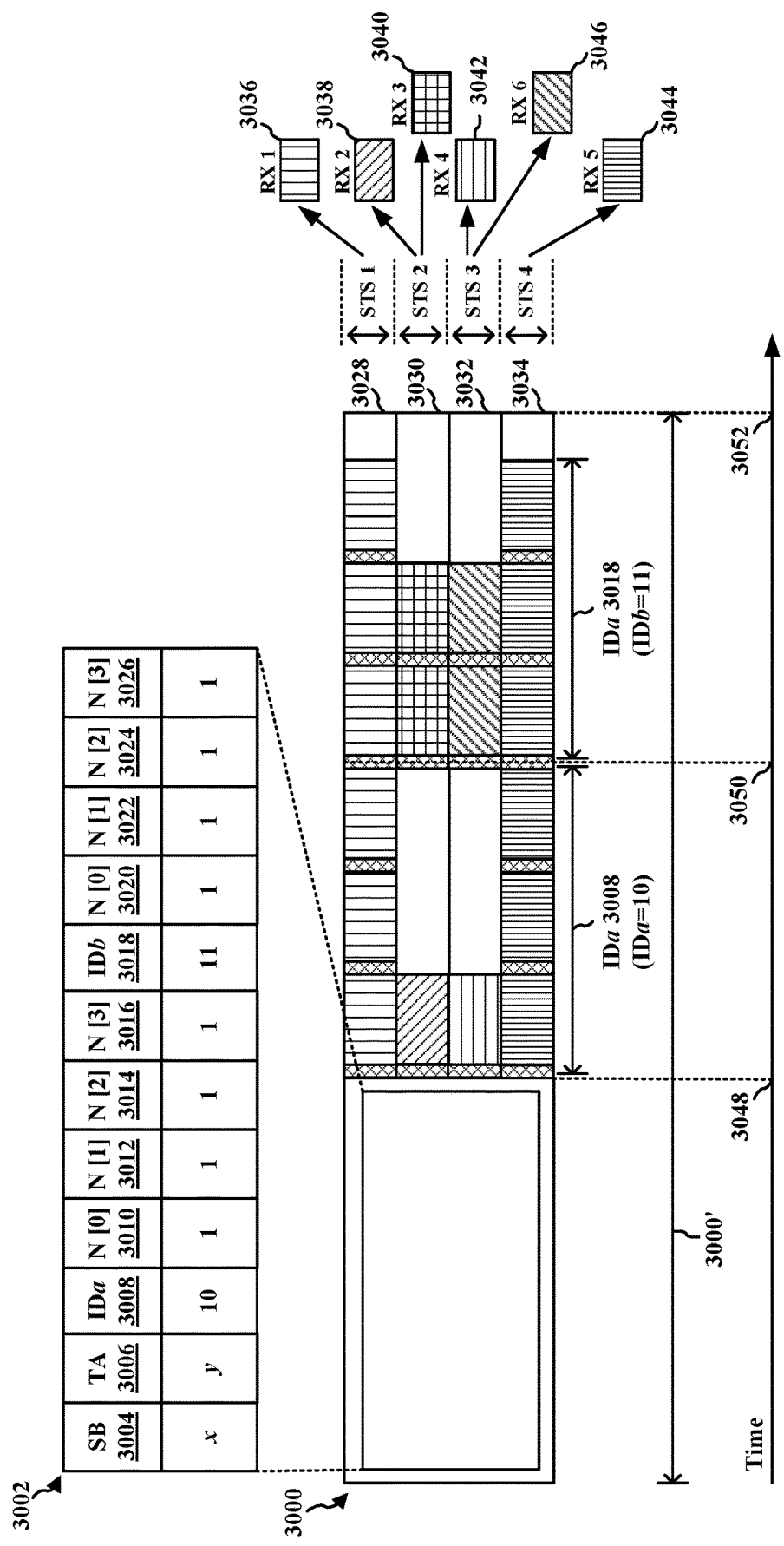
FIG. 30 illustrates an example of a use of the configuration illustrated in FIG. 29.

FIGS. 27 and 28 illustrate various example methods of communication. In some configurations, a transmitter may perform the method 2700 illustrated in FIG. 27. In some configurations, a receiver may perform the method 2800 illustrated in FIG. 28. FIG. 29 illustrates an example configuration of various receivers. FIG. 30 illustrates an example use of the configuration illustrated in FIG. 29.

In some configurations, the number of data portions destined to different destinations is greater than a number of space-time streams available in a single data packet. For example, referring to FIG. 30, the number of data portions destined to different destinations (e.g., receivers) is six. In this example, the number of space-time streams available in a single data packet is four. Accordingly, the number of data portions destined to different destinations is greater than the number of space-time streams available in a single data packet.

Referring to FIG. 27, at 2702, a transmitter may determine that the number of data portions destined to different receivers is greater than the number of space-time streams available in a single data packet. For example, referring to FIGS. 29 and 30, a transmitter may determine that there are six receivers (e.g., RXs 1-6) but only four space-time streams in a single data packet 3000. Accordingly, the transmitter may determine that the number of data portions destined to different receivers is greater than the number of space-time streams available in a single data packet.

Referring to FIG. 27, at 2704, the transmitter may include at least a $1^{st}$ ID and a $2^{nd}$ ID in the data packet. For example, referring to FIG. 30, the transmitter may include IDa 3008 and IDb 3018 in a portion 3002 of the data packet 3000. In this example, IDa=10 and IDb=11.

Referring to FIG. 27, at 2706, the transmitter may determine the average size of the data portions destined to the different receivers. For example, referring to tables 2902, 2904, 2906, 2908, 2910, 2912 in FIG. 29, the transmitter may determine the number of (data) frames of the data portions destined to RXs 1-6 and calculate the average size of the data portions based on that determination. In this example, the number of frames destined to RX 1, RX 2, RX 3, RX 4, RX 5, RX 6 is 6 frames, 1 frame, 2 frames, 1 frame, 6 frames, 2 frames, respectively. In this example, the average size (e.g., the average number of frames) of the data portions destined to RX 1, RX 2, RX 3, RX 4, RX 5, and RX 6 is 3 frames.

Referring to FIG. 27, at 2708, the transmitter may assign data portions having a size larger than the average size to both of the $1^{st}$ and $2^{nd}$ IDs. For example, referring to FIG. 29, data portions destined to RX 1, RX 5 have data portions that are each 6 frames, which is greater than the average size of 3 frames. Accordingly, RX 1 and RX 5 may be assigned to both $1^{st}$ and $2^{nd}$ IDs.

As illustrated in table 2902, RX 1 is assigned as a member of ID=10 and ID=11. Accordingly, a single receiver is assigned as a member of two or more IDs (e.g., IDs 10, 11) because the size (e.g., 6 frames) of the data destined that receiver (e.g., RX 1) is larger than the average size (e.g., 3 frames) of all of the data portions in the data packet. Also, RX 1 is assigned PI=[0] for ID=10, and RX 1 is also assigned PI=[0] for ID=11. Accordingly, a single receiver (e.g., RX 1) is assigned the same PI value (e.g., PI=[0]) for different ID values (e.g., IDs 10, 11).

As illustrated in table 2910, RX 5 is assigned as a member of ID=10 and ID=11. Accordingly, a single receiver (e.g., RX 5) is assigned as a member of two or more IDs (e.g., IDs 10, 11) because the size (e.g., 6 frames) of the data destined that receiver (e.g., RX 5) is larger than the average size (e.g., 3 frames) of all of the data portions in the data packet. Also, RX 5 is assigned PI=[3] for ID=10, and RX 5 is also assigned PI=[3] for ID=11. Accordingly, a single receiver is assigned the same PI value (e.g., PI=[3]) for different ID values (e.g., IDs 10, 11).

Referring to FIG. 27, at 2710, the transmitter may determine whether to consider QoS information corresponding to the data portions destined to the receivers. In some configurations, QoS information may not be available and therefore cannot be considered. In some configurations, QoS information may be available but not considered by the transmitter based on a particular design or implementation.

If QoS information is not considered, at 2712, the transmitter may assign data portions having a size smaller than the average size to either the $1^{st}$ ID or the $2^{nd}$ ID, but not both $1^{st}$ and $2^{nd}$ IDs. For example, referring to FIG. 29, the size (e.g., number of frames) of the data portions destined to RX 2, RX 3, RX 4, RX 6 is 1 frame, 2 frames, 1 frame, 2 frames, respectively. Since these data portions are each less than (or equal to) the average size of 3 frames, the data portions destined to RX 2, RX 3, RX 4, RX 6 may be assigned to either the $1^{st}$ ID or the $2^{nd}$ ID, but not both $1^{st}$ and $2^{nd}$ IDs.

As illustrated in table 2904 in FIG. 29, RX 2 is assigned as a member of ID=10, but not a member of ID=11. Accordingly, a single receiver is assigned as a member of no more than one ID (e.g., ID=10, but not also ID=11) because the size (e.g., 1 frame) of the data destined that receiver (e.g., RX 2) is smaller than (or equal to) the average size (e.g., 3 frames) of all of the data portions in the data packet. Also, RX 2 is assigned PI=[1] for ID=10. Accordingly, a single receiver (e.g., RX 2) is assigned a PI value (e.g., PI=[1]) for only the ID to which that receiver is assigned as a member (e.g., ID=10).

As illustrated in table 2906 in FIG. 29, RX 3 is assigned as a member of ID=1, but not a member of ID=10. Accordingly, a single receiver is assigned as a member of no more than one ID (e.g., ID=11, but not also ID=10) because the size (e.g., 2 frame) of the data destined that receiver (e.g., RX 3) is smaller (or equal to) the average size (e.g., 3 frames) of all of the data portions in the data packet. Also, RX 3 is assigned PI=[1] for ID=11. Accordingly, a single receiver (e.g., RX 3) is assigned a PI value (e.g., PI=[1]) for only the ID to which that receiver is assigned as a member (e.g., ID=11).

As illustrated in table 2908 in FIG. 29, RX 4 is assigned as a member of ID=10, but not a member of ID=11. Accordingly, a single receiver is assigned as a member of no more than one ID (e.g., ID=10, but not also ID=11) because the size (e.g., 1 frame) of the data destined that receiver (e.g., RX 4) is smaller (or equal to) the average size (e.g., 3 frames) of all of data portions in the data packet. Also, RX 4 is assigned PI=[2] for ID=10. Accordingly, a single receiver (e.g., RX 4) is assigned a PI value (e.g., PI=[2]) for only the ID to which that receiver is assigned as a member (e.g., ID=10).

As illustrated in table 2912 in FIG. 29, RX 6 is assigned as a member of ID=1, but not a member of ID=10. Accordingly, a single receiver is assigned as a member of no more than one ID (e.g., ID=11, but not also ID=10) because the size (e.g., 2 frame) of the data destined that receiver (e.g., RX 6) is smaller (or equal to) the average size (e.g., 3 frames) of all of the data portions in the data packet. Also, RX 6 is assigned PI=[2] for ID=11. Accordingly, a single receiver (e.g., RX 6) is assigned a PI value (e.g., PI=[2]) for only the ID to which that receiver is assigned as a member (e.g., ID=11).

Referring back to FIG. 27, if QoS information is considered, at 2714, the transmitter may assign data portions having a size smaller than the average size to either the $1^{st}$ or $2^{nd}$ ID according to the QoS of the data portion. For example, referring to FIG. 29, the size (e.g., number of frames) of the data portions destined to RX 2, RX 3, RX 4, and RX 6 is 1 frame, 2 frames, 1 frame, and 2 frames, respectively. Since these data portions are each less than (or equal to) the average size of 3 frames, the data portions destined to RX 2, RX 3, RX 4, RX 6 may be assigned to either the $1^{st}$ ID or the $2^{nd}$ ID (but not both $1^{st}$ and $2^{nd}$ IDs) according to the QoS of the data portion destined to the respective receiver.

The QoS of the data portion destined to RX 2, RX 3, RX 4, RX 6 is QoS=5, QoS=3, QoS=4, QoS=2, respectively. Because the QoS (e.g., QoS=5) of the data portion destined to RX 2 is higher than the QoS (e.g., QoS=3) of the data portion destined to RX 3, RX 2 may be assigned to an earlier-transmitted portion of the data packet 3000 (see FIG. 30) than RX 3. Accordingly, RX 2 may be assigned as a member of ID=10 (which is associated with an earlier-transmitted portion (IDa=10) of the data packet 3000), and RX 3 may be assigned as a member of ID=11 (which is associated with a later-transmitted portion (IDb=11) of the data packet 3000). As illustrated in tables 2904, 2906 in FIG. 29, RX 2 and RX 3 are assigned the same PI (e.g., PI=[1]), even though the data portions destined to RX 2 and RX 3 have different QoS values.

Accordingly, two or more receivers (e.g., RX 2, RX 3) may be assigned the same PI (e.g., PI=[1]) when the average size of their data portions (e.g., 1 frame, 2 frames, respectively) is smaller than the average size (e.g., 3 frames) of all of the data portions in the data packet. Also, two or more receivers (e.g., RX 2, RX 3) may be assigned the same PI (e.g., PI=[1]) when the data portions destined to those two or more receiver (e.g., RX 2, RX 3) have different QoS values. When two or more receivers (e.g., RX 2, RX 3) are assigned the same PI (e.g., PI=[1]), the receiver(s) (e.g., RX 2) having the higher QoS value (e.g., QoS=5) may be assigned to an ID (e.g., ID=10) that corresponds to an earlier-transmitted portion (e.g., the portion associated with IDa=10) of the data packet 3000 (see FIG. 30), and the receiver(s) (e.g., RX 3) having the lower QoS value (e.g., 3) may be assigned to an ID (e.g., ID=11) that corresponds to a later-transmitted portion (e.g., the portion associated with IDb=11) of the data packet 3000 (see FIG. 30).

As another example, because the QoS (e.g., QoS=4) of the data portion destined to RX 4 is higher than the QoS (e.g., QoS=2) of the data portion destined to RX 6, RX 4 may be assigned to an earlier-transmitted portion (e.g., the portion associated with IDa=10) of the data packet 3000 (see FIG. 30) than RX 6. Accordingly, RX 4 may be assigned as a member of ID=10 (which is associated with an earlier-transmitted portion of the data packet 3000), and RX 6 may be assigned as a member of ID=11 (which is associated with a later-transmitted portion of the data packet 3000). As illustrated in tables 2908, 2912 in FIG. 29, RX 4 and RX 6 are assigned the same PI (e.g., PI=[2]), even though the data portions destined to RX 4 and RX 6 have different QoS values.

Accordingly, two or more receivers (e.g., RX 4, RX 6) may be assigned the same PI (e.g., PI=[2]) when the average size of their corresponding data portions (e.g., 1 frame, 2 frames, respectively) is less than the average size (e.g., 3 frames) of all of the data portions in the data packet. Also, two or more receivers (e.g., RX 4, RX 6) may be assigned the same PI (e.g., PI=[2]) when the data portions destined to those two or more receiver (e.g., RX 4, RX 6) have different QoS values. When two or more receivers (e.g., RX 4, RX 6) are assigned the same PI (e.g., PI=[2]), the receiver(s) (e.g., RX 4) having the higher QoS value (e.g., QoS=4) may be assigned to an ID (e.g., ID=10) that corresponds to an earlier-transmitted portion (e.g., the portion associated with IDa=10) of the data packet 3000 (see FIG. 30), and the receiver(s) (e.g., RX 6) having the lower QoS value (e.g., QoS=2) may be assigned to an ID (e.g., ID=11) that corresponds to a later-transmitted portion (e.g., the portion associated with IDb=11) of the data packet 3000 (see FIG. 30).

In some configurations, the position information assigned to two or more destinations is the same for two or more identifiers, wherein the two or more identifiers correspond to two or more particular identifiers with which the data packet is associated. For example, referring to FIGS. 29 and 30, RX 2 and RX 3 are assigned the same position information (e.g., PI=[1]) for two identifiers (e.g., ID=10 and ID=11, respectively), and these two identifiers (e.g., ID=10 and ID=11) correspond to the particular identifiers (e.g., IDa=10 and IDb=11) of the data packet 3000. As another example, again referring to FIGS. 29 and 30, RX 4 and RX 6 are assigned the same position information (e.g., PI=[2]) for two identifiers (e.g., ID=10 and ID=11, respectively), and these two identifiers (e.g., ID=10 and ID=11) correspond to the particular identifiers (e.g., IDa=10 and IDb=11) of the data packet 3000.

In some configurations, the position information assigned to one destination is the same for two or more identifiers, wherein the two or more identifiers correspond to two or more particular identifiers with which the data packet is associated. For example, referring to FIGS. 29 and 30, RX 1 is assigned the same position information (e.g., PI=[0]) for two identifiers (e.g., ID=10 and ID=11, respectively), and these two identifiers (e.g., ID=10 and ID=11) correspond to the particular identifiers (e.g., IDa=10 and IDb=11) of the data packet 3000. As another example, RX 6 is assigned the same position information (e.g., PI=[3]) for two identifiers (e.g., ID=10 and ID=11, respectively), and these two identifiers (e.g., ID=10 and ID=11) correspond to the particular identifiers (e.g., IDa=10 and IDb=11) of the data packet 3000.

Referring to FIG. 27, at 2716, the transmitter may transmit one or more frames configured to assign the MI and/or PI of one or more receivers. The frames may be configured to assign the MI and/or PI of the receivers in accordance with any one or more of the various configurations described supra.

Referring to FIG. 28, at 2802, the receiver (e.g., one or more of RXs 1-6) may receive the frame configured to assign the MI and/or PI for at least a $1^{st}$ ID and a $2^{nd}$ ID of that receiver.

Referring to FIG. 27, at 2718, the transmitter may include timing information (which may sometimes be referred to herein as timing adjustment (TA)) in the data packet. Generally, for a space-time stream having two or more data portions each destined to a different receiver, the TA may indicate a time, symbol, or bit that marks the end of the data portion destined to a first receiver. The TA may also indicate a time, symbol, or bit that marks the beginning of the data portion destined to a second receiver.

For example, referring to FIG. 30, the portion 3002 of the data packet 3000 may include the timing information (TA) field 3006, which indicates a value y (a variable provided for illustrative purposes herein). In the example illustrated in FIG. 30, the value in TA field 3006 (e.g., y) corresponds to time 3050.

In some configurations, timing information may indicate at least an end of a first data portion destined to a first destination or a beginning of a second data portion destined to a second destination, wherein the first and second data portions are included in the same space-time stream. For example, referring to FIG. 30, the timing information may indicate an end of the data portion 3038 destined to RX 2. Also, the timing information may indicate an end of the data portion 3042 destined to RX 4. Further, the timing information may indicate the beginning of the data portion 3040 destined to RX 3. Further yet, the timing information may indicate the beginning of the data portion 3046 destined to RX 6.

In some configurations, timing information (e.g., TA) may correspond to an average size of the data portions in the data packet. For example, referring to FIG. 30, the TA field 3006 includes information (e.g., y) that corresponds to time 3050. Time 3050 correspond to the average size the data portions in the data packet. In data packet 3000, the data portions 3028, 3030, 3032, 3034 have an average size of three (3) frames. As illustrated in FIG. 30, time 3050 occurs approximately after the third frames and before fourth frame. As such, the TA is set to correspond to the average size of the data portions in the data packet.

As described supra with reference to FIG. 29, RX 2 and RX 3 are assigned the same PI (e.g., PI=[1]). Because RX 2 and RX 3 are assigned the same PI (e.g., PI=[1]), the data portions destined to RX 2, RX 3 may be included in the same space-time stream (e.g., STS 2). Referring to FIGS. 29 and 30, the data portion 3038 destined to RX 2 has a higher QoS (e.g. QoS=5) relative to the QoS (e.g., QoS=3) of the data portion 3040 destined to RX 3 and, therefore, is assigned as a member of an ID (e.g., ID=10) associated with an earlier-transmitted portion of the data packet (e.g., portion IDa 3008). The data portion 3038 destined to RX 2 may begin at time 3048. Based on the TA, RX 2 may determine that the end of the data portions 3038 destined to RX 2 is no later than time 3050. Accordingly, RX 2 may process data portion 3038 starting at time 3048 and refrain from processing data portions after time 3050 (e.g., RX 2 refrains from processing data portion 3040, which is destined to RX 3).

Referring to FIGS. 29 and 30, the data portion 3040 destined to RX 3 (e.g., QoS=3) has a lower QoS relative to the QoS of the data portion 3038 destined to RX 2 (e.g., QoS=5) and, therefore, is assigned as a member of an ID (e.g., ID=11) associated with a subsequently-transmitted portion of the data packet (e.g., portion IDb 3018). As illustrated in FIG. 30, the data portion 3040 destined to RX 3 is included in the same space-time stream (e.g., STS 2) as the data portion 3038 destined to RX 2. Accordingly, RX 3 may refrain from processing the data portion 3038 destined to RX 2 (e.g., portion IDa 3008). However, RX 3 may need to determine the start of the data portion 3040 destined to RX 3 (e.g., portion IDb 3018) in order to begin processing that data portion 3040 at the appropriate time. The value in the TA field 3006 may indicate to RX 3 that time 3050 is associated with the beginning of the data portions 3040 destined to RX 3. Accordingly, RX 3 may refrain from processing the data portion 3038 (destined to RX 2) before time 3050, and RX 3 may process the data portion 3040 (destined to RX 3) after time 3050.

As described supra with reference to FIG. 29, RX 4 and RX 6 are assigned the same PI (e.g., PI=[2]). Because RX 4 and RX 6 are assigned the same PI (e.g., PI=[2]), the data portions destined to RX 4 and RX 6 may be included in the same space-time stream (e.g., STS 3). Referring to FIGS. 29, 30, the data portion 3042 destined to RX 4 has a higher QoS (e.g. QoS=4) relative to the QoS (e.g., QoS=2) of the data portion 3046 destined to RX 6 and, therefore, is assigned as a member of an ID (e.g., ID=10) associated with an earlier-transmitted portion of the data packet (e.g., portion IDa 3008). The data portion 3042 destined to RX 4 may begin at time 3048. Based on the TA, RX 4 may determine that the end of the data portions 3042 destined to RX 4 is no later than time 3050. Accordingly, RX 4 may process data portion 3042 starting at time 3048 and refrain from processing data portions after time 3050 (e.g., RX 4 refrains from processing data portion 3046, which is destined to RX 6).

Referring to FIGS. 29 and 30, the data portion 3044 destined to RX 6 (e.g., QoS=2) has a lower QoS relative to the QoS of the data portion 3042 destined to RX 4 (e.g., QoS=4) and, therefore, is assigned as a member of an ID (e.g., ID=11) associated with a subsequently-transmitted portion of the data packet (e.g., portion IDb 3018). As illustrated in FIG. 30, the data portion 3044 destined to RX 6 is included in the same space-time stream (e.g., STS 3) as the data portion 3042 destined to RX 4. Accordingly, RX 6 may refrain from processing the data portion 3042 destined to RX 4 (e.g., portion IDa 3008). However, RX 3 may need to determine the start time/location/symbol/bit of the data portion 3046 destined to RX 6 (e.g., the portion associated with IDb 3018) in order to begin processing that data portion 3046 at the appropriate time. The value in the TA field 3006 may indicate to RX 6 that time 3050 is associated with the beginning of the data portions 3046 destined to RX 6. Accordingly, RX 6 may refrain from processing the data portion 3042 (destined to RX 4) before time 3050, and RX 6 may process the data portion 3046 (destined to RX 6) after time 3050.

Although the examples described supra include one TA (e.g., TA 3006), one of ordinary skill understands that more than one TA may be used without deviating from the scope of the claims or disclosure provided herein. Accordingly, the number of TAs shall not be construed as a limitation of the scope of the claims or disclosure provided herein. For example, alternative configurations may have three data portions (or more) in a single data stream. As another example, different TAs may be provided for each space-time stream. For example, four different TAs may be provided in a data packet having four space-time streams each having two data portions such that a different TA corresponds to the start time of the second data portion (and/or the end time of the first data portion) for each of the space-time streams. Alternative configurations of may be implemented by one of ordinary skill in the art without deviating from the disclosure or scope of the claims.

Referring to FIG. 27, at 2718, the transmitter may also include a stack bit in the data packet. For example, referring to FIG. 30, the transmitter may include the stacking bit (SB) 3004 in the portion 3002 of the data packet 3000. In this example, the SB 3004 indicates a value x (a variable provided for illustrative purposes herein).

In some configurations, the stack bit may be included in the inter-frame spacing between two consecutive data frames. The stack bit may indicate an end of the data destined to a first receiver or destination. After the first receiver or destination processes the data frame preceding the stack bit, that receiver may receive the stack bit in the inter-frame spacing. Upon receiving the stack bit, that receiver may refrain from processing any data that follows the stack bit.

As described supra, RX 2 and RX 3 have the same PI (e.g., PI=[1]) and, thus, the data destined to RX 2 and RX 3 are included in the same space-time stream (e.g., STS 2) of the data packet (e.g., data packet 3000). As described supra, RX 4 and RX 6 have the same PI (e.g., PI=[2]) and, thus, the data destined to RX 4 and RX 6 are included in the same space-time stream (e.g., STS 3) of the data packet (e.g., data packet 3000).

Where two or more data portions are destined to receivers assigned the same PI, the receivers may benefit from information in the data packet to inform a receiver that a particular space-time stream includes data portions destined to that particular receiver. Such information may be included in the stack bit. The stack bit may include information that indicates that one or more of the space-time streams includes two or more space-time streams. In some configurations, the stack bit may include information that indicates that a single space-time stream (e.g., STS 2 or STS 3) each include more than one data portion destined to a different receiver (e.g., STS 2 include data portions destined to RX 2 and RX 3; STS 3 includes data portions destined to RX 4 and RX 6). In some configurations, the stack bit may include information indicating that the data portion destined to one receiver (e.g., RX 3) is included in a particular space-time stream (e.g., STS 2). In some configurations, the stack bit may include information indicating that the data portion destined to a particular receiver (e.g., RX 3) is included after the data portion destined to a different receiver (e.g., RX 2) in the same space-time stream (e.g., STS 2).

In some configurations, the stack bit may include information associated with the timing information described supra. In some configurations, the stack bit may include timing information indicating the start and/or end of one or more data portions destined to different receivers and included in the same space-time stream. For example, the stacking bit may include timing information indicating that the data portions 3038 destined to RX 2 begins at time 3048 and end no later than time 3050. The stacking bit may also include timing information indicating that the data portion 3040 destined to RX 3 begins at time 3050 and ends no later than time 3052.

Referring back to FIG. 27, at 2720, the transmitter may transmit the data portions in a single data packet. In particular, the transmitter may transmit the data portions that are smaller than, equal to, and larger than the average size of the data portions destined to the receivers in a single data packet. For example, referring to FIG. 30, the transmitter may transmit a single data packet 3000, which includes data portions 3036, 3038, 3040, 3042, 3044, 3046 destined to RX 1, RX 2, RX 3, RX 4, RX 5, RX 6, respectively. The data packet may include two or more IDs. For example, referring to FIG. 30, the portion 3002 of the data packet 3000 includes IDa field 3008 having value IDa=10 and IDb field 3018 having the value IDb=11.

Referring to FIG. 28, at 2804, the receiver may receive a data packet having at least a $1^{st}$ ID and a $2^{nd}$ ID. For example, referring to FIG. 30, a particular receiver (e.g. RX 1, RX 2, RX 3, RX 4, RX 5, or RX 6) may receive the portion 3002 of the data packet 3000. The portion 3002 of the data packet 3000 may include IDa field 3008 having value IDa=10 and IDb field 3018 having the value IDb=11. Because one or more receivers (e.g. RX 1, RX 2, RX 3, RX 4, RX 5, and/or RX 6) may each receive the data packet 3000 at the same time, and because the data packet 3000 includes two or more data portions (e.g. data portions 3036, 3038, 3040, 3042, 3044, 3046) destined to different receivers (e.g., RX 1, RX 2, RX 3, RX 4, RX 5, RX 6, respectively), a particular receiver (e.g., RX 1, RX 2, RX 3, RX 4, RX 5, and/or RX 6) may need to determine whether the data packet 3000 includes any—and, if so, which and how many—data portions destined to that particular receiver. Such a determination may be based on the $1^{st}$ ID and/or $2^{nd}$ ID included in the data packet, as described in further detail infra.

Referring to FIG. 28, at 2806, based on the $1^{st}$ ID field, the receiver may determine that the receiver is the destination of a first data portion of two or more data portions in a single space-time stream of the data packet. For example, as illustrated in table 2904 in FIG. 29, RX 2 is assigned as a member of ID=10. Referring to FIG. 30, the IDa field 3008 of the data packet 3000 has a value of 10 (e.g., IDa=10). Because the IDa field 3008 has a value (e.g., IDa=10) that corresponds to the ID (e.g., ID=10) to which RX 2 is assigned, RX 2 may determine that RX 2 is the destination of the first (e.g., earlier) data portion 3038 of the two data portions 3038, 3040 in STS 2. In this example, the two data portions 3038, 3040 are each destined to different receivers (e.g., RX 2, RX 3, respectively). In another example, as illustrated in table 2908 in FIG. 29, RX 4 is assigned as a member of ID=10. Referring to FIG. 30, the IDa field 3008 of the data packet 3000 has a value of 10 (e.g., IDa=10). Because the IDa field 3008 has a value (e.g., IDa=10) that corresponds to the ID (e.g., ID=10) to which RX 4 is assigned, RX 4 may determine that RX 4 is the destination of the first (e.g., earlier) data portion 3042 of the two data portions 3042, 3044 in STS 3. In this example, the two data portions 3042, 3044 are each destined to different receivers (e.g., RX 4, RX 6, respectively).

Referring back to FIG. 28, at 2808, the receiver may determine the end of the first data portion based on a timing information in the data packet. For example, referring to FIG. 30, RX 2 may determine that the end of the first (e.g., earlier) data portion 3038 is no later than time 3050. Such a determination may be based on information included in the TA field 3006 of the portion 3002 of the data packet 3000. As another example, RX 4 may determine that the end of the first (e.g., earlier) data portion 3042 is no later than time 3050. Such a determination may be based on information included in the TA field 3006 of the portion 3002 of the data packet 3000.

In some configurations, the particular identifier with which the data packet is associated includes a first particular identifier and a second particular identifier. The data packet may further include at least one space-time stream having a first data portion destined to a first destination and associated with the first particular identifier with which the data packet is associated, and a second data portion destined to a second destination and associated with the second particular identifier with which the data packet is associated. For example, referring to FIGS. 29 and 30, data packet 3000 includes IDa=10 and IDb=11. The data packet 3000 may further include at least one space-time stream (e.g., the space-time stream corresponding to data 3030) having data portion 3038 destined to RX 2 and associated with IDa=10 of the data packet 3000, and data portion 3040 destined to RX 3 and associated with IDb=11 of the data packet 3000. As another example, the data packet 3000 may further include at least one space-time stream (e.g., the space-time stream corresponding to data 3032) having data portion 3042 destined to RX 4 and associated with IDa=10 of the data packet 3000, and data portion 3046 destined to RX 6 and associated with IDb=11 of the data packet 3000.

In some configurations, a receiver may process a first data portion of two or more data portions in the same space-time stream when one of the two or more particular identifiers with which the data packet is associated corresponds to an identifier for which a position information was assigned by the frame, and refrain from processing other data portions of the two or more data portions in the same space-time stream. For example, referring to FIGS. 29 and 30, RX 2 may process data portion 3038 because IDa=10 of the data packet 3000 corresponds to ID=10 for which a position information (e.g., PI=[1]) was assigned by the frame, and RX 2 may refrain from processing data portion 3040. As another example, RX 3 may process data portion 3040 because IDb=10 of the data packet 3000 corresponds to ID=11 for which a position information (e.g., PI=[1]) was assigned by the frame, and RX 3 may refrain from processing data portion 3038.

The number of IDs included in the data packet may vary. In some configurations, the number of IDs included in the data packet may be based on the number of IDs that a receiver or destination may be configured to receive or process. For example, in the example illustrated supra, each of the receivers (e.g., RXs 1-6) is configured to accommodate values for at least two IDs; accordingly, the data packet transmitted (and thus received by the receivers RXs 1-6) includes at least two IDs (e.g., IDa and IDb). Because one of ordinary skill in the art understands that receivers may be configured to receiver fewer or greater numbers of IDs in a single data packet and that transmitters may be configured to transmit fewer or greater numbers of IDs in a single data packet, the number of IDs described in the examples provided herein shall not limit the scope of the claims or disclosure provided herein.

Referring to FIG. 28, at 2810, the receiver may process the first data portion and refrain from processing any data portions following/after the end of the first data portion. For example, referring to FIG. 30, RX 2 may process the first (e.g., earlier) data portion 3038 and refrain from processing the data portion 3040, which is following/after the end time 3050. As another example, RX 4 may process the first (e.g., earlier) data portion 3042 and refrain from processing the data portion 3046, which is following/after the end time 3050.

In some configurations, a stack bit may indicate that two or more data portions are included in at least one space-time stream of the data packet. For example, referring to FIG. 30, stack bit (SB) 3004 may indicate that data portions 3038, 3040 are included in a single space-time stream (e.g., the space-time stream corresponding to data 3030). As another example, the SB 3004 may indicate that data portions 3042, 3046 are included in a single space-time stream (e.g., the space-time stream corresponding to data 3032).

Referring to FIG. 28, at 2812, based on the $2^{nd}$ ID value or the stack bit, the receiver may determine that the receiver is the destination of a second (e.g., subsequent) data portion of the two or more data portions in a single space-time stream of the data packet. For example, as illustrated in table 2906 in FIG. 29, RX 3 is assigned as a member of ID=11. Referring to FIG. 30, the IDb field 3018 of the data packet 3000 has a value of 11 (e.g., IDa=11). Because the IDb field 3018 has a value (e.g., IDb=11) that corresponds to the ID (e.g., ID=11) to which RX 3 is assigned, RX 3 may determine that RX 3 is the destination of the second (e.g., subsequent) data portion 3040 of the two data portions 3038, 3040 in STS 2. Alternatively, the stack bit (e.g., SB 3004) may include information (e.g., represented generally as x) that indicates that the second (e.g., subsequent) data portion 3040 in STS 2 is destined to RX 3. Accordingly, RX 3 may determine that RX 3 is the destination of the second (e.g., subsequent) data portion 3040 of the two data portions 3038, 3040 in STS 2. As another example, as illustrated in table 2912 in FIG. 29, RX 6 is assigned as a member of ID=11. Referring to FIG. 30, the IDb field 3018 of the data packet 3000 has a value of 11 (e.g., IDa=11). Because the IDb field 3018 has a value (e.g., IDb=11) that corresponds to the ID (e.g., ID=11) to which RX 6 is assigned, RX 6 may determine that RX 6 is the destination of the second (e.g., subsequent) data portion 3046 of the two data portions 3042, 3046 in STS 3. Alternatively, the stack bit (e.g., SB 3004) may include information (e.g., represented generally as x) that indicates that the second (e.g., subsequent) data portion 3046 in STS 3 is destined to RX 6. Accordingly, RX 6 may determine that RX 6 is the destination of the second (e.g., subsequent) data portion 3046 of the two data portions 3042, 3046 in STS 3.

Referring to FIG. 28, at 2814, the receiver may determine the start of the second data portion based on a timing information in the data packet. For example, referring to FIG. 30, RX 3 may determine that the start of the second (e.g., subsequent) data portion 3040 is at time 3050. Such a determination may be based on information included in the TA field 3006 of the portion 3002 of the data packet 3000. As another example, RX 6 may determine that the start of the second (e.g., subsequent) data portion 3046 is at time 3050. Such a determination may be based on information included in the TA field 3006 of the portion 3002 of the data packet 3000.

Referring to FIG. 28, at 2816, the receiver may refrain from processing any data portions preceding the second (e.g., subsequent) data portion and process the second (e.g., subsequent) data portion. For example, referring to FIG. 30, RX 3 may refrain from processing the first (e.g., earlier) data portion 3040, which precedes the second (e.g., subsequent) data portion 3038. Also, RX 3 may determine to process the second (e.g., subsequent) data portion 3040. Accordingly, RX 3 may refrain from processing any data portion preceding/before time 3050 and may process at least one data portion starting after/following time 3050. As another example, RX 6 may refrain from processing the first (e.g., earlier) data portion 3042, which precedes the second (e.g., subsequent) data portion 3046. Also, RX 6 may determine to process the second (e.g., subsequent) data portion 3046. Accordingly, RX 3 may refrain from processing any data portion preceding/before time 3050 and may process at least one data portion starting after/following time 3050.

Referring to FIG. 28, at 2818, based on the $1^{st}$ and $2^{nd}$ ID values, the receiver may determine that the receiver is the destination of the first and second data portions of two or more data portions in a single space-time stream of the data packet. For example, as illustrated in table 2902 in FIG. 29, RX 1 is assigned as a member of ID=10 and ID=11. Referring to FIG. 30, the IDa field 3008 of the data packet 3000 has a value of 10 (e.g., IDa=10), and the IDb field 3018 of the data packet 3000 has a value of 11 (e.g., IDb=11). Because both the IDa field 3008 and the IDb field 3018 have values (e.g., IDa=10 and IDb=11, respectively) that correspond to the IDs (e.g., ID=10 and ID=11) to which RX 1 is assigned as a member (e.g., MI=1 for ID=10, and MI=1 for ID=11), RX 1 may determine that RX 1 is the destination of both the first data portion 3036 (e.g., data portion between time 3048 and time 3050) and the second data portion 3036 (e.g., data portion between time 3050 and time 3052) in STS 1. In this example, the first and second portions of data 3036 are both destined to the same receiver (e.g., RX 1). In this example, the first and second portions of data 3036 are contiguous. As another example, as illustrated in table 2910 in FIG. 29, RX 5 is assigned as a member of ID=10 and ID=11. Referring to FIG. 30, the IDa field 3008 of the data packet 3000 has a value of 10 (e.g., IDa=10), and the IDb field 3018 of the data packet 3000 has a value of 11 (e.g., IDb=11). Because both the IDa field 3008 and the IDb field 3018 have values (e.g., IDa=10 and IDb=11, respectively) that correspond to the IDs (e.g., ID=10 and ID=11) to which RX 5 is assigned as a member (e.g., MI=1 for ID=10, and MI=1 for ID=11), RX 5 may determine that RX 5 is the destination of both the first data portion 3044 (e.g., data portion between time 3048 and time 3050) and the second data portion 3044 (e.g., data portion between time 3050 and time 3052) in STS 4. In this example, the first and second portions of data 3044 are both destined to the same receiver (e.g., RX 5). In this example, the first and second portions of data 3044 are contiguous.

Referring to FIG. 28, at 2820, the receiver may process the first and second data portions. For example, referring to FIG. 30, RX 1 may process first data portion 3036 (e.g., data portion between time 3048 and time 3050) and the second data portion 3036 (e.g., data portion between time 3050 and time 3052) in STS 1. As another example, RX 5 may process the first data portion 3044 (e.g., data portion between time 3048 and time 3050) and the second data portion 3044 (e.g., data portion between time 3050 and time 3052) in STS 4.

Figure 31A:
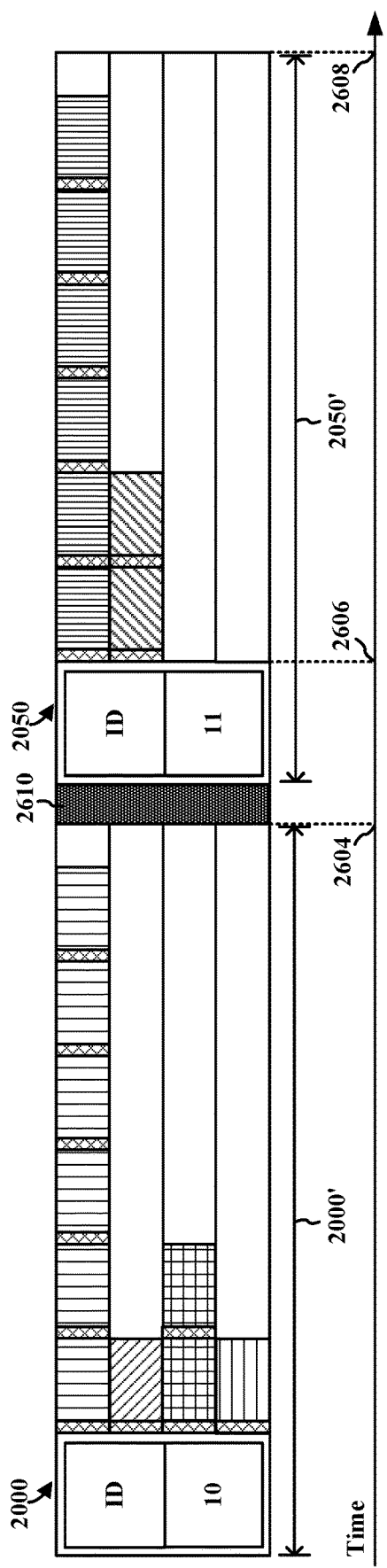
FIGS. 31A-31C illustrate a comparison between the example data packets illustrated in FIGS. 21 and 30.
Figure 31C:
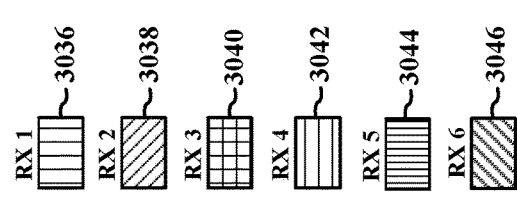
Figure 31B:
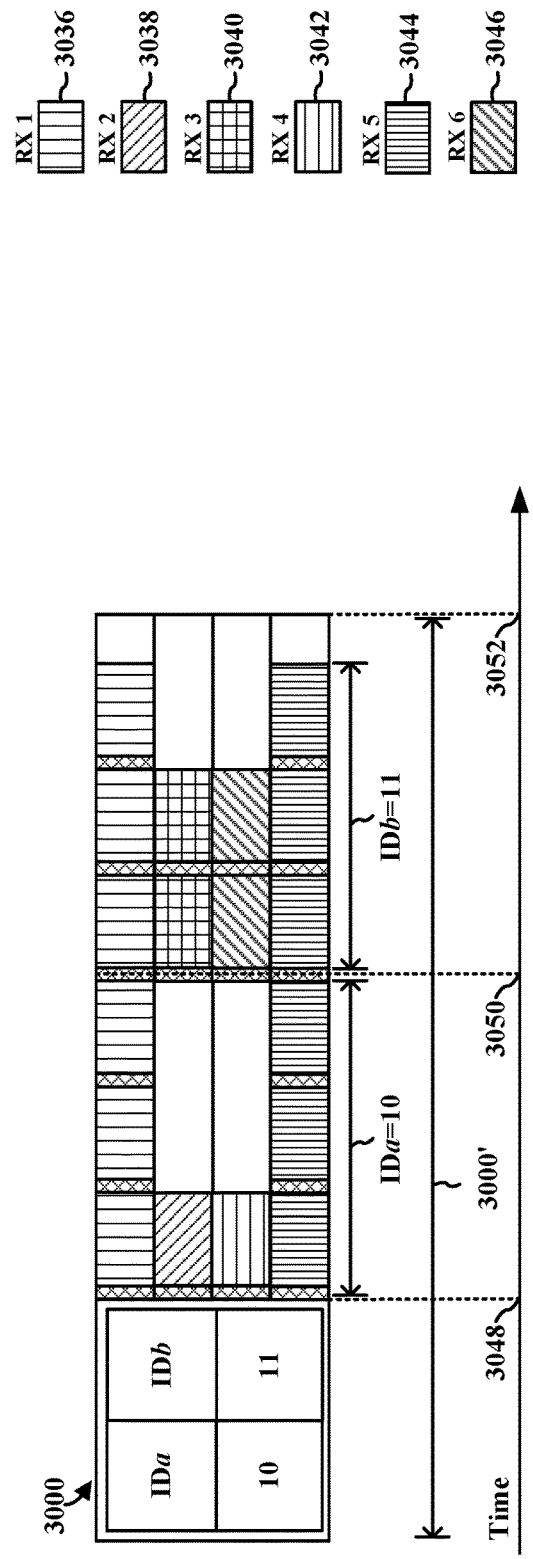

FIGS. 31A-31C illustrate a comparison between the example data packets illustrated in FIGS. 21 and 30. In particular, FIG. 31A illustrates the representative size of the two data packet 2000, 2050, as described supra with respect to FIG. 21. The representative size of the first-transmitted data packet 2000 is 2000', and the represented size of the subsequently-transmitted data packet 2050 is 2050'. As discussed in greater detail supra, wait time (e.g., spacing) 2610 may separate two sequential data packets (e.g., 2000, 2050). FIG. 31B illustrates the representative size of a single data packet 3000, as described supra with respect to FIG. 30. The size of data packet 3000 is 3000'. FIG. 31C provides a legend depicting the respective destination of the data frames shown in FIGS. 31A and 31B.

As illustrated in FIG. 31A with 31B, the data portions destined to their respective destination(s) may be transmitted (and thus received) using the two data packets 2000, 2050 (see FIG. 31A) or the single data packet 3000 (see FIG. 31B). However, a comparison between the two data packets 2000, 2050 (see FIG. 31A) and the single data packet 3000 (see FIG. 31B) reveals certain advantages associated with using the single data packet 3000.

With respect to the data packet 3000 (see FIG. 31B), all of the data portions 3036, 3038, 3040, 3042, 3044, 3046 respectively destined to RX 1, RX 2, RX 3, RX 4, RX 5, RX 6 are transmitted (or received) by time 3052. In comparison, with respect to the data packets 2000, 2050 (see FIG. 31A), all of the data portions 3036, 3038, 3040, 3042, 3044, 3046 respectively destined to RX 1, RX 2, RX 3, RX 4, RX 5, RX 6 are transmitted (or received) by time 2608, which is later than time 3052.

With respect to the data packet 3000 (see FIG. 31B), the data portion 3044 destined to RX 5 is transmitted (or received) starting at time 3048. In comparison, with respect to the data packets 2000, 2050 (see FIG. 31A), the data portion 3044 destined to RX 5 is transmitted (or received) starting at time 2606, which is later than time 3048.

With respect to the data packet 3000 (see FIG. 31B), the data portion 3046 destined to RX 6 is transmitted (or received) starting at time 3050. In comparison, with respect to the data packets 2000, 2050 (see FIG. 31A), the data portion 3046 destined to RX 6 is transmitted (or received) starting at time 2606, which is later than time 3050.

As illustrated, the data packet 3000 (see FIG. 31B) allows for transmission/reception of the same number of data frames as the combination of data packets 2000, 2050 (see FIG. 31A). However, the data frames transmitted/received FIG. 31B are included in a single data packet (e.g., data packet 3000), whereas the data frames transmitted/received in FIG. 31A are included in two data packets (e.g., data packets 2000, 2050).

A reduction in the number of different data packets provides some advantages to transmitters and receivers. For example, a transmitter may be able to conserve computing and power resources because fewer headers may be needed (due to the fewer number of data packets being transmitted/received). Similarly, a receiver may conserve computer and power resources because fewer headers may need to be processed (due to the fewer number of data packets being transmitted/received). Also, fewer inter-data packet wait times (e.g., wait time 2610; see FIG. 31A) are needed (due to the fewer number of data packets being transmitted). Accordingly, transmitters may be able to deliver more data in less time, and receivers may be able to receive more data in less time, thereby providing an opportunity for an increase in throughput. Although certain advantages have been described herein, additional advantages exist and are readily apparent to one of ordinary skill in the art.

The foregoing are example configurations and example configurations of the present disclosure and are not intended to limit the scope of the claims herein. Alternative configurations and embodiments will be readily apparent to one of ordinary skill in the art without deviating from the scope of the claims and disclosure provided herein.

In one aspect, one of ordinary skill in the art will appreciate that PI and STS are related to each other. For example, one of ordinary skill in the art may appreciate that PI=[0] may correspond to STS 1, PI=[1] may correspond to STS 2, PI=[2] may correspond to STS 3, and/or PI=[3] may correspond to STS 4. One of ordinary skill in the art may also appreciate that reciprocal relationships may exist. For example, STS 1 may correspond to PI=[0], STS 2 may correspond to PI=[1], STS 3 may correspond to PI=[2], and/or STS 4 may correspond to PI=[3]. One of ordinary skill in the art may further appreciate that similar relationships may exist with respect to any one or more of the figures, illustrations, and disclosures provided herein.

Figure 32:
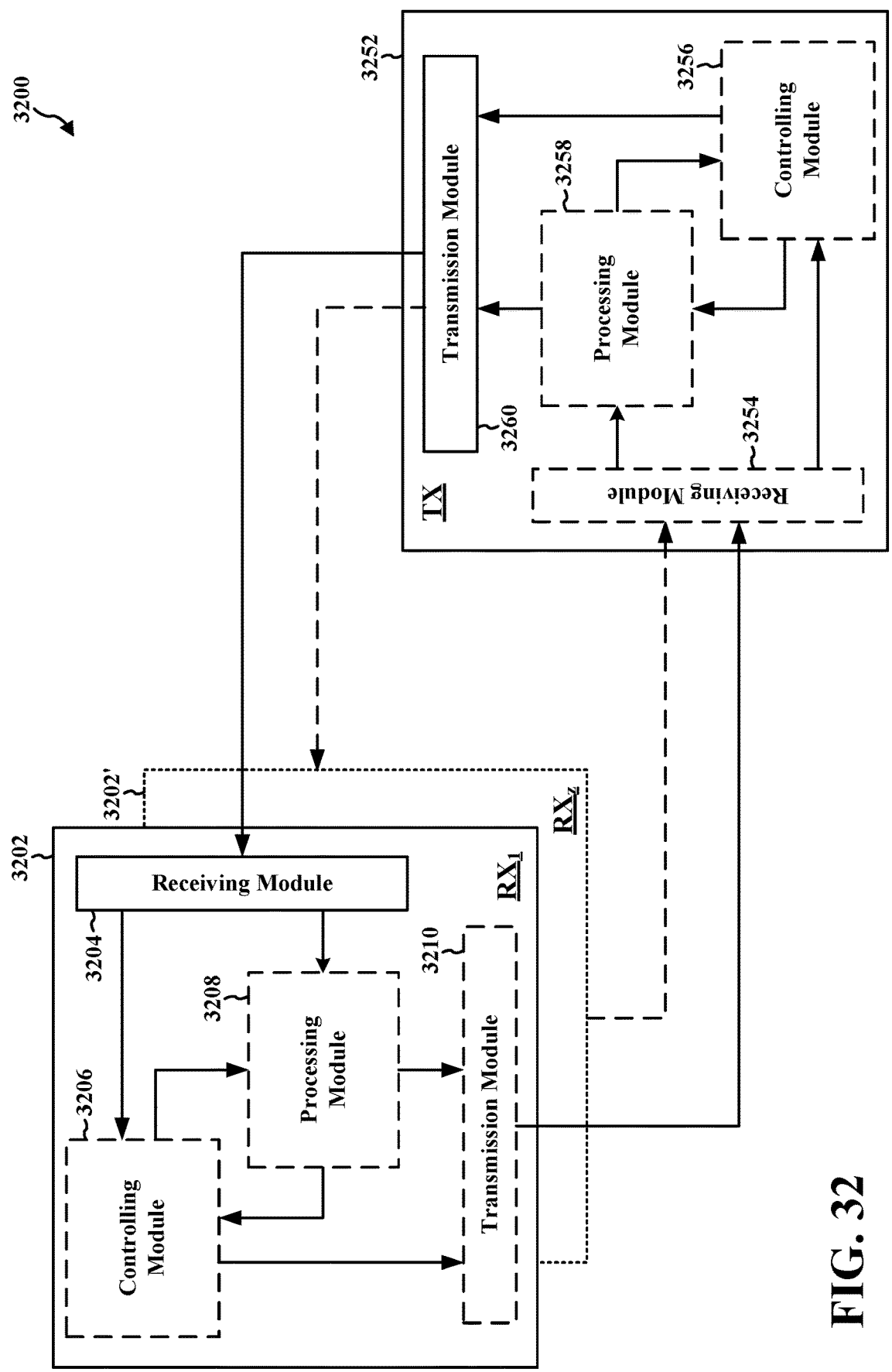
FIG. 32 illustrates an example of a conceptual data flow diagram of various apparatuses having various example modules, means, and/or components.

FIG. 32 illustrates an example conceptual data flow diagram of example apparatuses having various example modules, means, and/or components. More specifically, FIG. 32 illustrates an example conceptual data flow diagram of an apparatus 3202 having different modules, means, and/or components. The apparatus 3202 may be one of one or more receivers (e.g., $RX_1$ through $RX_Z$). Each receiver may be a station, an access point, or any other apparatus configured to receive and/or transmit data.

The apparatus 3202 may include a receiving module 3204. The apparatus 3202 may include a controlling module 3206. The apparatus 3202 may include a processing module 3208. The apparatus 3202 may include a transmission module 3210. The aforementioned modules are described in further detail infra.

The receiving module 3204 may be configured to receive a frame configured to assign at least member information or position information for one or more identifiers. The receiving module 3204 may be configured to receive a data packet associated with a particular identifier and indicating a number of space-time streams for one or more position information.

In some configurations, the frame may be individually-addressed to the apparatus 3202. In some configurations, the frame may be received at a time that is different from a reception time of a different frame addressed to a different destination. In some configurations, the frame may be received after the apparatus 3202 joins a basic service set. In some configurations, the frame may be received at a rate based on at least traffic patterns or channel characteristics.

The transmission module 3210 may be configured to transmit an acknowledgement (ACK) in response to receiving the frame, wherein the data packet is received after the ACK is transmitted. In some configurations, assigning at least the member information or the position information comprises replacing values stored in the apparatus 3202 with values in the frame. In some configurations, the position information is assigned for each of the one or more identifiers to which the apparatus 3202 is a member.

The processing module 3208 may be configured to refrain from processing all space-time streams in the data packet when the particular identifier with which the data packet is associated does not correspond to an identifier for which a position information was assigned by the frame. In some configurations, the controlling module 3206 may be configured to determine whether the apparatus 3202 is a destination of one or more space-time streams in the data packet based on whether the particular identifier with which the data packet is associated corresponds to at least one of the identifiers for which a position information was assigned by the frame. In some configurations, the data packet includes a first portion indicating a number of space-time streams associated with a first position information, and a second portion indicating a number of space-time streams associated with a second position information.

The controlling module 3206 system may be configured to determine a number of space-time streams in the data packet destined to a destination (e.g., the apparatus 3202) based on the position information assigned by the frame. The controlling module 3206 may be configured to consider a number of space-time streams associated with position information different from the position information assigned by the frame to determine which of the space-time streams in the data packet are destined to a destination (e.g., the apparatus 3202). In some configurations, a first space-time stream of one or more space-time streams destined to a first destination begins after a last space-time stream of one or more space-time streams destined to a second destination.

In some configurations, the data packet is a multi-user data packet when the identifier has one of a first subset of possible values, and the data packet is a single-user data packet when the identifier has one of a second subset of possible values. In some configurations, the data packet includes an abbreviated indication of a destination when the data packet is a single-user data packet.

The data packet may include a reference symbol and a subsequent symbol. In configurations, the controlling module 3206 may be configured to differentiate the data packet as a very high throughput (VHT) data packet rather than a non-VHT data packet when the subsequent symbol is quadrature binary phase shift keying (QBPSK)-modulated. In some configurations, the controlling module 3206 may be configured to differentiate the data packet as a very high throughput (VHT) data packet rather than a non-VHT data packet when the subsequent symbol has a 90° counter-clockwise rotation relative to the reference symbol.

The data packet may include a reference symbol and a preceding symbol. In some configurations, the controlling module 3206 may be configured to differentiate the data packet as a very high throughput (VHT) data packet rather than a non-VHT data packet when the preceding symbol and the reference symbol are binary phase shift keying (BPSK)-modulated. In some configurations, the controlling module 3206 may be configured to differentiate the data packet as a very high throughput (VHT) data packet rather than a non-VHT data packet when the reference symbol has no rotation relative to the preceding symbol.

The controlling module 3206 may be configured to determine whether a number of data portions destined to different destinations is greater than a number of space-time streams available in a single data packet. In some configurations, at least the member information or the position information is assigned by the frame according to a quality of service of data destined to a destination (e.g., the apparatus 3202). In some configurations, data having a higher quality of service has at least a lower contention window, a shorter inter-frame spacing, or a higher transmission opportunity limit relative to data having a lower quality of service. In some configurations, at least the member information or the position information is assigned by the frame according to the size of data destined to a destination (e.g., the apparatus 3202).

In some configurations, the position information assigned to two or more destinations is the same for two or more identifiers, wherein the two or more identifiers correspond to two or more particular identifiers with which the data packet is associated. In some configurations, the position information assigned to one destination is the same for two or more identifiers, wherein the two or more identifiers correspond to two or more particular identifiers with which the data packet is associated. In some configurations, the data packet may include timing information indicating at least an end of a first data portion destined to a first destination or a beginning of a second data portion destined to a second destination, wherein the first and second data portions are included in the same space-time stream.

In some configurations, the particular identifier with which the data packet is associated may include a first particular identifier and a second particular identifier. In such configurations, the data packet may include at least one space-time stream having a first data portion destined to a first destination and associated with the first particular identifier with which the data packet is associated, and a second data portion destined to a second destination and associated with the second particular identifier with which the data packet is associated.

In some configurations, the particular identifier with which the data packet is associated comprises two or more particular identifiers. In such configurations, the processing module 3208 may be configured to process a first data portion of two or more data portions in the same space-time stream when one of the two or more particular identifiers with which the data packet is associated corresponds to an identifier for which a position information was assigned by the frame, and refrain from processing other data portions of the two or more data portions in the same space-time stream.

In some configurations, a stack bit indicating that two or more data portions may be included in at least one space-time stream of the data packet.

FIG. 32 also illustrates an example conceptual data flow diagram of an apparatus 3252 having different modules, means, and/or components. The apparatus 3252 may be a transmitter (e.g., TX). The transmitter may be a station, an access point, or any other apparatus configured to receive and/or transmit data.

The apparatus 3252 may include a receiving module 3254. The apparatus 3252 may include a controlling module 3256. The apparatus 3252 may include a processing module 3258. The apparatus 3252 may include a transmission module 3260. The aforementioned modules are described in further detail infra.

The transmission module 3260 may be configured to transmit a frame configured to assign at least member information or position information for one or more identifiers. The transmission module 3260 may be configured to transmit a data packet associated with a particular identifier and indicating a number of space-time streams for one or more position information.

In some configurations, the frame may be individually-addressed to a destination (e.g., the apparatus 3202). In some configurations, the frame may be received at a time that is different from a reception time of a different frame addressed to a different destination. In some configurations, the frame may be received after a destination (e.g., the apparatus 3202) joins a basic service set. In some configurations, the frame may be received at a rate based on at least traffic patterns or channel characteristics.

The receiving module 3254 may be configured to receive an acknowledgement (ACK) in response to transmitting the frame, wherein the data packet is received after the ACK is transmitted. In some configurations, assigning at least the member information or the position information comprises replacing values stored in a destination (e.g., the apparatus 3202) with values in the frame. In some configurations, the position information is assigned for each of the one or more identifiers to which a destination (e.g., the apparatus 3202) is a member.

In some configurations, the frame and/or data packet may be configured such that a destination (e.g., a receiver or the apparatus 3202) refrains from processing all space-time streams in the data packet when the particular identifier with which the data packet is associated does not correspond to an identifier for which a position information was assigned by the frame. In some configurations, the frame and/or data packet may be configured such that a receiver (e.g., the apparatus 3202) determines whether the receiver (e.g., the apparatus 3202) is a destination of one or more space-time streams in the data packet based on whether the particular identifier with which the data packet is associated corresponds to at least one of the identifiers for which a position information was assigned by the frame. In some configurations, the data packet includes a first portion indicating a number of space-time streams associated with a first position information, and a second portion indicating a number of space-time streams associated with a second position information.

In some configurations, the frame and/or data packet may be configured such that a destination (e.g., a receiver or the apparatus 3202) determines a number of space-time streams in the data packet destined to the receiver (e.g., the apparatus 3202) based on the position information assigned by the frame. In some configurations, the frame and/or data packet may be configured such that a receiver considers a number of space-time streams associated with position information different from the position information assigned by the frame to determine which of the space-time streams in the data packet are destined to the receiver (e.g., the apparatus 3202). In some configurations, a first space-time stream of one or more space-time streams destined to a first destination (e.g., a first receiver or the apparatus 3202) begins after a last space-time stream of one or more space-time streams destined to a second destination (e.g., a second receiver or the apparatus 3202').

In some configurations, the data packet is a multi-user data packet when the identifier has one of a first subset of possible values, and the data packet is a single-user data packet when the identifier has one of a second subset of possible values. In some configurations, the data packet includes an abbreviated indication of a destination when the data packet is a single-user data packet.

The data packet may include a reference symbol and a subsequent symbol. In configurations, the frame and/or data packet may be configured such that a destination (e.g., a receiver or the apparatus 3202) differentiates the data packet as a very high throughput (VHT) data packet rather than a non-VHT data packet when the subsequent symbol is quadrature binary phase shift keying (QBPSK)-modulated. In some configurations, the frame and/or data packet may be configured such that a destination (e.g., a receiver or the apparatus 3202) differentiates the data packet as a very high throughput (VHT) data packet rather than a non-VHT data packet when the subsequent symbol has a 90° counterclockwise rotation relative to the reference symbol.

The data packet may include a reference symbol and a preceding symbol. In some configurations, the frame and/or data packet may be configured such that a destination (e.g., a receiver or the apparatus 3202) differentiates the data packet as a very high throughput (VHT) data packet rather than a non-VHT data packet when the preceding symbol and the reference symbol are binary phase shift keying (BPSK)-modulated. In some configurations, the frame and/or data packet may be configured such that a destination (e.g., a receiver or the apparatus 3202) differentiates the data packet as a very high throughput (VHT) data packet rather than a non-VHT data packet when the reference symbol has no rotation relative to the preceding symbol.

In some configurations, the frame and/or data packet may be configured such that a destination (e.g., a receiver or the apparatus 3202) determines whether a number of data portions destined to different destinations (e.g., different receivers or apparatuses) is greater than a number of space-time streams available in a single data packet. In some configurations, at least the member information or the position information is assigned by the frame according to a quality of service of data destined to a destination (e.g., a receiver or the apparatus 3202). In some configurations, data having a higher quality of service has at least a lower contention window, a shorter inter-frame spacing, or a higher transmission opportunity limit relative to data having a lower quality of service. In some configurations, at least the member information or the position information is assigned by the frame according to the size of data destined to a destination (e.g., a receiver or the apparatus 3202).

In some configurations, the position information assigned to two or more destinations (e.g., receivers or apparatuses) is the same for two or more identifiers, wherein the two or more identifiers correspond to two or more particular identifiers with which the data packet is associated. In some configurations, the position information assigned to one destination (e.g., receiver or apparatus) is the same for two or more identifiers, wherein the two or more identifiers correspond to two or more particular identifiers with which the data packet is associated. In some configurations, the data packet may include timing information indicating at least an end of a first data portion destined to a first destination (e.g., a first receiver or the apparatus 3202) or a beginning of a second data portion destined to a second destination (e.g., a second receiver or the apparatus 3202'), wherein the first and second data portions are included in the same space-time stream.

In some configurations, the particular identifier with which the data packet is associated may include a first particular identifier and a second particular identifier. In such configurations, the data packet may include at least one space-time stream having a first data portion destined to a first destination (e.g., a first receiver or the apparatus 3202) and associated with the first particular identifier with which the data packet is associated, and a second data portion destined to a second destination (e.g., a second receiver or the apparatus 3202') and associated with the second particular identifier with which the data packet is associated.

In some configurations, the particular identifier with which the data packet is associated comprises two or more particular identifiers. In such configurations, the frame and/or data packet may be configured such that a destination (e.g., a receiver or the apparatus 3202) processes a first data portion of two or more data portions in the same space-time stream when one of the two or more particular identifiers with which the data packet is associated corresponds to an identifier for which a position information was assigned by the frame, and refrains from processing other data portions of the two or more data portions in the same space-time stream.

In some configurations, a stack bit indicating that two or more data portions may be included in at least one space-time stream of the data packet.

The apparatus 3202 may include additional modules that perform each of the functions, operations, steps, and/or methods of the algorithm described with respect to the illustrations and specifications provided herein. As such, each function, operation, step, and/or method described herein may be performed by a module and the corresponding apparatus may include one or more of those modules.

Each of the modules described herein may be one or more hardware components specifically configured to carry out the stated processes/algorithm, implemented by a processor configured to perform the stated processes/algorithm, stored within a computer-readable medium for implementation by a processor, a memory, or any combination thereof.

Figure 33:
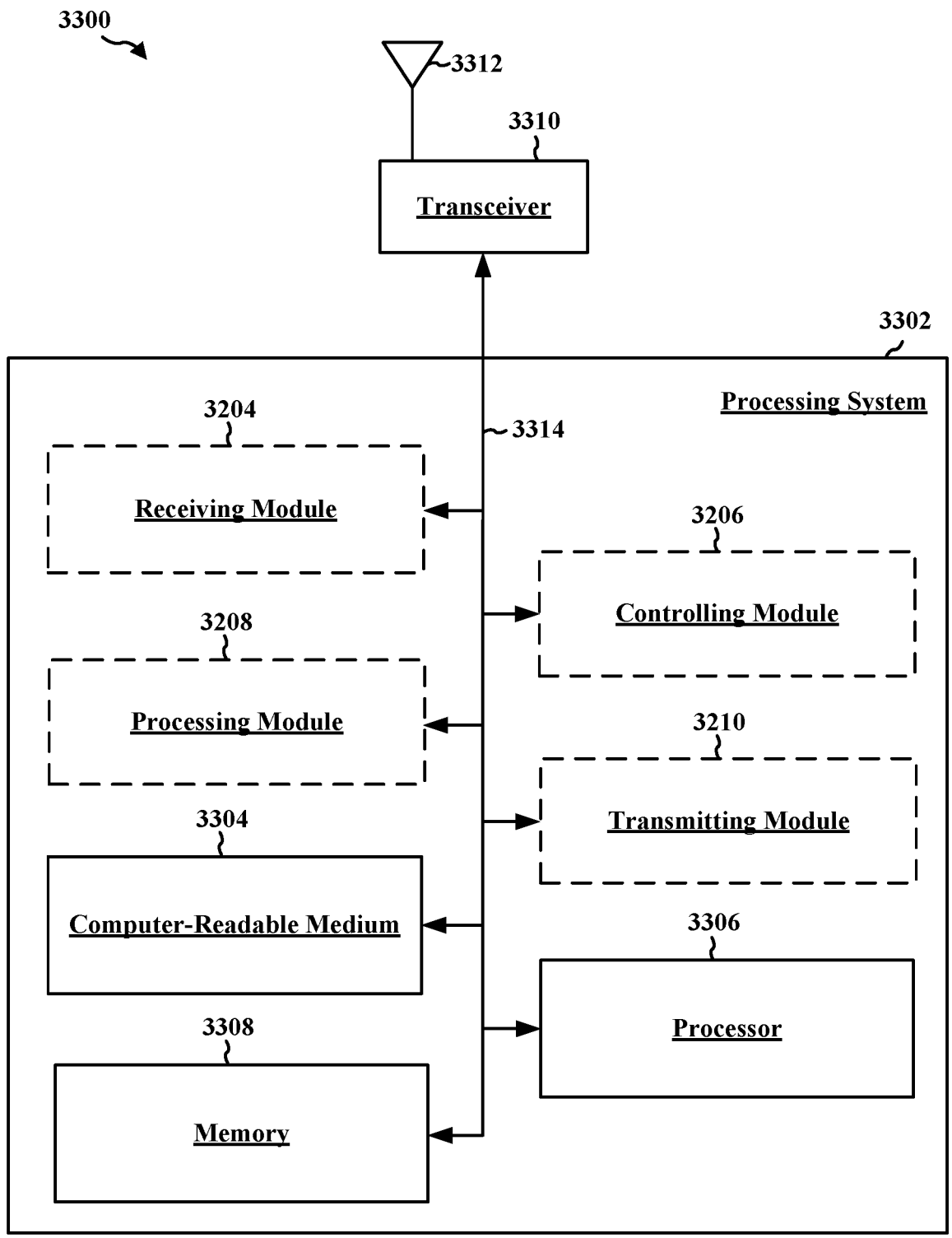
FIG. 33 illustrates an example of a hardware implementation of an apparatus having a processing system.

FIG. 33 illustrates an example hardware implementations of an example apparatus 3300 having an example processing system 3302. The apparatus 3300 may be a receiver. Accordingly, the processing system 3302 may be a component of a receiver. The receiver may be a station, an access point, a base station, a router, a modem, a server, a computing device, or any other apparatus configured to receive and/or transmit data.

The processing system 3302 may include a bus 3314. The bus 314 may include any number of interconnecting buses and/or bridges depending on the specific application of the processing system 3302. The bus 3314 may provide a connection/link between various circuits and/or components of the apparatus 3300, which may include one or more of the following: one or more processors and/or hardware modules, represented generally by the processor 3306; one or more of the modules 3204, 3206, 3208, 3210; one or more modules of computer-readable medium 3304; and/or one or more memory modules, represented generally by the memory 3308.

The bus 3314 may also provide a link between/to various other circuits, such as timing sources, peripherals, voltage regulators, and power management circuits, which are well known in the art.

The processing system 3302 may be connected to a transceiver 3310. The transceiver 3310 may be connected to one or more antennas 3312. The transceiver 3310 provides a means for communicating (e.g., receiving data and/or transmitting data) with various other apparatus over a transmission medium. For example, the transceiver 3310 may receive a signal from the one or more antennas 3312, extract information from the received signal, and provide the extracted information to the processing system 3302, specifically the receiving module 3204. The transceiver 3310 may receive information from the processing system 3302, specifically the transmission module 3210, and, based on the received information, generate a signal to be applied to the one or more antennas 3312.

The processing system 3302 may include a processor 3306 connected to a computer-readable medium 3304, which may be non-transitory computer-readable medium. The processor 3306 may be responsible for general processing, including the execution of software stored on the computer-readable medium 3304. The software, when executed by the processor 3306, may cause the processing system 3302 to perform any of the previously described functions, methods, steps, features, etc. The computer-readable medium 3304 may also be used for storing data that is manipulated by the processor 3306 when executing software. The processing system 3302 may further include one or more of the modules 3204, 3206, 3208, 3210. Any of the modules 3204, 3206, 3208, 3210 may be software modules running in the processor 3306, resident/stored in the computer readable medium 3304, one or more hardware modules coupled to the processor 3306, or some combination thereof.

The processing system 3302 may be configured to receive a frame configured to assign at least member information or position information for one or more identifiers. The processing system 3302 may be configured to receive a data packet associated with a particular identifier and indicating a number of space-time streams for one or more position information.

In some configurations, the frame may be individually-addressed to a destination (e.g., a receiver or an apparatus having the processing system 3302). In some configurations, the frame may be received at a time that is different from a reception time of a different frame addressed to a different destination (e.g., a different receiver or apparatus). In some configurations, the frame may be received after an apparatus (e.g., a receiver) joins a basic service set. In some configurations, the frame may be received at a rate based on at least traffic patterns or channel characteristics.

The processing system 3302 may be configured to transmit an acknowledgement (ACK) in response to receiving the frame, wherein the data packet is received after the ACK is transmitted. In some configurations, assigning at least the member information or the position information comprises replacing values stored in a destination (e.g., a receiver or an apparatus having the processing system 3302) with values in the frame. In some configurations, the position information is assigned for each of the one or more identifiers to which a destination (e.g., a receiver or an apparatus having the processing system 3302) is a member.

The processing system 3302 may be configured to refrain from processing all space-time streams in the data packet when the particular identifier with which the data packet is associated does not correspond to an identifier for which a position information was assigned by the frame. The processing system 3302 may be configured to determine whether an apparatus (e.g., a receiver having the processing system 3302) is a destination of one or more space-time streams in the data packet based on whether the particular identifier with which the data packet is associated corresponds to at least one of the identifiers for which a position information was assigned by the frame. In some configurations, the data packet includes a first portion indicating a number of space-time streams associated with a first position information, and a second portion indicating a number of space-time streams associated with a second position information.

The processing system 3302 may be configured to determine a number of space-time streams in the data packet destined to an apparatus (e.g., a receiver having the processing system 3302) based on the position information assigned by the frame. The processing system 3302 may be configured to consider a number of space-time streams associated with position information different from the position information assigned by the frame to determine which of the space-time streams in the data packet are destined to an apparatus (e.g., a receiver having the processing system 3302). In some configurations, a first space-time stream of one or more space-time streams destined to a first destination (e.g., a first receiver or first apparatus having the processing system 3302) begins after a last space-time stream of one or more space-time streams destined to a second destination (e.g., a second receiver or second apparatus having the processing system 3302).

In some configurations, the data packet is a multi-user data packet when the identifier has one of a first subset of possible values, and the data packet is a single-user data packet when the identifier has one of a second subset of possible values. In some configurations, the data packet includes an abbreviated indication of a destination (e.g., a receiver or an apparatus having the processing system 3302) when the data packet is a single-user data packet.

The data packet may include a reference symbol and a subsequent symbol. The processing system 3302 may be configured to differentiate the data packet as a very high throughput (VHT) data packet rather than a non-VHT data packet when the subsequent symbol is quadrature binary phase shift keying (QBPSK)-modulated. The processing system 3302 may be configured to differentiate the data packet as a very high throughput (VHT) data packet rather than a non-VHT data packet when the subsequent symbol has a 90° counter-clockwise rotation relative to the reference symbol.

The data packet may include a reference symbol and a preceding symbol. The processing system 3302 may be configured to differentiate the data packet as a very high throughput (VHT) data packet rather than a non-VHT data packet when the preceding symbol and the reference symbol are binary phase shift keying (BPSK)-modulated. The processing system 3302 may be configured to differentiate the data packet as a very high throughput (VHT) data packet rather than a non-VHT data packet when the reference symbol has no rotation relative to the preceding symbol.

The processing system 3302 may be configured to determine whether a number of data portions destined to different destinations (e.g., different receiver or different apparatuses) is greater than a number of space-time streams available in a single data packet. In some configurations, at least the member information or the position information is assigned by the frame according to a quality of service of data destined to an apparatus (e.g., a receiver having the processing system 3302). In some configurations, data having a higher quality of service has at least a lower contention window, a shorter inter-frame spacing, or a higher transmission opportunity limit relative to data having a lower quality of service. In some configurations, at least the member information or the position information is assigned by the frame according to the size of data destined to an apparatus (e.g., a receiver having the processing system 3302).

In some configurations, the position information assigned to two or more destinations (e.g., two or more receivers or apparatuses) is the same for two or more identifiers, wherein the two or more identifiers correspond to two or more particular identifiers with which the data packet is associated. In some configurations, the position information assigned to one destination (e.g., a receiver or an apparatus having the processing system 3302) is the same for two or more identifiers, wherein the two or more identifiers correspond to two or more particular identifiers with which the data packet is associated. In some configurations, the data packet may include timing information indicating at least an end of a first data portion destined to a first destination (e.g., a first receiver or a first apparatus having the processing system 3302) or a beginning of a second data portion destined to a second destination (e.g., a second receiver or a second apparatus having the processing system 3302), wherein the first and second data portions are included in the same space-time stream.

In some configurations, the particular identifier with which the data packet is associated may include a first particular identifier and a second particular identifier. In such configurations, the data packet may include at least one space-time stream having a first data portion destined to a first destination (e.g., a first receiver or a first apparatus having the processing system 3302) and associated with the first particular identifier with which the data packet is associated, and a second data portion destined to a second destination (e.g., a second receiver or a second apparatus having the processing system 3302) and associated with the second particular identifier with which the data packet is associated.

In some configurations, the particular identifier with which the data packet is associated comprises two or more particular identifiers. The processing system 3302 may be configured to process a first data portion of two or more data portions in the same space-time stream when one of the two or more particular identifiers with which the data packet is associated corresponds to an identifier for which a position information was assigned by the frame, and to refrain from processing other data portions of the two or more data portions in the same space-time stream.

In some configurations, a stack bit indicating that two or more data portions may be included in at least one space-time stream of the data packet.

As described supra, the processing system 3302 may include a processor 3306 connected to a computer-readable medium 3304, which may be non-transitory computer-readable medium. The processor 3306 may be responsible for general processing, including the execution of software stored on the computer-readable medium 3304. The software, when executed by the processor 3306, may cause the processing system 3302 to perform any of the previously described functions, methods, steps, and functions described herein. Accordingly, the present disclosure includes computer program products including non-transitory computer-readable medium having computer-executable program code configured for causing a processing system to perform any of the previously described functions, methods, steps, and functions described herein.

A computer program product may include computer-readable medium having code for receiving a frame configured to assign at least member information or position information for one or more identifiers. The computer program product may include computer-readable medium having code for receiving a data packet associated with a particular identifier and indicating a number of space-time streams for one or more position information.

In some configurations, the frame may be individually-addressed to a destination (e.g., a receiver or an apparatus having the processing system 3302). In some configurations, the frame may be received at a time that is different from a reception time of a different frame addressed to a different destination (e.g., a different receiver or apparatus). In some configurations, the frame may be received after an apparatus (e.g., a receiver having the processing system 3302) joins a basic service set. In some configurations, the frame may be received at a rate based on at least traffic patterns or channel characteristics.

The computer program product may include computer-readable medium having code for transmitting an acknowledgement (ACK) in response to receiving the frame, wherein the data packet is received after the ACK is transmitted. In some configurations, assigning at least the member information or the position information comprises replacing values stored in a memory (or computer-readable medium) of a destination (e.g., a receiver or an apparatus) with values in the frame. In some configurations, the position information is assigned for each of the one or more identifiers to which an apparatus (e.g., a receiver) is a member.

The computer program product may include computer-readable medium having code for refraining from processing all space-time streams in the data packet when the particular identifier with which the data packet is associated does not correspond to an identifier for which a position information was assigned by the frame. The computer program product may include computer-readable medium having code for determining whether an apparatus (e.g., a receiver) is a destination of one or more space-time streams in the data packet based on whether the particular identifier with which the data packet is associated corresponds to at least one of the identifiers for which a position information was assigned by the frame. In some configurations, the data packet includes a first portion indicating a number of space-time streams associated with a first position information, and a second portion indicating a number of space-time streams associated with a second position information.

The computer program product may include computer-readable medium having code for determining a number of space-time streams in the data packet destined to an apparatus (e.g., a receiver) based on the position information assigned by the frame. The computer program product may include computer-readable medium having code for considering a number of space-time streams associated with position information different from the position information assigned by the frame to determine which of the space-time streams in the data packet are destined to an apparatus (e.g., a receiver). In some configurations, a first space-time stream of one or more space-time streams destined to a first destination begins after a last space-time stream of one or more space-time streams destined to a second destination.

In some configurations, the data packet is a multi-user data packet when the identifier has one of a first subset of possible values, and the data packet is a single-user data packet when the identifier has one of a second subset of possible values. In some configurations, the data packet includes an abbreviated indication of a destination when the data packet is a single-user data packet.

The data packet may include a reference symbol and a subsequent symbol. The computer program product may include computer-readable medium having code for differentiating the data packet as a very high throughput (VHT) data packet rather than a non-VHT data packet when the subsequent symbol is quadrature binary phase shift keying (QBPSK)-modulated. The computer program product may include computer-readable medium having code for differentiating the data packet as a very high throughput (VHT) data packet rather than a non-VHT data packet when the subsequent symbol has a 90° counter-clockwise rotation relative to the reference symbol.

The data packet may include a reference symbol and a preceding symbol. The computer program product may include computer-readable medium having code for differentiating the data packet as a very high throughput (VHT) data packet rather than a non-VHT data packet when the preceding symbol and the reference symbol are binary phase shift keying (BPSK)-modulated. The computer program product may include computer-readable medium having code for differentiating the data packet as a very high throughput (VHT) data packet rather than a non-VHT data packet when the reference symbol has no rotation relative to the preceding symbol.

The computer program product may include computer-readable medium having code for determining whether a number of data portions destined to different destinations (e.g., receivers or apparatuses) is greater than a number of space-time streams available in a single data packet. In some configurations, at least the member information or the position information is assigned by the frame according to a quality of service of data destined to a destination (e.g., a receiver or an apparatus). In some configurations, data having a higher quality of service has at least a lower contention window, a shorter inter-frame spacing, or a higher transmission opportunity limit relative to data having a lower quality of service. In some configurations, at least the member information or the position information is assigned by the frame according to the size of data destined to a destination (e.g., a receiver or an apparatus).

In some configurations, the position information assigned to two or more destinations (e.g., receivers or apparatuses) is the same for two or more identifiers, wherein the two or more identifiers correspond to two or more particular identifiers with which the data packet is associated. In some configurations, the position information assigned to one destination (e.g., a receiver or an apparatus) is the same for two or more identifiers, wherein the two or more identifiers correspond to two or more particular identifiers with which the data packet is associated. In some configurations, the data packet may include timing information indicating at least an end of a first data portion destined to a first destination (e.g., a first receiver or first apparatus) or a beginning of a second data portion destined to a second destination (e.g., a second receiver or second apparatus), wherein the first and second data portions are included in the same space-time stream.

In some configurations, the particular identifier with which the data packet is associated may include a first particular identifier and a second particular identifier. In such configurations, the data packet may include at least one space-time stream having a first data portion destined to a first destination (e.g., a first receiver or a first apparatus) and associated with the first particular identifier with which the data packet is associated, and a second data portion destined to a second destination (e.g., a second receiver or a second apparatus) and associated with the second particular identifier with which the data packet is associated.

In some configurations, the particular identifier with which the data packet is associated comprises two or more particular identifiers. The computer program product may include computer-readable medium having code for processing a first data portion of two or more data portions in the same space-time stream when one of the two or more particular identifiers with which the data packet is associated corresponds to an identifier for which a position information was assigned by the frame, and for refraining from processing other data portions of the two or more data portions in the same space-time stream.

In some configurations, a stack bit indicating that two or more data portions may be included in at least one space-time stream of the data packet.

As described supra, the apparatus 3300 may be a receiver. The receiver may be a station, an access point, a base station, a router, a modem, a server, a computing device, or any other apparatus configured to receive and/or transmit data.

The receiver may provide a means for receiving a frame configured to assign at least member information or position information for one or more identifiers. The receiver may provide a means for receiving a data packet associated with a particular identifier and indicating a number of space-time streams for one or more position information.

In some configurations, the frame may be individually-addressed to a destination (e.g., a receiver or an apparatus). In some configurations, the frame may be received at a time that is different from a reception time of a different frame addressed to a different destination (e.g., a different receiver or different apparatus). In some configurations, the frame may be received after the receiver joins a basic service set.

In some configurations, the frame may be received at a rate based on at least traffic patterns or channel characteristics.

The receiver may provide a means for transmitting an acknowledgement (ACK) in response to receiving the frame, wherein the data packet is received after the ACK is transmitted. In some configurations, assigning at least the member information or the position information comprises replacing values stored in an apparatus (e.g., a receiver) with values in the frame. In some configurations, the position information is assigned for each of the one or more identifiers to which an apparatus (e.g., a receiver) is a member.

The receiver may provide a means for refraining from processing all space-time streams in the data packet when the particular identifier with which the data packet is associated does not correspond to an identifier for which a position information was assigned by the frame. The receiver may provide a means for determining whether an apparatus (e.g., a receiver) is a destination of one or more space-time streams in the data packet based on whether the particular identifier with which the data packet is associated corresponds to at least one of the identifiers for which a position information was assigned by the frame. In some configurations, the data packet includes a first portion indicating a number of space-time streams associated with a first position information, and a second portion indicating a number of space-time streams associated with a second position information.

The receiver may provide a means for determining a number of space-time streams in the data packet destined to an apparatus (e.g., a receiver) based on the position information assigned by the frame. The receiver may provide a means for considering a number of space-time streams associated with position information different from the position information assigned by the frame to determine which of the space-time streams in the data packet are destined to an apparatus (e.g., a receiver). In some configurations, a first space-time stream of one or more space-time streams destined to a first destination (e.g., a first receiver or first apparatus) begins after a last space-time stream of one or more space-time streams destined to a second destination (e.g., a second receiver or second apparatus).

In some configurations, the data packet is a multi-user data packet when the identifier has one of a first subset of possible values, and the data packet is a single-user data packet when the identifier has one of a second subset of possible values. In some configurations, the data packet includes an abbreviated indication of a destination when the data packet is a single-user data packet.

The data packet may include a reference symbol and a subsequent symbol. The receiver may provide a means for differentiating the data packet as a very high throughput (VHT) data packet rather than a non-VHT data packet when the subsequent symbol is quadrature binary phase shift keying (QBPSK)-modulated. The receiver may provide a means for differentiating the data packet as a very high throughput (VHT) data packet rather than a non-VHT data packet when the subsequent symbol has a 90° counterclockwise rotation relative to the reference symbol.

The data packet may include a reference symbol and a preceding symbol. The receiver may provide a means for differentiating the data packet as a very high throughput (VHT) data packet rather than a non-VHT data packet when the preceding symbol and the reference symbol are binary phase shift keying (BPSK)-modulated. The receiver may provide a means for differentiating the data packet as a very high throughput (VHT) data packet rather than a non-VHT data packet when the reference symbol has no rotation relative to the preceding symbol.

The receiver may provide a means for determining whether a number of data portions destined to different destinations is greater than a number of space-time streams available in a single data packet. In some configurations, at least the member information or the position information is assigned by the frame according to a quality of service of data destined to an apparatus (e.g., a receiver). In some configurations, data having a higher quality of service has at least a lower contention window, a shorter inter-frame spacing, or a higher transmission opportunity limit relative to data having a lower quality of service. In some configurations, at least the member information or the position information is assigned by the frame according to the size of data destined to an apparatus (e.g., a receiver).

In some configurations, the position information assigned to two or more destinations (e.g., receivers or apparatuses) is the same for two or more identifiers, wherein the two or more identifiers correspond to two or more particular identifiers with which the data packet is associated. In some configurations, the position information assigned to one destination (e.g., a receiver or an apparatus) is the same for two or more identifiers, wherein the two or more identifiers correspond to two or more particular identifiers with which the data packet is associated. In some configurations, the data packet may include timing information indicating at least an end of a first data portion destined to a first destination (e.g., a first receiver or a first apparatus) or a beginning of a second data portion destined to a second destination (e.g., a second receiver or a second apparatus), wherein the first and second data portions are included in the same space-time stream.

In some configurations, the particular identifier with which the data packet is associated may include a first particular identifier and a second particular identifier. In such configurations, the data packet may include at least one space-time stream having a first data portion destined to a first destination (e.g., a first receiver or first apparatus) and associated with the first particular identifier with which the data packet is associated, and a second data portion destined to a second destination (e.g., a second receiver or second apparatus) and associated with the second particular identifier with which the data packet is associated.

In some configurations, the particular identifier with which the data packet is associated comprises two or more particular identifiers. The receiver may provide a means for processing a first data portion of two or more data portions in the same space-time stream when one of the two or more particular identifiers with which the data packet is associated corresponds to an identifier for which a position information was assigned by the frame, and for refraining from processing other data portions of the two or more data portions in the same space-time stream.

In some configurations, a stack bit indicating that two or more data portions may be included in at least one space-time stream of the data packet.

Any of the aforementioned means may be performed by one or more of the aforementioned modules of the apparatus 3300 and/or the processing system 3302 of the apparatus 3300 as configured to perform the functions recited by the aforementioned means. The processing system 3302 may also include a transmission processor and a reception processor. Although the term "receiver" or "RX" may be used herein, it will be understood by one of ordinary skill in the art that "receiver" and/or "RX" may also refer to a station, an access point, a base station, a router, a modem, a server, a computing device, or any other apparatus configured to receive and/or transmit data.

Figure 34:
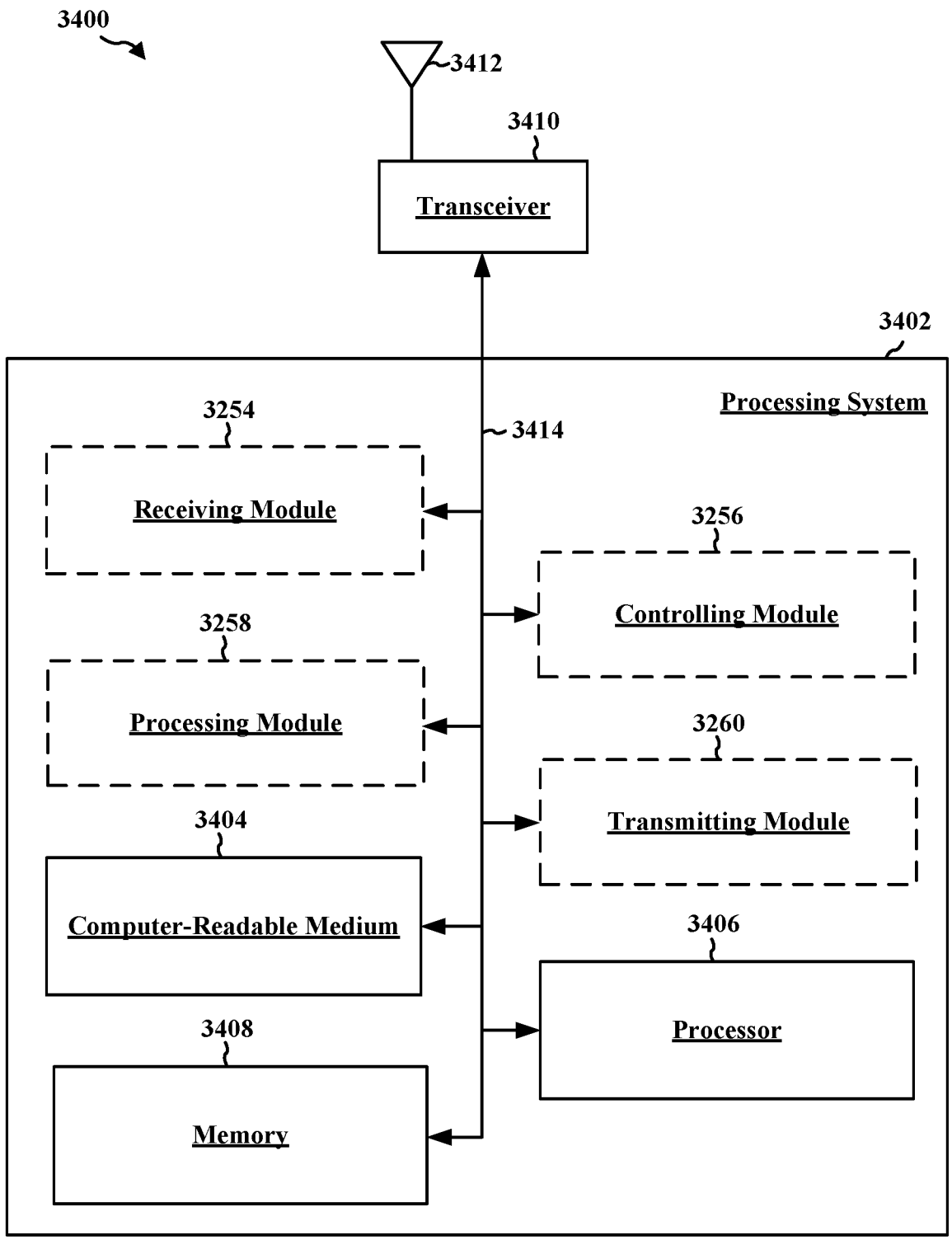
FIG. 34 illustrates an example of a hardware implementation of another apparatus having a processing system.

FIG. 34 illustrates an example hardware implementation of another example apparatus 3400 having an example processing system 3402. The apparatus 3400 may be a transmitter. Accordingly, the processing system 3402 may be a component of a transmitter. The transmitter may be a station, an access point, a base station, a router, a modem, a server, a computing device, or any other apparatus configured to receive and/or transmit data.

The processing system 3402 may include a bus 3414. The bus 314 may include any number of interconnecting buses and/or bridges depending on the specific application of the processing system 3402. The bus 3414 may provide a connection/link between various circuits and/or components of the apparatus 3400, which may include one or more of the following: one or more processors and/or hardware modules, represented generally by the processor 3406; one or more of the modules 3254, 3256, 3258, 3260; one or more modules of computer-readable medium 3404; and/or one or more memory modules, represented generally by the memory 3408.

The bus 3414 may also provide a link between/to various other circuits, such as timing sources, peripherals, voltage regulators, and power management circuits, which are well known in the art.

The processing system 3402 may be connected to a transceiver 3410. The transceiver 3410 may be connected to one or more antennas 3412. The transceiver 3410 provides a means for communicating (e.g., receiving data and/or transmitting data) with various other apparatuses over a transmission medium. For example, the transceiver 3410 may receive a signal from the one or more antennas 3412, extract information from the received signal, and provide the extracted information to the processing system 3402, specifically the receiving module 3254. The transceiver 3410 may receive information from the processing system 3402, specifically the transmission module 3260, and, based on the received information, generate a signal to be applied to the one or more antennas 3412.

The processing system 3402 may include a processor 3406 connected to a computer-readable medium 3404, which may be non-transitory computer-readable medium. The processor 3406 may be responsible for general processing, including the execution of software stored on the computer-readable medium 3404. The software, when executed by the processor 3406, may cause the processing system 3402 to perform any of the previously described functions, methods, steps, features, etc. The computer-readable medium 3404 may also be used for storing data that is manipulated by the processor 3406 when executing software. The processing system 3402 may further include one or more of the modules 3254, 3256, 3258, 3260. Any of the modules 3254, 3256, 3258, 3260 may be software modules running in the processor 3406, resident/stored in the computer readable medium 3404, one or more hardware modules coupled to the processor 3406, or some combination thereof.

The processing system 3402 may be configured to transmit a frame configured to assign at least member information or position information for one or more identifiers. The processing system 3402 may be configured to transmit a data packet associated with a particular identifier and indicating a number of space-time streams for one or more position information.

In some configurations, the frame may be individually-addressed to a destination (e.g., a receiver or an apparatus). In some configurations, the frame may be transmitted at a time that is different from a transmission time of a different frame addressed to a different destination (e.g., a different receiver or a different apparatus). In some configurations, the frame may be transmitted after a destination (e.g., a receiver or an apparatus) joins a basic service set. In some configurations, the frame may be transmitted at a rate based on at least traffic patterns or channel characteristics.

The processing system 3402 may be configured to receive an acknowledgement (ACK) in response to transmitting the frame, wherein the data packet is transmitted after the ACK is received. In some configurations, assigning at least the member information or the position information comprises replacing values stored in a destination (e.g., a receiver or an apparatus) with values in the frame. In some configurations, the position information is assigned for each of the one or more identifiers to which a destination (e.g., a receiver or an apparatus) is a member.

The frame and/or data packet may be configured such that a destination (e.g., a receiver or an apparatus) refrains from processing all space-time streams in the data packet when the particular identifier with which the data packet is associated does not correspond to an identifier for which a position information was assigned by the frame. The frame and/or data packet may be configured such that a receiver (e.g., an apparatus) determines whether the receiver (e.g., the apparatus) is the destination of one or more space-time streams in the data packet based on whether the particular identifier with which the data packet is associated corresponds to at least one of the identifiers for which a position information was assigned by the frame. In some configurations, the data packet includes a first portion indicating a number of space-time streams associated with a first position information, and a second portion indicating a number of space-time streams associated with a second position information.

The frame and/or data packet may be configured such that a destination (e.g., a receiver or an apparatus) determines a number of space-time streams in the data packet destined to a destination (e.g., a receiver or an apparatus) based on the position information assigned by the frame. The frame and/or data packet may be configured such that a destination (e.g., a receiver or an apparatus) considers a number of space-time streams associated with position information different from the position information assigned by the frame to determine which of the space-time streams in the data packet are destined to the destination (e.g., a receiver or an apparatus). In some configurations, a first space-time stream of one or more space-time streams destined to a first destination (e.g., a first receiver or first apparatus) begins after a last space-time stream of one or more space-time streams destined to a second destination (e.g., a second receiver or second apparatus).

In some configurations, the data packet is a multi-user data packet when the identifier has one of a first subset of possible values, and the data packet is a single-user data packet when the identifier has one of a second subset of possible values. In some configurations, the data packet includes an abbreviated indication of a destination (e.g., a receiver or an apparatus) when the data packet is a single-user data packet.

The data packet may include a reference symbol and a subsequent symbol. The frame and/or data packet may be configured such that a destination (e.g., a receiver or an apparatus) differentiates the data packet as a very high throughput (VHT) data packet rather than a non-VHT data packet when the subsequent symbol is quadrature binary phase shift keying (QBPSK)-modulated. The frame and/or data packet may be configured such that a destination (e.g., a receiver or an apparatus) differentiates the data packet as a very high throughput (VHT) data packet rather than a non-VHT data packet when the subsequent symbol has a 90° counter-clockwise rotation relative to the reference symbol.

The data packet may include a reference symbol and a preceding symbol. The frame and/or data packet may be configured such that a destination (e.g., a receiver or an apparatus) differentiates the data packet as a very high throughput (VHT) data packet rather than a non-VHT data packet when the preceding symbol and the reference symbol are binary phase shift keying (BPSK)-modulated. The frame and/or data packet may be configured such that a destination (e.g., a receiver or an apparatus) differentiates the data packet as a very high throughput (VHT) data packet rather than a non-VHT data packet when the reference symbol has no rotation relative to the preceding symbol.

The frame and/or data packet may be configured such that a destination (e.g., a receiver or an apparatus) determines whether a number of data portions destined to different destinations (e.g., different receivers or different apparatuses) is greater than a number of space-time streams available in a single data packet. In some configurations, at least the member information or the position information is assigned by the frame according to a quality of service of data destined to a destination (e.g., a receiver or an apparatus). In some configurations, data having a higher quality of service has at least a lower contention window, a shorter inter-frame spacing, or a higher transmission opportunity limit relative to data having a lower quality of service. In some configurations, at least the member information or the position information is assigned by the frame according to the size of data destined to a destination (e.g., a receiver or an apparatus).

In some configurations, the position information assigned to two or more destinations (e.g., receivers or apparatuses) is the same for two or more identifiers, wherein the two or more identifiers correspond to two or more particular identifiers with which the data packet is associated. In some configurations, the position information assigned to one destination (e.g., apparatus or receiver) is the same for two or more identifiers, wherein the two or more identifiers correspond to two or more particular identifiers with which the data packet is associated. In some configurations, the data packet may include timing information indicating at least an end of a first data portion destined to a first destination (e.g., a first receiver or a first apparatus) or a beginning of a second data portion destined to a second destination (e.g., a second receiver or a second apparatus), wherein the first and second data portions are included in the same space-time stream.

In some configurations, the particular identifier with which the data packet is associated may include a first particular identifier and a second particular identifier. In such configurations, the data packet may include at least one space-time stream having a first data portion destined to a first destination (e.g., a first receiver or first apparatus) and associated with the first particular identifier with which the data packet is associated, and a second data portion destined to a second destination (e.g., a second receiver or second apparatus) and associated with the second particular identifier with which the data packet is associated.

In some configurations, the particular identifier with which the data packet is associated comprises two or more particular identifiers. The frame and/or data packet may be configured such that a destination (e.g., a receiver or an apparatus) processes a first data portion of two or more data portions in the same space-time stream when one of the two or more particular identifiers with which the data packet is associated corresponds to an identifier for which a position information was assigned by the frame, and refrains from processing other data portions of the two or more data portions in the same space-time stream.

In some configurations, a stack bit indicating that two or more data portions may be included in at least one space-time stream of the data packet.

As described supra, the processing system 3402 may include a processor 3406 connected to a computer-readable medium 3404, which may be non-transitory computer-readable medium. The processor 3406 may be responsible for general processing, including the execution of software stored on the computer-readable medium 3404. The software, when executed by the processor 3406, may cause the processing system 3402 to perform any of the previously described functions, methods, steps, and functions described herein. Accordingly, the present disclosure includes computer program products including non-transitory computer-readable medium having computer-executable program code configured for causing a processing system to perform any of the previously described functions, methods, steps, and functions described herein.

A computer program product may include computer-readable medium having code for transmitting a frame configured to assign at least member information or position information for one or more identifiers. The computer program product may include computer-readable medium having code for transmitting a data packet associated with a particular identifier and indicating a number of space-time streams for one or more position information.

In some configurations, the frame may be individually-addressed to a destination (e.g., a receiver or an apparatus). In some configurations, the frame may be transmitted at a time that is different from a transmission time of a different frame addressed to a different receiver or destination. In some configurations, the frame may be transmitted after a destination (e.g., a receiver or an apparatus) joins a basic service set. In some configurations, the frame may be transmitted at a rate based on at least traffic patterns or channel characteristics.

The computer program product may include computer-readable medium having code for receiving an acknowledgement (ACK) in response to transmitting the frame, wherein the data packet is received after the ACK is transmitted. In some configurations, assigning at least the member information or the position information comprises replacing values stored in a destination (e.g., a receiver or an apparatus) with values in the frame. In some configurations, the position information is assigned for each of the one or more identifiers to which a destination (e.g., a receiver or an apparatus) is a member.

The computer program product may include computer-readable medium having code for configuring the frame and/or data packet such that a destination (e.g., a receiver or an apparatus) processes all space-time streams in the data packet when the particular identifier with which the data packet is associated does not correspond to an identifier for which a position information was assigned by the frame. The computer program product may include computer-readable medium having code for configuring the frame and/or data packet such that a receiver (e.g., an apparatus) determines whether the receiver (e.g., the apparatus) is the destination of one or more space-time streams in the data packet based on whether the particular identifier with which the data packet is associated corresponds to at least one of the identifiers for which a position information was assigned by the frame. In some configurations, the data packet includes a first portion indicating a number of space-time streams associated with a first position information, and a second portion indicating a number of space-time streams associated with a second position information.

The computer program product may include computer-readable medium having code for configuring the frame and/or data packet such that a destination (e.g., a receiver or an apparatus) determines a number of space-time streams in the data packet destined to a destination (e.g., a receiver or an apparatus) based on the position information assigned by the frame. The computer program product may include computer-readable medium having code for configuring the frame and/or data packet such that a destination (e.g., a receiver or an apparatus) considers a number of space-time streams associated with position information different from the position information assigned by the frame to determine which of the space-time streams in the data packet are destined to a destination (e.g., a receiver or an apparatus). In some configurations, a first space-time stream of one or more space-time streams destined to a first destination (e.g., first receiver or first apparatus) begins after a last space-time stream of one or more space-time streams destined to a second destination (e.g., second receiver or second apparatus).

In some configurations, the data packet is a multi-user data packet when the identifier has one of a first subset of possible values, and the data packet is a single-user data packet when the identifier has one of a second subset of possible values. In some configurations, the data packet includes an abbreviated indication of a destination (e.g., a receiver or an apparatus) when the data packet is a single-user data packet.

The data packet may include a reference symbol and a subsequent symbol. The computer program product may include computer-readable medium having code for configuring the frame and/or data packet such that a destination (e.g., a receiver or an apparatus) differentiates the data packet as a very high throughput (VHT) data packet rather than a non-VHT data packet when the subsequent symbol is quadrature binary phase shift keying (QBPSK)-modulated. The computer program product may include computer-readable medium having code for configuring the frame and/or data packet such that a destination (e.g., a receiver or an apparatus) differentiates the data packet as a very high throughput (VHT) data packet rather than a non-VHT data packet when the subsequent symbol has a 90° counter-clockwise rotation relative to the reference symbol.

The data packet may include a reference symbol and a preceding symbol. The computer program product may include computer-readable medium having code for configuring the frame and/or data packet such that a destination (e.g., a receiver or an apparatus) differentiates the data packet as a very high throughput (VHT) data packet rather than a non-VHT data packet when the preceding symbol and the reference symbol are binary phase shift keying (BPSK)-modulated. The computer program product may include computer-readable medium having code for configuring the frame and/or data packet such that a destination (e.g., a receiver or an apparatus) differentiates the data packet as a very high throughput (VHT) data packet rather than a non-VHT data packet when the reference symbol has no rotation relative to the preceding symbol.

The computer program product may include computer-readable medium having code for configuring the frame and/or data packet such that a destination (e.g., a receiver or an apparatus) determines whether a number of data portions destined to different destinations (e.g., different receivers or different apparatuses) is greater than a number of space-time streams available in a single data packet. In some configurations, at least the member information or the position information is assigned by the frame according to a quality of service of data destined to a destination (e.g., a receiver or an apparatus). In some configurations, data having a higher quality of service has at least a lower contention window, a shorter inter-frame spacing, or a higher transmission opportunity limit relative to data having a lower quality of service. In some configurations, at least the member information or the position information is assigned by the frame according to the size of data destined to a destination (e.g., a receiver or an apparatus).

In some configurations, the position information assigned to two or more destinations (e.g., receiver or apparatuses) is the same for two or more identifiers, wherein the two or more identifiers correspond to two or more particular identifiers with which the data packet is associated. In some configurations, the position information assigned to one destination (e.g., receiver or apparatus) is the same for two or more identifiers, wherein the two or more identifiers correspond to two or more particular identifiers with which the data packet is associated. In some configurations, the data packet may include timing information indicating at least an end of a first data portion destined to a first destination (e.g., a first receiver or first apparatus) or a beginning of a second data portion destined to a second destination (e.g., a second receiver or second apparatus), wherein the first and second data portions are included in the same space-time stream.

In some configurations, the particular identifier with which the data packet is associated may include a first particular identifier and a second particular identifier. In such configurations, the data packet may include at least one space-time stream having a first data portion destined to a first destination (e.g., a first receiver or first apparatus) and associated with the first particular identifier with which the data packet is associated, and a second data portion destined to a second destination (e.g., a second receiver or second apparatus) and associated with the second particular identifier with which the data packet is associated.

In some configurations, the particular identifier with which the data packet is associated comprises two or more particular identifiers. The computer program product may include computer-readable medium having code for configuring the frame and/or data packet such that a destination (e.g., a receiver or an apparatus) processes a first data portion of two or more data portions in the same space-time stream when one of the two or more particular identifiers with which the data packet is associated corresponds to an identifier for which a position information was assigned by the frame, and refrains from processing other data portions of the two or more data portions in the same space-time stream.

In some configurations, a stack bit indicating that two or more data portions may be included in at least one space-time stream of the data packet.

As described supra, the apparatus 3400 may be a transmitter. The transmitter may be a station, an access point, a base station, a router, a modem, a server, a computing device, or any other apparatus configured to receive and/or transmit data.

The transmitter may provide a means for transmitting a frame configured to assign at least member information or position information for one or more identifiers. The transmitter may provide a means for transmitting a data packet associated with a particular identifier and indicating a number of space-time streams for one or more position information.

In some configurations, the frame may be individually-addressed to a destination (e.g., a receiver or an apparatus). In some configurations, the frame may be transmitted at a time that is different from a transmission time of a different frame addressed to a different destination (e.g., a different receiver or a different apparatus). In some configurations, the frame may be transmitted after a destination (e.g., a receiver or an apparatus) joins a basic service set. In some configurations, the frame may be transmitted at a rate based on at least traffic patterns or channel characteristics.

The transmitter may provide a means for receiving an acknowledgement (ACK) in response to transmitting the frame, wherein the data packet is transmitted after the ACK is received. In some configurations, assigning at least the member information or the position information comprises replacing values stored in a destination (e.g., a receiver or an apparatus) with values in the frame. In some configurations, the position information is assigned for each of the one or more identifiers to which a destination (e.g., a receiver or an apparatus) is a member.

The transmitter may provide a means for configuring the frame and/or data packet such that a destination (e.g., a receiver or an apparatus) refrains from processing all space-time streams in the data packet when the particular identifier with which the data packet is associated does not correspond to an identifier for which a position information was assigned by the frame. The transmitter may provide a means for configuring the frame and/or data packet such that a destination (e.g., a receiver or an apparatus) determines whether it is a destination of one or more space-time streams in the data packet based on whether the particular identifier with which the data packet is associated corresponds to at least one of the identifiers for which a position information was assigned by the frame. In some configurations, the data packet includes a first portion indicating a number of space-time streams associated with a first position information, and a second portion indicating a number of space-time streams associated with a second position information.

The transmitter may provide a means for configuring the frame and/or data packet such that a destination (e.g., a receiver or an apparatus) determines a number of space-time streams in the data packet destined to a destination (e.g., a receiver or an apparatus) based on the position information assigned by the frame. The transmitter may provide a means for configuring the frame and/or data packet such that a destination (e.g., a receiver or an apparatus) considers a number of space-time streams associated with position information different from the position information assigned by the frame to determine which of the space-time streams in the data packet are destined to a destination (e.g., a receiver or an apparatus). In some configurations, a first space-time stream of one or more space-time streams destined to a first destination (e.g., a first receiver or a first apparatus) begins after a last space-time stream of one or more space-time streams destined to a second destination (e.g., a second receiver or a second apparatus).

In some configurations, the data packet is a multi-user data packet when the identifier has one of a first subset of possible values, and the data packet is a single-user data packet when the identifier has one of a second subset of possible values. In some configurations, the data packet includes an abbreviated indication of a destination (e.g., a receiver or an apparatus) when the data packet is a single-user data packet.

The data packet may include a reference symbol and a subsequent symbol. The transmitter may provide a means for configuring the frame and/or data packet such that a destination (e.g., a receiver or an apparatus) differentiates the data packet as a very high throughput (VHT) data packet rather than a non-VHT data packet when the subsequent symbol is quadrature binary phase shift keying (QBPSK)-modulated. The transmitter may provide a means for configuring the frame and/or data packet such that a destination (e.g., a receiver or an apparatus) differentiates the data packet as a very high throughput (VHT) data packet rather than a non-VHT data packet when the subsequent symbol has a 90° counter-clockwise rotation relative to the reference symbol.

The data packet may include a reference symbol and a preceding symbol. The transmitter may provide a means for configuring the frame and/or data packet such that a destination (e.g., a receiver or an apparatus) differentiates the data packet as a very high throughput (VHT) data packet rather than a non-VHT data packet when the preceding symbol and the reference symbol are binary phase shift keying (BPSK)-modulated. The transmitter may provide a means for configuring the frame and/or data packet such that a destination (e.g., a receiver or an apparatus) differentiates the data packet as a very high throughput (VHT) data packet rather than a non-VHT data packet when the reference symbol has no rotation relative to the preceding symbol.

The transmitter may provide a means for configuring the frame and/or data packet such that a destination (e.g., a receiver or an apparatus) determines whether a number of data portions destined to different destinations (e.g., different receiver or different apparatuses) is greater than a number of space-time streams available in a single data packet. In some configurations, at least the member information or the position information is assigned by the frame according to a quality of service of data destined to a destination (e.g., a receiver or an apparatus). In some configurations, data having a higher quality of service has at least a lower contention window, a shorter inter-frame spacing, or a higher transmission opportunity limit relative to data having a lower quality of service. In some configurations, at least the member information or the position information is assigned by the frame according to the size of data destined to a destination (e.g., a receiver or an apparatus).

In some configurations, the position information assigned to two or more destinations (e.g., receiver or apparatuses) is the same for two or more identifiers, wherein the two or more identifiers correspond to two or more particular identifiers with which the data packet is associated. In some configurations, the position information assigned to one destination (e.g., receiver or apparatus) is the same for two or more identifiers, wherein the two or more identifiers correspond to two or more particular identifiers with which the data packet is associated. In some configurations, the data packet may include timing information indicating at least an end of a first data portion destined to a first destination (e.g., a first receiver or first apparatus) or a beginning of a second data portion destined to a second destination (e.g., a second receiver or second apparatus), wherein the first and second data portions are included in the same space-time stream.

In some configurations, the particular identifier with which the data packet is associated may include a first particular identifier and a second particular identifier. In such configurations, the data packet may include at least one space-time stream having a first data portion destined to a first destination (e.g., a first receiver or a first apparatus) and associated with the first particular identifier with which the data packet is associated, and a second data portion destined to a second destination (e.g., a second receiver or a second apparatus) and associated with the second particular identifier with which the data packet is associated.

In some configurations, the particular identifier with which the data packet is associated comprises two or more particular identifiers. The transmitter may provide a means for configuring the frame and/or data packet such that a destination (e.g., a receiver or an apparatus) processes a first data portion of two or more data portions in the same space-time stream when one of the two or more particular identifiers with which the data packet is associated corresponds to an identifier for which a position information was assigned by the frame, and refrains from processing other data portions of the two or more data portions in the same space-time stream.

In some configurations, a stack bit indicating that two or more data portions may be included in at least one space-time stream of the data packet.

Any of the aforementioned means may be performed by one or more of the aforementioned modules of the apparatus 3400 and/or the processing system 3402 of the apparatus 3400 as configured to perform the functions recited by the aforementioned means. Although the term "transmitter" or "TX" may be used herein, it will be understood by one of ordinary skill in the art that "transmitter" and/or "TX" may also refer to a station, an access point, a base station, a router, a modem, a server, a computing device, or any other apparatus configured to receive and/or transmit data.

Several aspects of communication systems are presented herein with reference to various apparatus, methods, and computer program products. These apparatus, methods, and computer program products are described in the detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware and/or software may depend upon the particular application and/or design constraints imposed on the overall communication system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary configurations, the functions described may be implemented in hardware, software, firmware, or any combination thereof. If implemented in software, the functions may be stored on or encoded as one or more instructions or code on a computer-readable medium. Computer-readable media includes computer storage media. Computer storage media may be any available media that can be accessed by a computer. By way of example, and not limitation, such computer-readable media may comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the foregoing may also be included within the scope of computer-readable media. Also, combinations of the foregoing may also be included within the scope of memory.

It will be understood by one of ordinary skill in the art that the specific order or hierarchy of the processes disclosed herein is provided for illustrative and exemplary purposes. Based upon design preferences, one of ordinary skill in the art understands that the specific order or hierarchy of steps in the processes may be re-arranged. Further, some processes may be combined or omitted. The accompanying method claims present elements of the various steps in a sample order, and are not meant to be limited to the specific order or hierarchy presented. Accordingly, the scope of the claims shall not be construed as limited to the examples provided herein, unless a corresponding feature is expressly recited in the claims.

One of ordinary skill in the art will appreciate and understand that a 'receiver' may also sometimes refer to a 'destination' (and vice versa) and that such terms may be used interchangeably to refer to a similar concept. Accordingly, the use of one of these terms with respect to certain examples, illustrations, and/or descriptions provided herein shall not be construed as preferred over or to the exclusion of another one of these terms. As described in further detail supra, in some configurations, a receiver may be a destination of a particular data packet. As also described in further detail supra, in some configurations, a receiver may not be a destination of that particular data packet (but that same receiver may or may not be a destination of a different data packet).

Anything described herein with respect to a receiver may also be performed by any other equivalent apparatus, processing system included in an apparatus, or code included in non-transitory computer-readable medium included in a computer program product. For example, a processing system included in an apparatus may be configured in an equivalent manner with respect to the disclosure provided herein with respect to a receiver. Also, code included in non-transitory computer-readable medium included in a computer program product may be configured in an equivalent manner with respect to the disclosure provided herein.

One of ordinary skill in the art will understand that the features described with respect to a transmitter may apply to a transmitter and/or a receiver. In some configurations, a transmitter may be configured to transmit data in the manner described herein with respect to a transmitter. In some configurations, a receiver may be configured to transmit data in the manner described herein with respect to a transmitter. One of ordinary skill in the art will understand that the features described with respect to a receiver may apply to a transmitter and a receiver. In some configurations, a receiver may be configured to receive data in the manner described herein with respect to a receiver. In some configurations, a transmitter may be configured to receive data in the manner described herein with respect to a receiver.

Some or all of the features described herein with respect to a receiver may be applied to a transmitter. For example, if a receiver has a particular feature and/or is configured to receive one or more signals (e.g., a frame, a data packet, a symbol, information, etc.), a transmitter may have similar features and/or may be configured to transmit one or more similar signals (e.g., a frame, a data packet, a symbol, information, etc.). Accordingly, even though the disclosures provided herein may be provided with respect to a receiver for illustrative and non-limiting purposes, one of ordinary skill in the art will understand that a transmitter may also be configured to have similar or related features.

Some or all of the features described herein with respect to a transmitter may be applied to a receiver. For example, if a transmitter has a particular feature and/or is configured to transmit one or more signals (e.g., a frame, a data packet, a symbol, information, etc.), a receiver may have similar features and/or may be configured to receive one or more similar signals (e.g., a frame, a data packet, a symbol, information, etc.). Accordingly, even though the disclosures provided herein may be provided with respect to a transmitter for illustrative and non-limiting purposes, one of ordinary skill in the art will understand that a receiver may also be configured to have similar or related features.

All aspects disclosed herein with respect to a receiver are hereby also disclosed with respect to any apparatus, method, and/or computer program product that is in accordance with such aspects. All aspects disclosed herein with respect to a transmitter are hereby also disclosed with respect to any apparatus, method, and computer program product that is in accordance with such aspects.

Unless specifically stated otherwise, the term "some" refers to one or more. Combinations such as "at least A, B, or C," "at least one of A, B, or C," "at least one of A, B, and C," and "A, B, C, or any combination thereof" include any combination of A, B, and/or C, which may include any one of the following possibilities: (i) one or more of A; (ii) one or more of B; (iii) one or more of C; (iv) one or more of A and one or more of B; (v) one or more of A and one or more of C; (vi) one or more of B and one or more of C; or (vii) one or more of A, one or more of B, and one or more of C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

The previous description is provided to enable any person skilled in the art to practice the various aspects described herein. Various modifications to these aspects are readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects."

The invention claimed is:

1. An apparatus for communication with at least one station (STA) of a plurality of STAs, the apparatus comprising:
one or more processors configured to generate a data packet, and
a transceiver configured to transmit the data packet to the plurality of STAs, the data packet comprising a plurality of space-time streams, the plurality of space-time streams comprising one or more space-time streams for the at least one STA and one or more other space-time streams for one or more other STAs of the plurality of STAs, one or more other position information different from position information for the at least one STA comprising a value that is lower than a value of the position information for the at least one STA, the position information for the at least one STA not having a lowest possible value and a field indicating a number of space-time stream(s) associated with the position information for the at least one STA being preceded by one or more other fields indicating one or more numbers of space-time stream(s) associated with the one or more other position information different from the position information for the at least one STA at least in part resulting in the at least one STA determining which space-time stream(s) of the plurality of space-time streams in the data packet is/are for the at least one STA by considering a sum of one or more values in the one or more other fields indicating the number of space-time stream(s) associated with the one or more other position information different from the position information for the at least one STA.

2. The apparatus of claim 1, wherein each of the one or more other position information different from the position information for the at least one STA comprises a value that never exceeds a value of the position information for the at least one STA, the number of space-time stream(s) associated with the position information for the at least one STA never exceeding any of the number(s) of space-time stream(s) associated with the one or more other position information different from the position information for the at least one STA.

3. The apparatus of claim 1, wherein the position information for the at least one STA having the lowest possible value at least in part results in the at least one STA determining that the field indicating the number of space-time stream(s) associated with the position information for the at least one STA is not preceded by the one or more other fields indicating the number(s) of space-time stream(s) associated with the one or more other position information different from the position information for the at least one STA.

4. The apparatus of claim 1, wherein at least (1) the position information for the at least one STA having the lowest possible value or (2) the field indicating the number of space-time stream(s) associated with the position information for the at least one STA not being preceded by the one or more other fields indicating the number(s) of space-time stream(s) associated with the one or more other position information different from the position information for the at least one STA at least in part results in the at least one STA determining which space-time stream(s) of the plurality of space-time streams in the data packet is/are for the at least one STA without considering the sum of the one or more values in the one or more other fields indicating the number(s) of space-time stream(s) associated with the one or more other position information different from the position information for the at least one STA.

5. The apparatus of claim 1, wherein the field indicating the number of space-time stream(s) associated with the position information for the at least one STA provides at least some basis on which the at least one STA determines how many space-time stream(s) of the plurality of space-time streams in the data packet is/are for the at least one STA, and wherein the data packet is associated with an identifier, the identifier being associated with the number of space-time stream(s) associated with the position information for the at least one STA.

6. The apparatus of claim 1, wherein a value of each of the one or more other fields indicating the number(s) of space-time stream(s) associated with the one or more other position information different from the position information for the at least one STA is not less than a value of the field indicating the number(s) of space-time stream(s) associated with the position information for the at least one STA.

7. The apparatus of claim 1, wherein the data packet further comprises at least a first symbol and a second symbol subsequent to the first symbol, the second symbol being quadrature binary phase shift keying (QBPSK)-modulated when the data packet is a first type of data packet rather than a second type of data packet, the second symbol being binary phase shift keying (BPSK)-modulated when the data packet is the second type of data packet rather than the first type of data packet.

8. The apparatus of claim 1, wherein the data packet further comprises at least a first symbol and a second symbol subsequent to the first symbol, and wherein at least (1) the second symbol differentiating the data packet as a first type of data packet rather than a second type of data packet when the second symbol is quadrature binary phase shift keying (QBPSK)-modulated or (2) the second symbol differentiating the data packet as the first type of data packet rather than the second type of data packet when the second symbol has a 90-degree counter-clockwise rotation relative to the first symbol.

9. The apparatus of claim 1, wherein the data packet further comprises at least a first symbol and a second symbol subsequent to the first symbol, the second symbol being quadrature binary phase shift keying (QBPSK)-modulated if the data packet is a first type of data packet rather than a second type of data packet, the second symbol being binary phase shift keying (BPSK)-modulated if the data packet is the second type of data packet rather than the first type of data packet, the second symbol having a 90-degree counter-clockwise rotation relative to the first symbol if the data packet is the first type of data packet rather than the second type of data packet, the second symbol having no rotation relative to the first symbol if the data packet is the second type of data packet rather than the first type of data packet, the first symbol being BPSK-modulated if the data packet is the first type of data packet rather than the second type of data packet, the first symbol being BPSK-modulated if the data packet is the second type of data packet rather than the first type of data packet.

10. A non-transitory computer-readable medium comprising computer-executable code or instructions configured to cause a processing system of an apparatus to:
generate a data packet and transmit the data packet to a plurality of STAs, the data packet comprising a plurality of space-time streams, the plurality of space-time streams comprising one or more space-time streams for at least one STA and one or more other space-time streams for one or more other STAs of the plurality of STAs, one or more other position information different from position information for the at least one STA comprising a value that is lower than a value of the position information for the at least one STA, the position information for the at least one STA not having a lowest possible value and a field indicating a number of space-time stream(s) associated with the position information for the at least one STA being preceded by one or more other fields indicating one or more numbers of space-time stream(s) associated with the one or more other position information different from the position information for the at least one STA at least in part corresponding to the at least one STA determining which space-time stream(s) of the plurality of space-time streams in the data packet is/are for the at least one STA by considering a sum of one or more values in the one or more other fields indicating the number of space-time stream(s) associated with the one or more other position information different from the position information for the at least one STA.

11. The non-transitory computer-readable medium of claim 10, wherein the data packet further comprises at least a first symbol and a second symbol subsequent to the first symbol, and wherein at least (1) the second symbol differentiating the data packet as a first type of data packet rather than a second type of data packet when the second symbol is quadrature binary phase shift keying (QBPSK)-modulated or (2) the second symbol differentiating the data packet as the first type of data packet rather than the second type of data packet when the second symbol has a 90-degree counter-clockwise rotation relative to the first symbol.

12. The non-transitory computer-readable medium of claim 10, wherein the data packet further comprises at least a first symbol and a second symbol subsequent to the first symbol, the second symbol being quadrature binary phase shift keying (QBPSK)-modulated if the data packet is a first type of data packet rather than a second type of data packet, the second symbol being binary phase shift keying (BPSK)-modulated if the data packet is the second type of data packet rather than the first type of data packet, the second symbol having a 90-degree counter-clockwise rotation relative to the first symbol if the data packet is the first type of data packet rather than the second type of data packet, the second symbol having no rotation relative to the first symbol if the data packet is the second type of data packet rather than the first type of data packet, the first symbol being BPSK-modulated if the data packet is the first type of data packet rather than the second type of data packet, the first symbol being BPSK-modulated if the data packet is the second type of data packet rather than the first type of data packet.

13. The non-transitory computer-readable medium of claim 10, wherein each of the one or more other position information different from the position information for the at least one STA comprises a value that never exceeds a value of the position information for the at least one STA, the number of space-time stream(s) associated with the position information for the at least one STA never exceeding any of the number of space-time stream(s) associated with the one or more other position information different from the position information for the at least one STA, a value of each of the one or more other fields indicating the number(s) of space-time stream(s) associated with the one or more other position information different from the position information for the at least one STA not being less than a value of the field indicating the number(s) of space-time stream(s) associated with the position information for the at least one STA.

14. The non-transitory computer-readable medium of claim 10, wherein the field indicating the number of space-time stream(s) associated with the position information for the at least one STA provides at least some basis on which the at least one STA determines how many space-time stream(s) of the plurality of space-time streams in the data packet is/are for the at least one STA, at least (1) the position information for the at least one STA having the lowest possible value or (2) the field indicating the number of space-time stream(s) associated with the position information for the at least one STA not being preceded by the one or more other fields indicating the number(s) of space-time stream(s) associated with the one or more other position information different from the position information for the at least one STA at least in part corresponding to the at least one STA determining which space-time stream(s) of the plurality of space-time streams in the data packet is for the at least one STA without considering the sum of the one or more values in the one or more other fields indicating the number(s) of space-time stream(s) associated with the one or more other position information different from the position information for the at least one STA.

15. A station (STA) for communication, the STA comprising:
at least one transceiver configured to receive a data packet, the data packet comprising a plurality of space-time streams, the plurality of space-time streams comprising one or more space-time streams for at least one STA and one or more other space-time streams for one or more other STAs of a plurality of STAs, wherein one or more other position information different from position information for the at least one STA comprises a value that is lower than a value of the position information for the at least one STA; and
one or more processors configured to:
when the position information for the at least one STA does not have a lowest possible value and a field indicating a number of space-time stream(s) associated with the position information for the at least one STA is preceded by one or more other fields indicating one or more numbers of space-time stream(s) associated with the one or more other position information different from the position information for the at least one STA, determine which space-time stream(s) of the plurality of space-time streams in the data packet is/are for the at least one STA by considering a sum of one or more values in the one or more other fields indicating the number of space-time stream(s) associated with the one or more other position information different from the position information for the at least one STA, and
process one or more space-time stream(s) of the plurality of space-time streams in the data packet that is/are for the at least one STA.

16. The STA of claim 15, wherein each of the one or more other position information different from the position information for the at least one STA comprises a value that never exceeds a value of the position information for the at least one STA, the number of space-time stream(s) associated with the position information for the at least one STA never exceeding any of the number(s) of space-time stream(s) associated with the one or more other position information different from the position information for the at least one STA.

17. The STA of claim 15, wherein, when the position information for the at least one STA has the lowest possible value, the field indicating the number of space-time stream(s) associated with the position information for the at least one STA is not preceded by the one or more other fields indicating the number(s) of space-time stream(s) associated with the one or more other position information different from the position information for the at least one STA.

18. The STA of claim 15, wherein the one or more processors is/are further configured to:
when at least (1) the position information for the at least one STA has the lowest possible value or (2) the field indicating the number of space-time stream(s) associated with the position information for the at least one STA is not preceded by the one or more other fields indicating the number(s) of space-time stream(s) associated with the one or more other position information different from the position information for the at least one STA, determine which space-time stream(s) of the plurality of space-time streams in the data packet is/are for the at least one STA without considering the sum of the one or more values in the one or more other fields indicating the number(s) of space-time stream(s) associated with the one or more other position information different from the position information for the at least one STA.

19. The STA of claim 15, wherein the one or more processors is/are further configured to determine how many space-time stream(s) of the plurality of space-time streams in the data packet is/are for the at least one STA based at least in part on the field indicating the number of space-time stream(s) associated with the position information for the at least one STA, wherein the data packet is associated with an identifier, the identifier being associated with the number of space-time stream(s) associated with the position information for the at least one STA.

20. The STA of claim 15, wherein a value of each of the one or more other fields indicating the number(s) of space-time stream(s) associated with the one or more other position information different from the position information for the at least one STA is not less than a value of the field indicating the number(s) of space-time stream(s) associated with the position information for the at least one STA.

21. The STA of claim 15, wherein the data packet further comprises at least a first symbol and a second symbol subsequent to the first symbol, the second symbol being quadrature binary phase shift keying (QBPSK)-modulated when the data packet is a first type of data packet rather than a second type of data packet, the second symbol being binary phase shift keying (BPSK)-modulated when the data packet is the second type of data packet rather than the first type of data packet.

22. The STA of claim 15, wherein the data packet further comprises at least a first symbol and a second symbol subsequent to the first symbol, and wherein at least (1) the second symbol differentiating the data packet as a first type of data packet rather than a second type of data packet when the second symbol is quadrature binary phase shift keying (QBPSK)-modulated or (2) the second symbol differentiating the data packet as the first type of data packet rather than the second type of data packet when the second symbol has a 90-degree counter-clockwise rotation relative to the first symbol.

23. The STA of claim 15, wherein the data packet further comprises at least a first symbol and a second symbol subsequent to the first symbol, the second symbol being quadrature binary phase shift keying (QBPSK)-modulated if the data packet is a first type of data packet rather than a second type of data packet, the second symbol being binary phase shift keying (BPSK)-modulated if the data packet is the second type of data packet rather than the first type of data packet, the second symbol having a 90-degree counter-clockwise rotation relative to the first symbol if the data packet is the first type of data packet rather than the second type of data packet, the second symbol having no rotation relative to the first symbol if the data packet is the second type of data packet rather than the first type of data packet, the first symbol being BPSK-modulated if the data packet is the first type or the second type of data packet.

24. A non-transitory computer-readable medium comprising computer-executable code or instructions configured to cause or enable a processing system of a station (STA) to:
  receive a data packet comprising a plurality of space-time streams, the plurality of space-time streams comprising one or more space-time streams for at least one STA and one or more other space-time streams for one or more other STAs of a plurality of STAs, wherein one or more other position information different from position information for the at least one STA comprises a value that is lower than a value of the position information for the at least one STA;
  when the position information for the at least one STA does not have a lowest possible value and a field indicating a number of space-time stream(s) associated with the position information for the at least one STA is preceded by one or more other fields indicating one or more numbers of space-time stream(s) associated with the one or more other position information different from the position information for the at least one STA, determine which space-time stream(s) of the plurality of space-time streams in the data packet is/are for the at least one STA by considering a sum of one or more values in the one or more other fields indicating the number of space-time stream(s) associated with the one or more other position information different from the position information for the at least one STA; and
  process one or more space-time stream(s) of the plurality of space-time streams in the data packet that is/are for the at least one STA.

25. The non-transitory computer-readable medium of claim 24, wherein the data packet further comprises at least a first symbol and a second symbol subsequent to the first symbol, and wherein at least (1) the second symbol differentiating the data packet as a first type of data packet rather than a second type of data packet when the second symbol is quadrature binary phase shift keying (QBPSK)-modulated or (2) the second symbol differentiating the data packet as the first type of data packet rather than the second type of data packet when the second symbol has a 90-degree counter-clockwise rotation relative to the first symbol.

26. The non-transitory computer-readable medium of claim 24, wherein the data packet further comprises at least a first symbol and a second symbol subsequent to the first symbol, the second symbol being quadrature binary phase shift keying (QBPSK)-modulated if the data packet is a first type of data packet rather than a second type of data packet, the second symbol being binary phase shift keying (BPSK)-modulated if the data packet is the second type of data packet rather than the first type of data packet, the second symbol having a 90-degree counter-clockwise rotation relative to the first symbol if the data packet is the first type of data packet rather than the second type of data packet, the second symbol having no rotation relative to the first symbol if the data packet is the second type of data packet rather than the first type of data packet, the first symbol being BPSK-modulated if the data packet is the first type or the second data type of data packet.

27. The non-transitory computer-readable medium of claim 24, wherein each of the one or more other position information different from the position information for the at least one STA comprises a value that never exceeds a value of the position information for the at least one STA, the number of space-time stream(s) associated with the position information for the at least one STA never exceeding any of the number of space-time stream(s) associated with the one or more other position information different from the position information for the at least one STA, a value of each of the one or more other fields indicating the number(s) of space-time stream(s) associated with the one or more other position information different from the position information for the at least one STA not being less than a value of the field indicating the number(s) of space-time stream(s) associated with the position information for the at least one STA.

28. The non-transitory computer-readable medium of claim 24, wherein the computer-executable code or instructions is/are further configured to cause or enable the processing system to:
  determine how many space-time stream(s) of the plurality of space-time streams in the data packet is/are for the at least one STA at least in part based on the field indicating the number of space-time stream(s) associated with the position information for the at least one STA; and
  when at least (1) the position information for the at least one STA has the lowest possible value or (2) the field indicating the number of space-time stream(s) associated with the position information for the at least one STA is not preceded by the one or more other fields indicating the number(s) of space-time stream(s) associated with the one or more other position information different from the position information for the at least one STA, determine which space-time stream(s) of the plurality of space-time streams in the data packet is for the at least one STA without considering the sum of the one or more values in the one or more other fields indicating the number(s) of space-time stream(s) associated with the one or more other position information different from the position information for the at least one STA.

* * * * *